United States Patent
Nishimori et al.

(10) Patent No.: US 6,778,468 B1
(45) Date of Patent: Aug. 17, 2004

(54) AUTOMATICALLY TRACKING SCANNING SONAR

(75) Inventors: Yasushi Nishimori, Nishinomiya (JP); Ken'ich Watanabe, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 0 days.

(21) Appl. No.: 10/401,872

(22) Filed: Mar. 31, 2003

(30) Foreign Application Priority Data

May 20, 2002 (JP) ........................................ 2002-145194

(51) Int. Cl.⁷ ............................................... G01S 15/06
(52) U.S. Cl. ........................................ 367/103; 367/88
(58) Field of Search .................................. 367/103, 88

(56) References Cited

U.S. PATENT DOCUMENTS

| | | | |
|---|---|---|---|
| 3,419,845 A | 12/1968 | Thiede et al. | |
| 4,631,710 A | 12/1986 | Yamaguchi et al. | 367/103 |
| 5,150,336 A | 9/1992 | Sullivan et al. | 367/103 |
| 5,923,617 A | 7/1999 | Thompson et al. | 367/103 |

FOREIGN PATENT DOCUMENTS

JP          1-185471 A          7/1989
JP          200134350 A    *  12/2001    ........... G01S/15/96

* cited by examiner

*Primary Examiner*—Daniel Pihulic
(74) *Attorney, Agent, or Firm*—Birch, Stewart, Kolasch & Birch, LLP

(57) ABSTRACT

The invention provides an ultrasonic transmit-receive apparatus which solves a false image problem caused by grating lobes and side lobes and offers high bearing resolution without increasing in the scale of hardware or in manufacturing cost. Using a transducer having multiple transducer elements arranged on a surface of the transducer along its circumferential direction, the apparatus emits ultrasonic waves in directionally varying frequency bands and receives echo signals from specified angular directions while selecting the frequency from one direction to another. In a Doppler transmission method, for example, the apparatus drives the individual transducer elements in such a manner that the ultrasonic waves emitted by the transducer elements are equivalent to ultrasonic waves emitted from an imaginary moving sound source moving within a circle enclosed by the multiple transducer elements arranged along the circumferential direction, so that the transducer elements emit ultrasonic signals at directionally varying Doppler shift frequencies.

37 Claims, 39 Drawing Sheets

ELEMENT DIRECTION 0°

ELEMENT DIRECTION 90°

ELEMENT DIRECTION 180°

DIRECTION OF OBSERVATION 0°

DIRECTION OF OBSERVATION 90°

DIRECTION OF OBSERVATION 180°

ELEMENT DIRECTION 0°

ELEMENT DIRECTION 90°

ELEMENT DIRECTION 180°

DIRECTION OF OBSERVATION 0°

DIRECTION OF OBSERVATION 90°

DIRECTION OF OBSERVATION 180°

DIRECTION OF ELEMENT 0°

DIRECTION OF ELEMENT 90°

DIRECTION OF ELEMENT 180°

DIRECTION OF OBSERVATION 0°

DIRECTION OF OBSERVATION 90°

DIRECTION OF OBSERVATION 180°

DIRECTION OF OBSERVATION 0°

DIRECTION OF OBSERVATION 90°

DIRECTION OF OBSERVATION 180°

DIRECTION OF OBSERVATION 0°

DIRECTION OF OBSERVATION 90°

DIRECTION OF OBSERVATION 180°

DIRECTION OF ELEMENT 0°

DIRECTION OF ELEMENT 90°

DIRECTION OF ELEMENT 180°

PULSELENGTH 10 MS

PULSELENGTH 15 MS

PULSELENGTH 20 MS

DIRECTION OF OBSERVATION 0°

DIRECTION OF OBSERVATION 90°

DIRECTION OF OBSERVATION 180°

PULSELENGTH 10 MS

PULSELENGTH 15 MS

PULSELENGTH 20 MS

AUTOMATICALLY TRACKING SCANNING SONAR

BACKGROUND OF THE INVENTION

1. Field of the Invention

This invention relates to an ultrasonic transmit-receive apparatus for detecting underwater objects, for instance, by transmitting and receiving ultrasonic waves as well as to a scanning sonar employing the ultrasonic transmit-receive apparatus.

2. Description of the Prior Art

Conventionally, scanning sonars are used for detecting underwater targets. Typically, a scanning sonar is provided with a generally cylinder-shaped transducer like the one shown in FIG. 1 for detecting underwater targets around a vessel on which the scanning sonar is installed. The scanning sonar produces an ultrasonic transmitting beam directed in all directions around the transducer by causing its transducer elements to oscillate. Referring to FIG. 1, the individual transducer elements of the transducer are driven by signals which are precisely phase-controlled to introduce appropriate time delays in driving the transducer elements of one ringlike horizontal array (or row) to another, so that the ultrasonic transmitting beam forms a full-circle umbrellalike pattern of a narrow vertical beamwidth directed obliquely downward by a specific tilt angle. In each successive receive cycle, the scanning sonar produces a pencil-shaped receiving beam directed obliquely downward in a particular azimuth (horizontal direction) by driving a specific number of vertical arrays (hereinafter referred to as columns or staves) of transducer elements oriented toward particular directions. The combination of transducer element staves is sequentially switched along the circumferential direction of the transducer so that the receiving beam is successively rotated from one direction to another around the transducer.

The transducer of the aforementioned scanning sonar is constructed by "coarsely" arranging a plurality of transducer elements. Due to this structure, the conventional transducer produces grating lobes and receives reflections from other directions than an intended sounding direction, eventually producing false images on-screen as a consequence.

FIG. 6 is a diagram showing an example of grating lobe formation. The transducer creates a main lobe ML having sharp directivity in the direction of an alternate long and short dashed line. The transducer also creates grating lobes GL directed generally perpendicular to the main lobe ML as well as multiple side lobes SL on both left and right sides of the main lobe ML.

Upon scanning underwater situations by successively rotating the receiving beam having such directional properties, the scanning sonar displays a picture as shown in FIG. 7, for example, in which designated by R is a real image of a target and designated by I are false images of the target. The false images I like this are created if any of the grating lobes GL or the side lobes SL is oriented toward the actual target (existing in the direction of R) and receives echoes from the target when the main lobe ML is emitted in the direction of either of the false images I.

One approach to attenuating the grating lobes GL is to reduce intervals between adjacent transducer elements by increasing the total number of transducer elements. Although this approach is effective to some extent, an increase in the number of transducer elements leads to an increase in the number of such circuits as drive circuits for driving the individual transducer elements, control circuits for controlling the drive circuits, receive circuits and signal processing circuits for processing received signals, eventually causing an increase in the scale of hardware and a considerable cost increase.

SUMMARY OF THE INVENTION

Accordingly, it is an object of the invention to provide an ultrasonic transmit-receive apparatus and a scanning sonar employing the ultrasonic transmit-receive apparatus which can solve the aforementioned false image problem and offer a higher angular resolution without causing an increase in the scale of hardware or in manufacturing cost even if a transducer is so structured to produce relatively large grating lobes and side lobes.

According to the invention, an ultrasonic transmit-receive apparatus comprises a transducer having multiple transducer elements arranged on a surface of the transducer at least along one direction in a horizontal plane, a transmit controller for driving the multiple transducer elements, causing them to emit ultrasonic waves, and a receive controller for synthesizing echo signals received by the individual transducer elements to produce a synthesized received echo signal upon receiving ultrasonic waves reflected by a target. The transmit controller drives the multiple transducer elements of the transducer in such a manner that the transducer elements emit the ultrasonic waves in directionally varying frequency bands, and the receive controller obtains received signals of specified angular directions by selecting the frequency from one angular direction to another.

Since the transmit controller causes the multiple transducer elements to emit the ultrasonic waves at directionally varying frequencies and the receive controller causes the multiple transducer elements to receive selectively echo signals of directionally varying frequencies from one angular direction to another, the echo signal received from each direction is substantially protected against interference with the echo signals received from other directions. As a result, it is possible to prevent false images from occurring due to grating lobes and side lobes and to offer a higher angular resolution.

In one feature of the invention, the transmit controller drives the individual transducer elements in such a manner that the ultrasonic waves emitted by the multiple transducer elements are equivalent to ultrasonic waves emitted from an imaginary moving sound source which moves within a circle enclosed by the multiple transducer elements arranged along the aforesaid one direction in the horizontal plane.

According to this feature of the invention, the frequency of a transmitting beam smoothly varies from one angular direction to another. This transmission method, referred to as the Doppler transmission method in the following detailed description, makes it possible to finely adjust the center frequency of the passband of a bandpass filter through which the received signals are passed to each angular direction and to easily increase the angular resolution.

In another feature of the invention, the transmit controller drives transducer elements necessary for forming a specific transmitting aperture which are chosen from the multiple transducer elements arranged along the aforesaid one direction in the horizontal plane by controlling the amounts of time delays of the ultrasonic waves to be emitted from the chosen transducer elements, wherein the transmitting aperture is successively moved from one direction to another such that a transmitting beam is steered from one angular direction to another all around the transducer.

In this transmission method, referred to as the rotational directional transmission (RDT) method in the following detailed description, a narrow pencillike transmitting beam is successively formed in one angular direction to another. Therefore, it is possible to increase the amount of energy fed into the single transmitting beam, extend detection range and scan across a wider area.

In another feature of the invention, the transmit controller successively varies transmitting frequency of the transmitting beam from one angular direction to another.

In another feature of the invention, the transmit controller successively selects adjacent transducer elements arranged within a specific sector area (aperture) from the multiple transducer elements arranged along the aforesaid one direction in the horizontal plane, wherein the transmit controller causes the selected transducer elements to emit frequency-modulated ultrasonic signals while shifting the direction of the sector area along the aforesaid direction in the horizontal plane.

This transmission method, referred to as the rotational aperture frequency modulation (RA-FM) transmission method in the following detailed description, makes it possible to allocate desired frequencies to the individual directions with an increased degree of freedom and more easily avoid directional spurious emissions (false images) which could occur in the aforementioned Doppler transmission method in which the transmitting beam of the same frequency is formed in two different directions.

In another feature of the invention, the transmit controller feeds such drive signals into the individual transducer elements that phases of the drive signals generally match at the middle of envelopes of drive signal waveforms in all angular directions, and the transmit controller causes the multiple transducer elements to emit ultrasonic signals of which transmitting frequency varies from one angular direction to another.

This transmission method, referred to as the directionally varying frequency continuous wave (CW) transmission method in the following detailed description, also makes it possible to allocate desired frequencies to the individual directions with an increased degree of freedom and more easily avoid directional spurious emissions (false images) which could occur in the aforementioned Doppler transmission method in which the transmitting beam of the same frequency is formed in two different directions.

In another feature of the invention, the transmit controller includes a pulse expander for expanding drive signal pulses fed into the individual transducer elements by convoluting burst waves with an FM signal, and the receive controller includes a pulse compressor for compressing the received signals of each angular direction before or after the frequency is selected for each angular direction by convoluting the received signals with an FM signal of which time axis is reversed.

This transmission method, referred to as the pulse expansion method in the following detailed description, makes it possible to prolong the duration of each drive signal pulse, increase the amount of energy fed into the transducer elements per transmit cycle and consequently extend the detection range.

In another feature of the invention, the ultrasonic transmit-receive apparatus further comprises a side-lobe eliminator for eliminating side lobes occurring on the time axis by the aforementioned pulse expansion operation.

Since side lobe levels of the drive signal spectrum decrease, effects of suppressing adverse influence of grating lobes and side lobes and of improving angular resolution are further increased.

In still another feature of the invention, the transmit controller precalculates the waveform of ultrasonic signals to be emitted in each of sector areas into which the horizontal plane is divided, calculates an angular direction and the amount of time delay of the waveform of the ultrasonic signals according to motion of the transducer for forming a transmitting beam directed to a desired direction, and defines drive signals to be fed into the individual transducer elements.

This makes it possible to generate the drive signals to be fed into the individual transducer elements with little computational complexity and easily stabilize the transmitting beam according to the motion of the transducer.

In yet another feature of the invention, the transducer has a flat, cylindrical or spherical surface on which the multiple transducer elements are arranged.

According to this feature of the invention, it is not necessary to use transducer elements of special design or employ special arrangement the transducer elements on the transducer. Therefore, control operation for driving the transducer elements is simple, resulting in a reduction in overall manufacturing cost.

According to the invention, a scanning sonar comprises the aforementioned ultrasonic transmit-receive apparatus, and means for controlling the transmit controller and the receive controller of the ultrasonic transmit-receive apparatus to successively scan through specified angular directions, producing data on a detected echo image from the received echo signals and displaying the detected echo image.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

The invention is now described in detail referring to the appended drawings.

Figure 1:
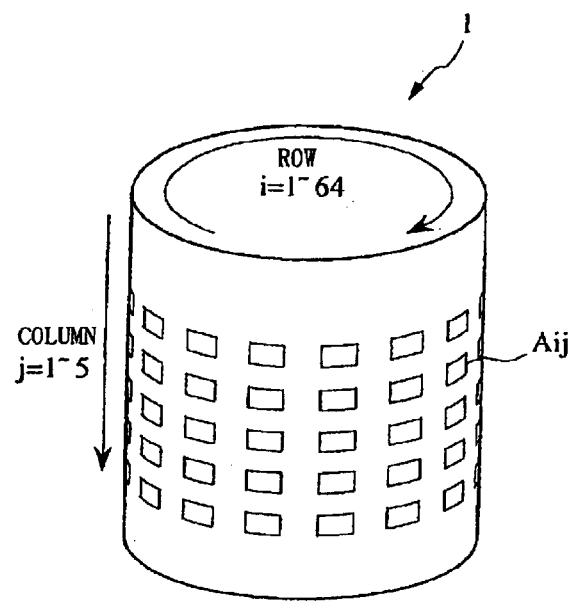
FIG. 1 is a perspective view showing a typical construction of a transducer used in a scanning sonar.

FIG. 1 is a perspective view showing the construction of a cylinder-shaped transducer 1 used in a scanning sonar according to a preferred embodiment of the invention. As depicted in FIG. 1, the transducer 1 includes 320 transducer elements Aij (i=1 to 64, j=1 to 5) arranged in rows and columns. More specifically, the transducer elements Aij are arranged on a cylindrical outer surface of the transducer 1 in 5 rows by 64 columns. The transducer 1 is mounted on the bottom of a vessel in such a manner that the central axis of the transducer 1 is vertically positioned.

Figure 2:
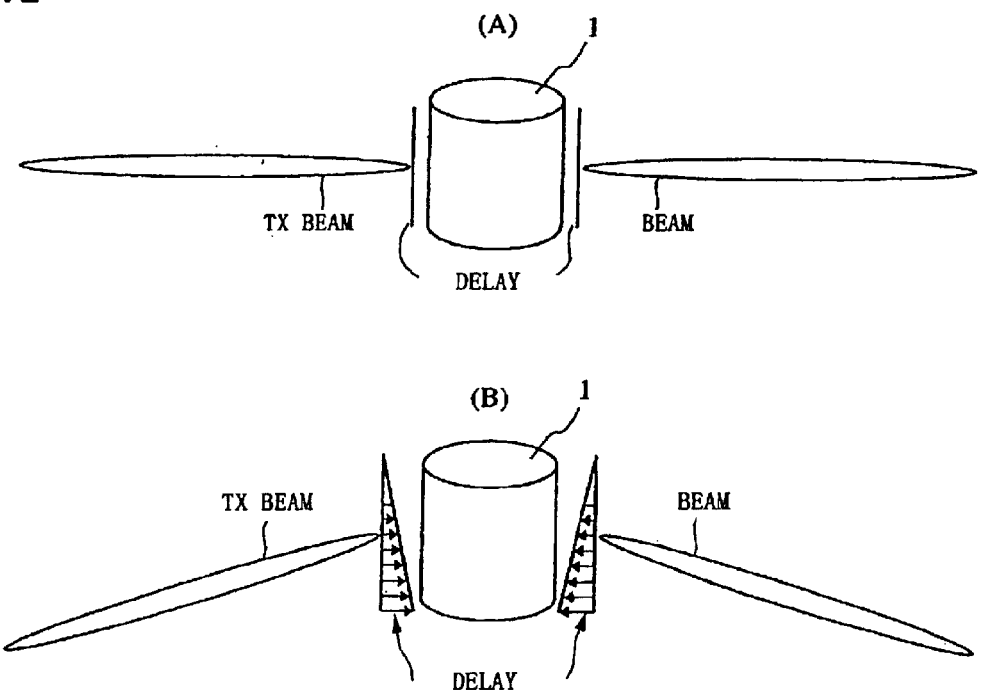
FIGS. 2A and 2B are diagrams showing how an ultrasonic transmitting beam is formed.

FIGS. 2A and 2B are diagrams showing how an ultrasonic transmitting beam is produced, in which FIG. 2A particularly shows directivity of the transmitting beam as it is formed when sounding all directions around the vessel in a horizontal plane (tilt angle=0°), and FIG. 2B particularly shows how the transmitting beam is formed when sounding all directions around the vessel with a specific tilt angle. The transmitting beam shown in FIG. 2B is directed obliquely downward, forming a full-circle umbrellalike pattern. This umbrellalike beam pattern is created by inserting progressively increased time delays in drive signals applied to the transducer elements in the top to bottom rows as shown by arrows.

Figure 3:
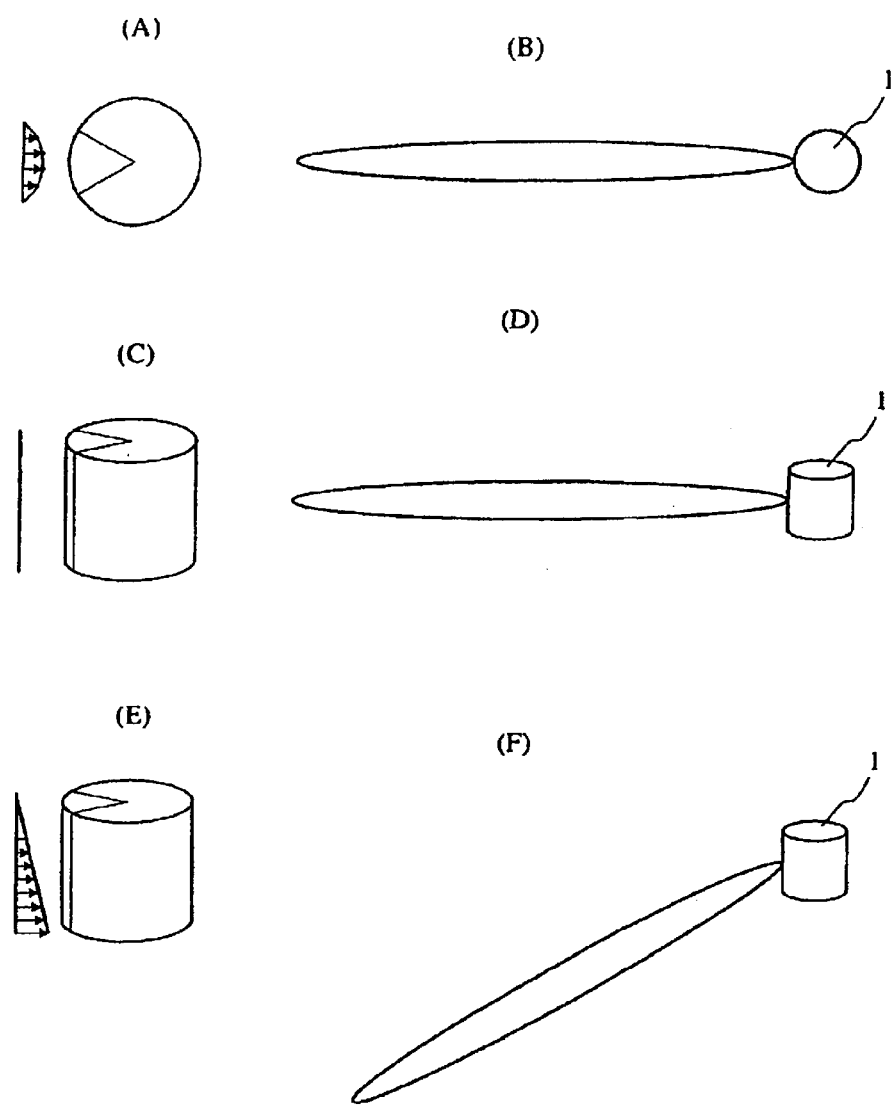
FIGS. 3A–3F are diagrams showing how a receiving beam is formed.

FIGS. 3A–3F are diagrams showing how a receiving beam is produced. The receiving beam is formed by using a group of consecutive columns arranged on the cylindrical surface of the transducer 1. Specifically, signals received by the transducer elements arranged in the specific number of 5 consecutive columns are synthesized using a phased array technique, in which the phases of the received signals are delayed by inserting time delays which are progressively increased toward the center of the group of the consecutive columns as shown in FIG. 3A in order that the receiving beam has increased horizontal directivity as shown in FIG. 3B. Progressively increased time delays are also inserted vertically along the individual columns of transducer elements used for producing the receiving beam in order to control the tilt angle of the receiving beam and increase its vertical directivity. As a result of these varying time delays inserted along the circumferential and vertical directions, the receiving beam has a so-called pencil beam pattern.

FIG. 3C shows an example in which the same time delay is introduced to the received signals so that the receiving beam is oriented in a horizontal direction (tilt angle=0°) as shown in FIG. 3D. By comparison, FIG. 3E shows an example in which the time delay inserted in the transducer elements is successively increased from the top row to the bottom row so that the receiving beam is oriented obliquely downward.

In horizontal scan mode, the transducer 1 emits the transmitting beam having the umbrellalike beam pattern and forms the receiving beam having the pencil beam pattern as stated above. As the receiving beam is rotated, or steered, to receive echoes of targets existing within the umbrellalike pattern of the transmitting beam, the scanning sonar scans through an umbrellalike search area.

Figure 4:
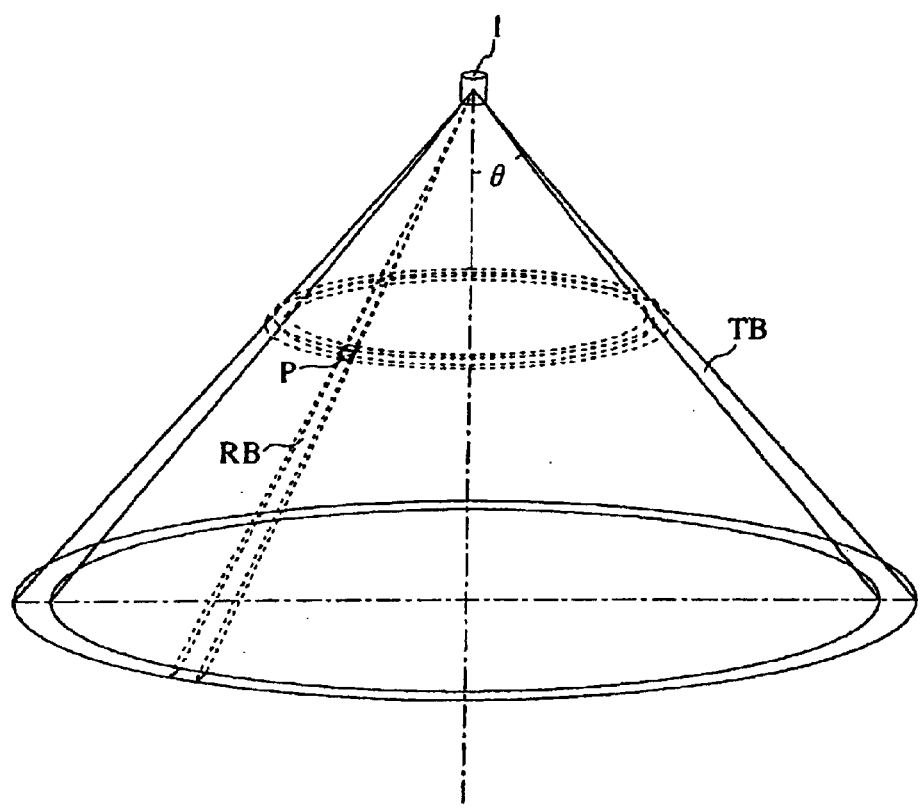
FIG. 4 is a diagram showing a search area covered by a combination of the transmitting beam and the receiving beam in horizontal scan mode.

FIG. 4 is a diagram showing the aforementioned umbrellalike search area covered by a combination of the transmitting beam and the receiving beam, in which designated by TB is the transmitting beam having the umbrellalike beam pattern directed obliquely downward by a tilt angle θ and designated by RB is the receiving beam having the pencil beam pattern. As already mentioned, the transducer elements Aij of the transducer 1 are arranged in 64 columns on its cylindrical outer surface. The transducer 1 can produce the receiving beam RB with an angular resolution achieved by these 64 columns of transducer elements using the phased array technique. In radial directions, on the other hand, the scanning sonar picks up the received signals from each successive segment R within the umbrellalike beam pattern of the transmitting beam TB with a range resolution corresponding to a sampling interval defined on time axis to sequentially generate detected echo data.

The transmitting beam TB is emitted in the horizontal plane (tilt angle=0°) or directed obliquely downward with a specific tilt angle in the horizontal scan mode to scan around the transducer 1 as shown in FIG. 4.

While the scanning sonar of the present embodiment employs the transducer 1 including the transducer elements arranged on the cylindrical outer surface, the transducer 1 need not necessarily be of the cylindrical structure. For example, the scanning sonar may employ a sphere-shaped transducer having a plurality of transducer elements arranged on its entire spherical surface or on part of the spherical surface.

Figure 5A:
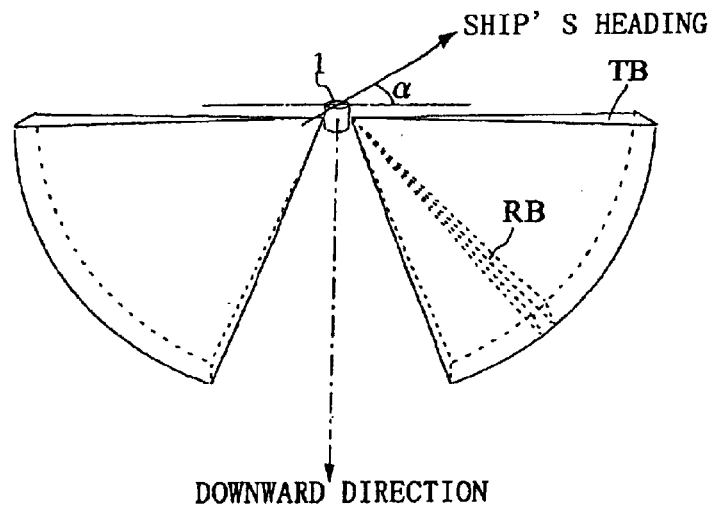
FIGS. 5A–5C are diagrams showing search areas covered by a combination of a transmitting beam and a receiving beam in vertical scan mode.
Figure 5B:
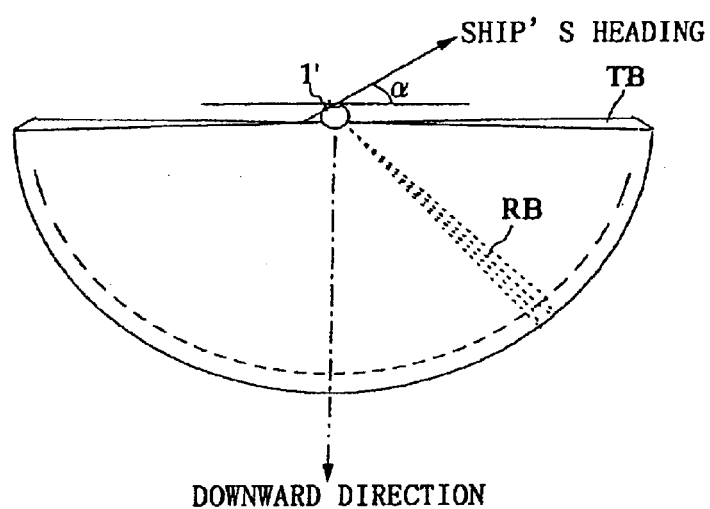
Figure 5C:
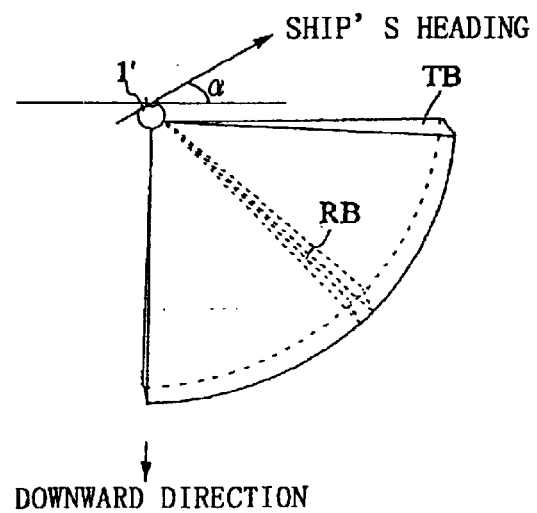
Figure 6:
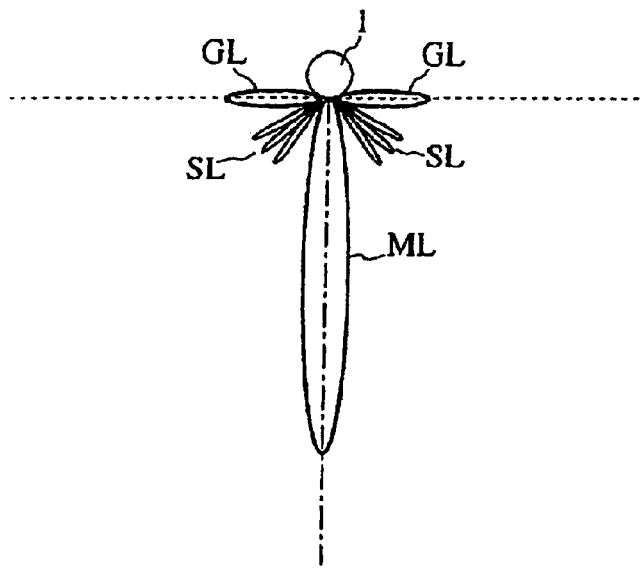
FIG. 6 is a diagram showing an example of a main lobe, grating lobes and side lobes.
Figure 7:
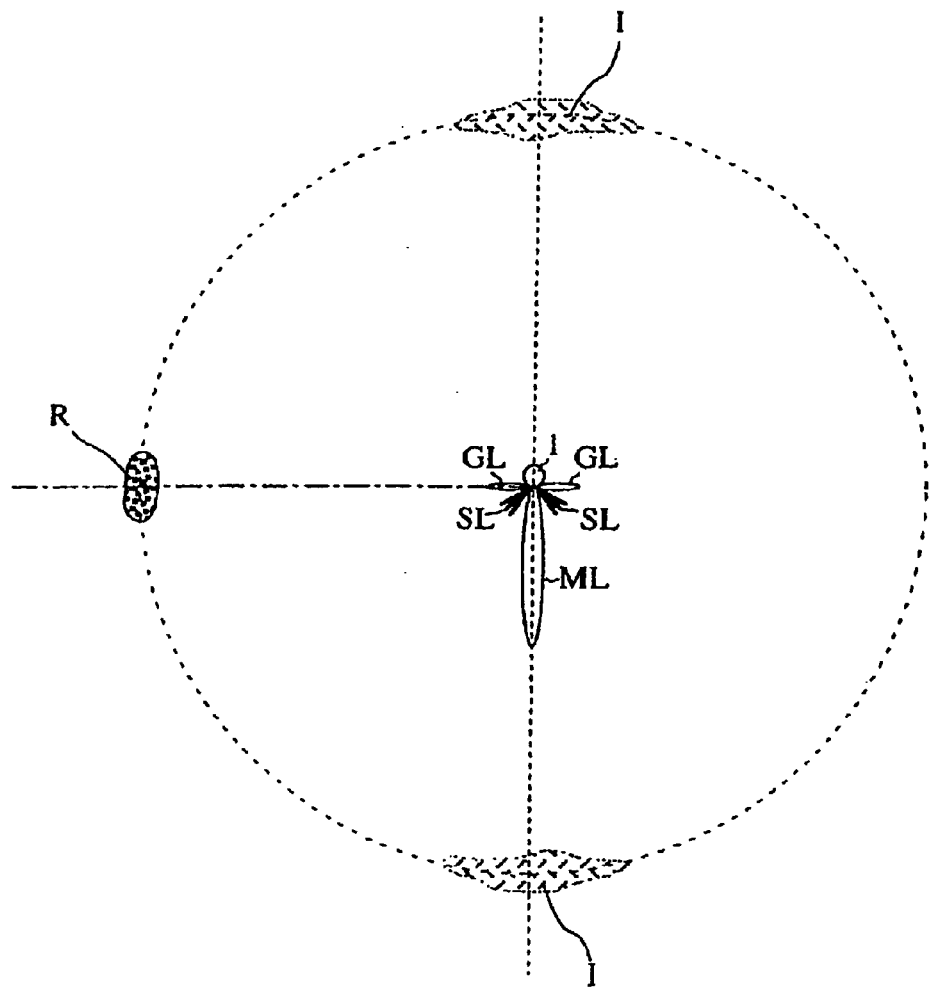
FIG. 7 is a diagram showing an example of false images caused by the grating lobes and the side lobes.

FIGS. 5A–5C are diagrams showing examples in which the scanning sonar scans underwater situations in a vertical plane in vertical scan mode. In these examples, search areas are formed in a vertical plane oriented in a specific angular direction (bearing) α with respect to the vessel's heading shown by an arrow. FIG. 5A shows a pair of fan-shaped transmitting beams TB and a pencil-shaped receiving beam RB formed by the aforementioned cylindrical transducer 1, whereas FIGS. 5B and 5C show a fan-shaped transmitting beam TB and a pencil-shaped receiving beam RB formed by a spherical transducer 1'.

As can be understood from the above description, the scanning sonar scans underwater situations within one or two fan-shaped search areas lying in the vertical plane. It is to be noted, however, that the scanning sonar employing the cylindrical transducer 1 can not scan a sector area of a specific angle extending directly downward because this transducer 1 can not direct the transmitting beam TB or the receiving beam RB straight down.

In the example of FIG. 5C, the fan-shaped search area formed by the transducer 1' has a sector angle of 90°, extending from the horizontal direction to the vertical direction.

As stated above, the transducer 1 (1') forms one or two transmitting beams TB having a fanlike beam pattern spreading downward in a vertical plane which is oriented in the angular direction a and the pencillike receiving beam RB is steered in the vertical plane by successively varying its tilt angle at a high speed in the vertical scan mode.

The aforementioned "spherical" transducer 1' having a plurality of transducer elements arranged on its entire spherical surface or on part of the spherical surface shown in FIGS. 5B and 5C is actually structured using a polyhedron having 720 faces which is modified from a regular icosahedron, for example, with the transducer elements arranged at individual vertices. Likening this polyhedral structure of the transducer 1' to a celestial body having a spherical shape, 3 or 6 transducer elements are arranged on the same parallel of latitude. A plurality of transducer elements do not necessarily exist on the same meridian, however. In the horizontal scan mode, transducer elements located on the same parallel of latitude are driven with the same phase while time delays, or phase delays, controllably varied in accordance with latitudinal positions are inserted in drive signals applied to the transducer elements. As the time delays introduced are varied in this manner, the transducer 1' forms a transmitting beam having an umbrellalike beam pattern directed obliquely downward by a specific tilt angle. When synthesizing echo signals received by the spherical transducer 1' in each successive receive cycle, transducer elements located in particular ranges of latitude and longitude of the spherical surface are precisely phase-controlled to form a pencillike receiving beam.

Figure 8:
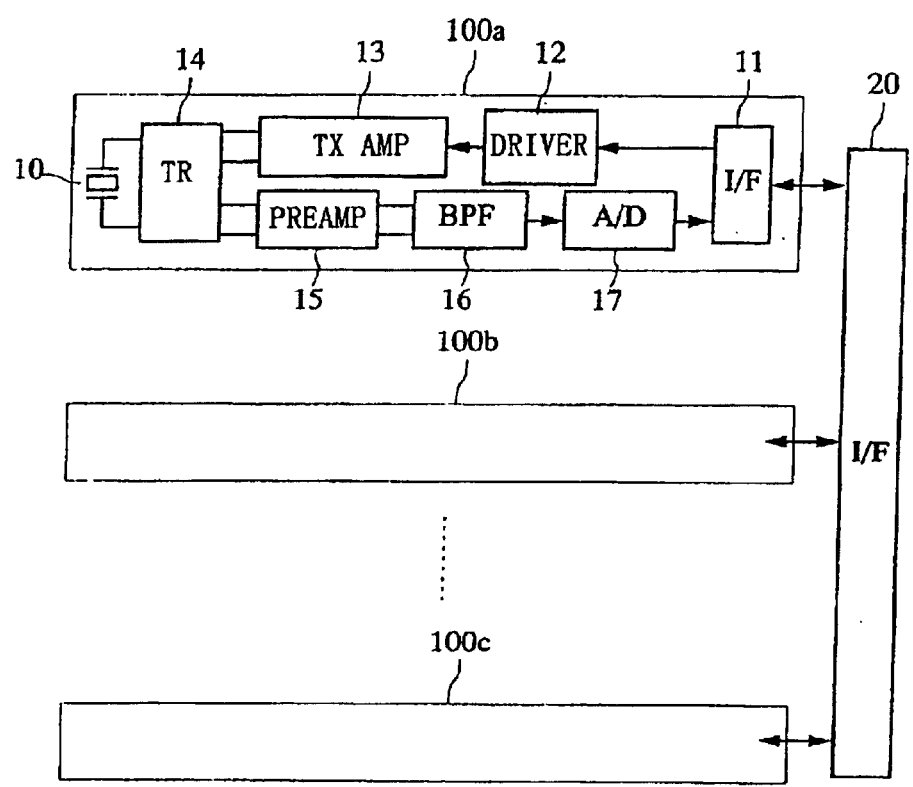
FIG. 8 is a block diagram showing a transmit-receive channel configuration of the scanning sonar.

FIG. 8 is a block diagram showing a transmit-receive channel configuration of the scanning sonar. As shown in FIG. 8, each transmit-receive channel 100 has a driver circuit 12 which decodes binary drive codes fed from a later-described programmable transmitting beamformer 26 via interfaces 20, 11 into four kinds of drive signals used for driving a field effect transistor (FET) of a full-bridge-type PDM transmitting circuit employing pulse-duration modulation (PDM).

A transmitting (TX) amplifier circuit 13 outputs a tristate signal PDM-modulated by the aforementioned full-bridge-type PDM transmitting circuit and drives a transducer element 10 through a transmit-receive (TR) circuit 14. The TR circuit 14 passes the output signal of the TX amplifier circuit 13 to the transducer element 10 during each successive transmit cycle and passes an echo signal received by the transducer element 10 to a preamplifier 15 during each successive receive cycle. The preamplifier 15 amplifies the received echo signal and a bandpass filter 16 in a succeeding stage removes noise components contained in the received echo signal existing outside the passband of the bandpass filter 16. An analog-to-digital (A/D) converter 17 samples the echo signal filtered by the bandpass filter 16 at specific sampling intervals and converts the sampled signals into a train of digital echo data.

The scanning sonar is provided with a plurality of such transmit-receive channels designated 100a, 100b, . . . , 100n as much as the number of the transducer elements 10.

Figure 9:
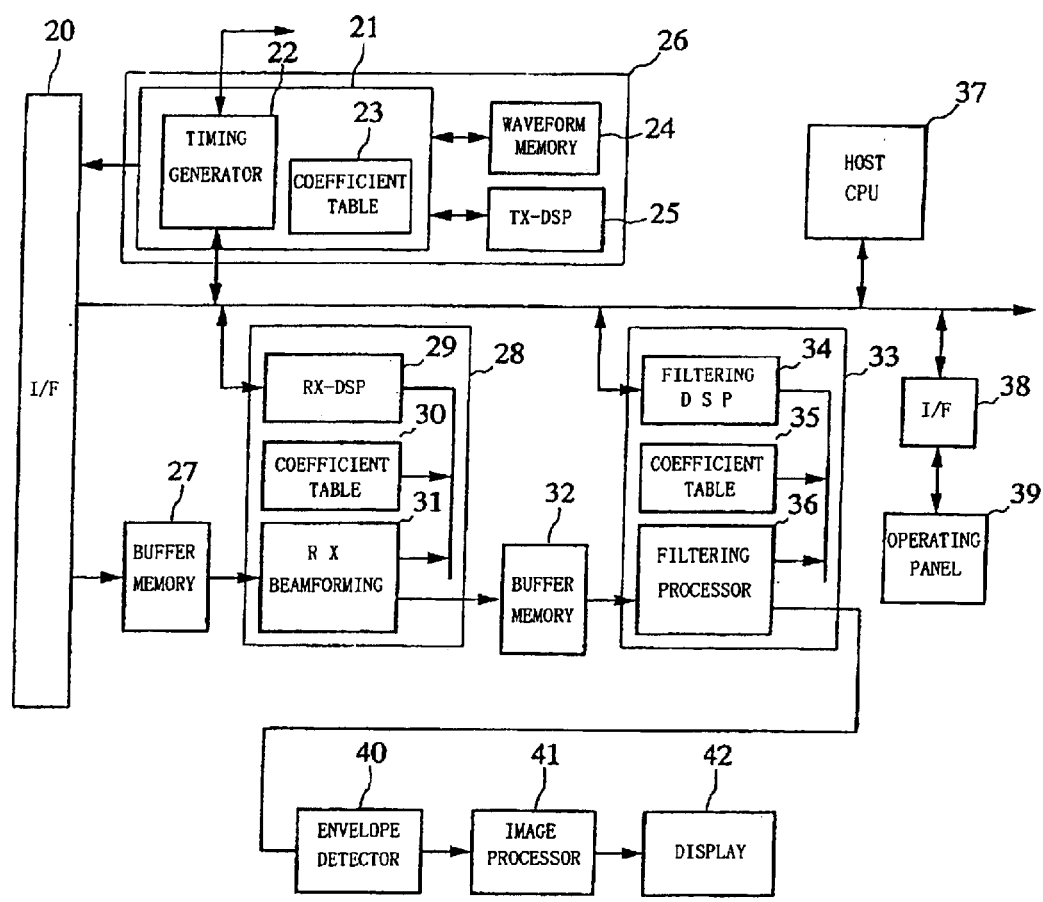
FIG. 9 is a block diagram of a control section for controlling transmit-receive channels of the scanning sonar.

FIG. 9 is a block diagram of a control section for forming the transmitting beam and the receiving beam using the multiple transmit-receive channels 100 shown in FIG. 8 and generating a detected echo image derived from a specified search area. The interface 20 shown in FIG. 9 is the same as that shown in FIG. 8.

Referring to FIG. 9, the programmable transmitting beamformer 26 includes a transmit signal generating circuit 21, a waveform memory 24 and a transmit digital signal processor (DSP) 25. The transmit signal generating circuit 21 incorporates a timing generator 22 and a coefficient table 23. The transmit signal generating circuit 21 is formed of a field-programmable gate array (FPGA). The timing generator 22 generates a reference timing signal used in generating transmit signals. The transmit DSP 25 is a digital signal processor circuit for generating the transmit signals.

The transmit DSP 25 calculates binary reference drive codes for generating PDM-modulated waveforms for 32 angular directions with 8 kinds of different weights and writes these reference drive codes in the waveform memory 24. The transmit DSP 25 further calculates the amounts of time delays, weight values and angular directions to be introduced to the individual transmit-receive channels 100 for forming the transmitting beam and writes these parameters in the coefficient table 23.

The transmit signal generating circuit 21 generates drive codes corresponding to the weight values and the amounts of time delays of the individual channels 100 from the reference drive codes for the angular directions of the individual channels 100.

A buffer memory 27 is a memory for temporarily storing received echo data fed from the individual channels 100 through the interface 20. Designated by the numeral 28 is a programmable receiving beamformer including a receive DSP 29, a coefficient table 30 and a receiving beamforming processor 31. The receive DSP 29 calculates phases of echo signals received by the individual transducer elements 10 and weights to be applied to them for each direction of the receiving beam and writes these parameters in the coefficient table 30. The receiving beamforming processor 31 synthesizes the echo signals received by the individual transducer elements 10 by applying the phases and weights written in the coefficient table 30 to obtain a synthesized received echo signal. The receiving beamforming processor 31 generates this synthesized received echo signal as time series data for each direction of the receiving beam and writes this data in a buffer memory 32. The receiving beamforming processor 31 is formed of an FPGA.

Designated by the numeral 33 is a programmable filter which includes a filtering DSP 34, a coefficient table 35 and a filtering processor 36. The programmable filter 33 serves to perform band limitation and pulse compression operations for each direction of the receiving beam. In a case where pulse expansion operation is performed by convolution with a later-described frequency-modulated (FM) signal during the transmit cycle, both the band limitation and the pulse compression operations are performed simultaneously during the receive cycle. Specifically, band-limited signals of each direction are convoluted by reversing the time axis of the FM signal used for convolution in the transmit cycle. This applies similarly to a later-described rotational aperture (RA) FM transmission methods, in which both the band limitation and the pulse compression operations are performed simultaneously during the receive cycle as well. In a case where the pulse expansion operation is not performed by convolution with the FM signal during the transmit cycle, only the band limitation operation is performed during the receive cycle. The filtering processor 36 is formed of an FPGA. The filtering DSP 34 calculates a filter coefficient for obtaining specific bandpass filter characteristics for each direction of the receiving beam and writes filter coefficients so obtained in the coefficient table 35. The filtering processor 36 performs mathematical operation as a finite impulse response (FIR) filter based on the filter coefficients stored in the coefficient table 35 and produces passband-treated echo signals.

An envelope detector 40 detects an envelope of the passband-corrected echo signal derived from each direction of the receiving beam. Specifically, the envelope detector 40 detects the envelope by calculating the square root of the sum of the square of a real component of a time waveform and the square of an imaginary component of the time waveform.

An image processor 41 converts received echo signal intensities at individual distances in each direction of the receiving beam into image information and outputs it to a display 42. As a consequence, the display 42 presents the detected echo image of the specified search area on-screen.

An operating panel 39 is an input terminal for entering commands for setting the search area, tilt angle and other parameters as appropriate. A host central processing unit (CPU) 37 reads the commands entered through the operating panel 39 via an interface 38 and controls individual circuit elements described above accordingly.

Although not illustrated in FIG. 9, the transmit DSP 25 receives information on pitch and roll motions of the vessel from a motion sensor installed onboard and calculates coefficients to be written in the coefficient table 23 in such a manner that the transmitting beam is kept directed to the specified search area regardless of the motions of the vessel. Likewise, the receive DSP 29 calculates coefficients to be written in the coefficient table 30 in such a manner that the receiving beam is oriented to the specified angular direction regardless of the motions of the vessel.

Varying Sounding Frequencies with Angular Directions by Doppler Transmission Method A method of transmitting a Doppler-shifted ultrasonic signal from the transducer 1 is now explained.

Figure 10:
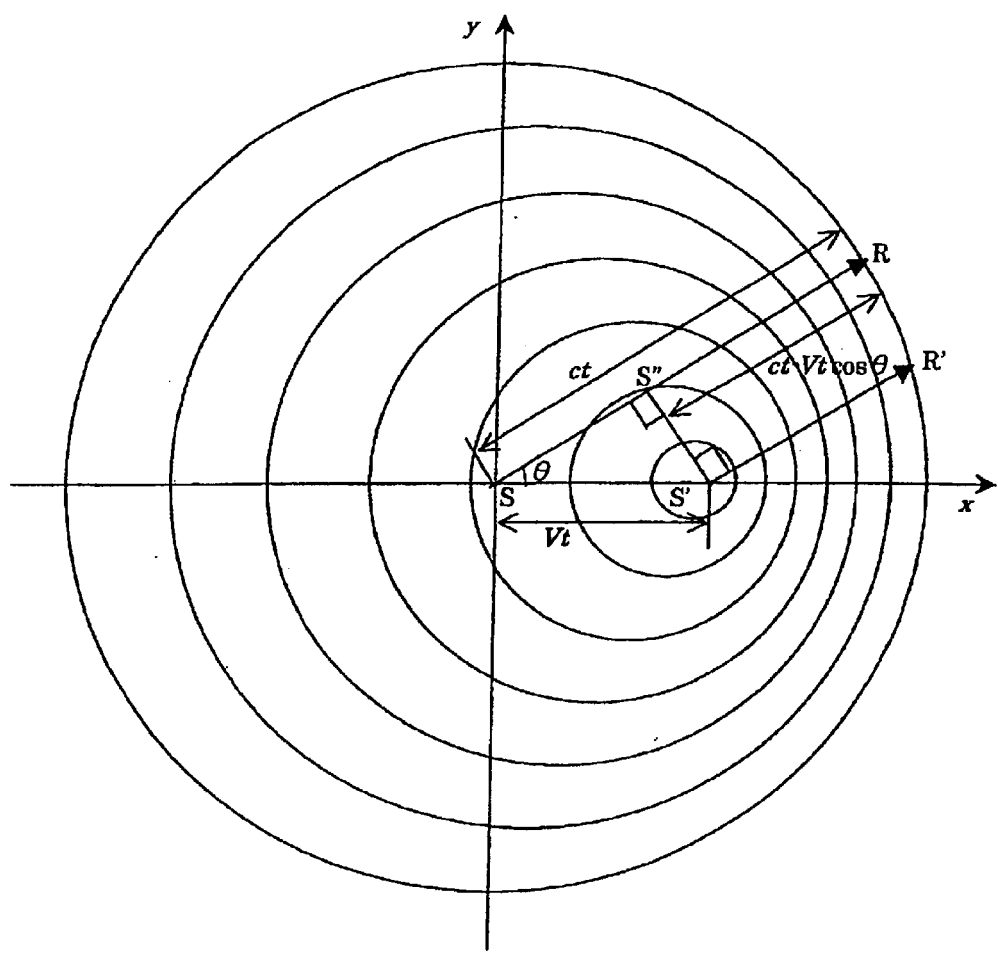
FIG. 10 is a diagram showing a Doppler effect caused by an imaginary moving sound source.

FIG. 10 is a diagram showing a Doppler effect occurring when an imaginary moving sound source moves at a constant speed. Assuming that the imaginary moving sound source transmitting at frequency $f_0$ moves from a point S to a point S' in the positive direction of the x-axis at a constant speed V during a period of time 0 to time t, let us calculate the frequency observed when ultrasonic waves emitted at the time 0 are received at the time t at a point R located in angular direction θ. When the point R is sufficiently far from the point S, the distance S'R from the point S' to the point R can be regarded as substantially equal to the distance S'R' from the point S' to a point R' illustrated in FIG. 10. Thus, the distance S'R between the point S' of the imaginary moving sound source at the time t and the observation point R is given by equation (1) below:

$$S'R \approx S'R' \approx S''R' = ct - Vt\cos\theta \tag{1}$$

where c is sound velocity. Since the number of waves contained within the distance S'R' is $f_0 t$, wavelength $\lambda(\theta)$ and frequency $f(\theta)$ observed in the angular direction $\theta$ are expressed by the following equations:

$$\lambda(\theta) = \frac{S'R'}{f_0 t} = \frac{ct - Vt\cos\theta}{f_0 t} = \frac{c - V\cos\theta}{f_0} \tag{2}$$

$$f(\theta) = \frac{c}{\lambda(\theta)} = \frac{f_0 c}{c - V\cos\theta} \tag{3}$$

Figure 11:
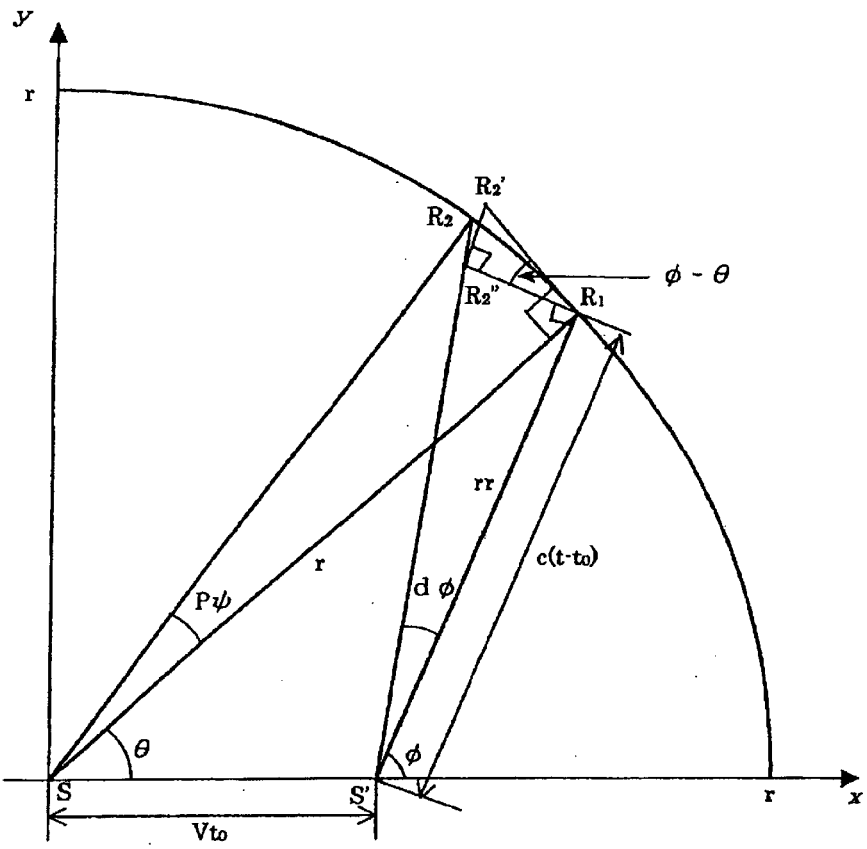
FIG. 11 is a diagram showing the geometric relationship of two transducer elements located adjacent to each other and the imaginary moving sound source.

FIG. 11 is a diagram showing the geometric relationship of a transducer element R1 at coordinates (r, $\theta$), a transducer element R2 located adjacent to the transducer element R1 and the imaginary moving sound source at the point S. As stated above, it is assumed that the imaginary moving sound source existing at the point S (origin) at the time 0 (t=0) moves along the x-axis at the constant speed V. Time to when ultrasonic waves received at the time t by the transducer element R1 at the coordinates (r, $\theta$) were emitted is obtained as follows.

Referring to FIG. 11, we obtain the following equation from the law of cosines with respect to a triangle SS'R1:

$$c^2(t-t_0)^2 = r^2 + V^2 t_0^2 - 2rVt_0 \cos\theta \tag{4}$$

Arranging equation (4) in the order of the power of $t_0$, $$(c^2 - V^2)t_0^2 + (2rV\cos\theta - 2c^2 t)t_0 + c^2 t^2 - r^2 = 0 \tag{5}$$

Solving the aforementioned quadratic equation (5) of $t_0$ in a range of $t_0 < t$, we obtain $$t_0 = \frac{-(2rV\cos\theta - 2c^2 t) - \sqrt{(2rV\cos\theta - 2c^2 t)^2 - 4(c^2 - V^2)(c^2 t^2 - r^2)}}{2(c^2 - V^2)} \tag{6}$$

The distance rr between the point S' of the imaginary moving sound source at the time $t_0$ and an angle $\phi$ that an apparent propagation direction of ultrasonic waves received by the transducer element R1 at the time t makes with the x-axis are obtained as follows using V, r, $\theta$ and $t_0$:

$$rr = \sqrt{(r\cos\theta - Vt_0)^2 + (r\sin\theta)^2} \tag{7}$$

$$\phi = \frac{r\sin\theta}{r\cos\theta - Vt_0} \tag{8}$$

Further, an angle $d\phi$ of the transducer element R1 viewed from the point S' from which the ultrasonic waves received by the transducer element R1 at the time t were emitted is obtained as follows using rr and $\phi$. Since the length of an arc R1R2 can be regarded as equal to the length of a line segment R1R2' and $\tan d\phi \approx d\phi$ when angular intervals P$\psi$ between adjacent transducer elements are small, $$R_1 R_2'' \approx rP\psi \cos(\phi - \theta) \approx rrd\phi \tag{9}$$

Thus, the angle $d\phi$ is given by equation (10) below:

$$d\phi \approx \frac{rP\psi\cos(\phi - \theta)}{rr} \tag{10}$$

Next, the amplitude of sound pressure of ultrasonic waves radiated by the transducer element R1 at the time t is obtained. Power $W_0$ detected by the transducer element R1 as it receives cylindrical waves emitted from the sound source at the point S at time t=0 is expressed as follows using a constant A:

$$W_0 = \frac{ArP\psi}{r} = AP\psi \tag{11}$$

Power W detected by the transducer element R1 as it receives cylindrical waves emitted from the sound source at the point S' at time t=$t_0$ is $$W = \frac{arrd\phi}{rr} = Ad\phi \tag{12}$$

Normalizing the amplitude of the sound pressure radiated by the transducer element R1 at time t=$t_0$ by the amplitude of the sound pressure radiated at time t=0, we obtain $$p = \sqrt{\frac{W}{W_0}} = \sqrt{\frac{d\phi}{P\psi}} = \sqrt{\frac{r\cos(\phi - \theta)}{rr}} \tag{13}$$

Introducing a transmission weight function w(t), the ultrasonic waves radiated by the transducer element R1 at the coordinates (r, $\theta$) at the time t are expressed as follows from the foregoing:

$$s(r, \theta, t) = w(t)\sqrt{\frac{r\cos(\phi - \theta)}{rr}} e^{j2\pi f_0 t_0} \quad |t| \leq T\max \tag{14}$$

where Tmax must be smaller than r/V.

First, a simulation was performed under the following conditions:

Sound velocity (c): 1500 m/s
Frequency of imaginary moving sound source ($f_0$): 24 kHz ($\lambda$=62.5 mm)
Speed of imaginary moving sound source (V): 30 m/s
Radius of circular arrangement of transducer elements (r): 240 mm
Number of transducer elements: 36 (at 0.67$\lambda$ intervals)
Shape and dimensions of each transducer element: 0.5$\lambda$× 0.5$\lambda$, square
Number of rows of transducer elements: 1
Transmission weight function: Gaussian 40%
Pulselength: 8 ms (−0.5r/V<t<0.5r/V)
Time waveform sampling intervals: 7.5 $\mu$s
Number of samples of time waveform: 8192
Spectrum calculation intervals: 16.3 Hz
Angular directions of calculation: 0°, 30°, 60°, 90°, 120°, 150°, 180°

Spectra of the ultrasonic waves were obtained from time waveforms of transducer element drive signals by fast Fourier transform (FFT) in individual angular directions under the above conditions. Then, a spectrum of the ultrasonic waves were obtained from a time waveform of a signal observed at a sufficiently far point (at a 100 m distance) in each angular direction by the FFT method.

Figure 12:
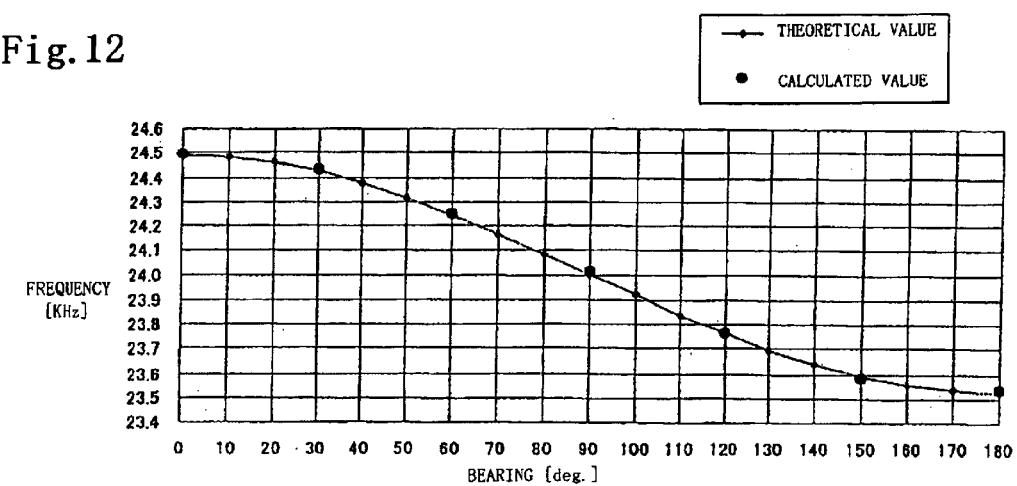
FIG. 12 is a diagram showing center frequencies produced in individual angular directions by a Doppler transmission method.
Figure 13:
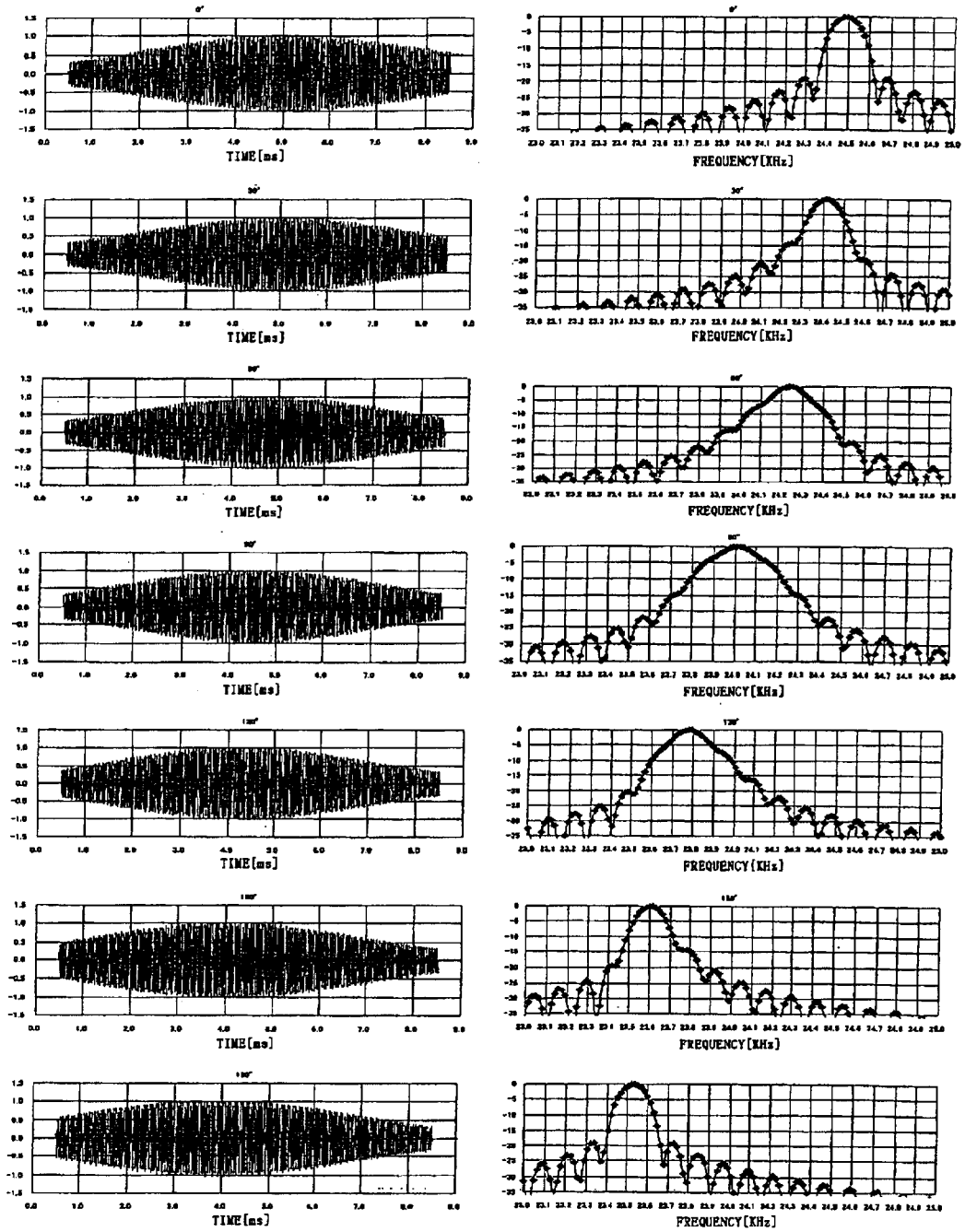
FIG. 13 is a diagram showing time waveforms of transducer element drive signals and their spectra fed in the individual angular directions.
Figure 14:
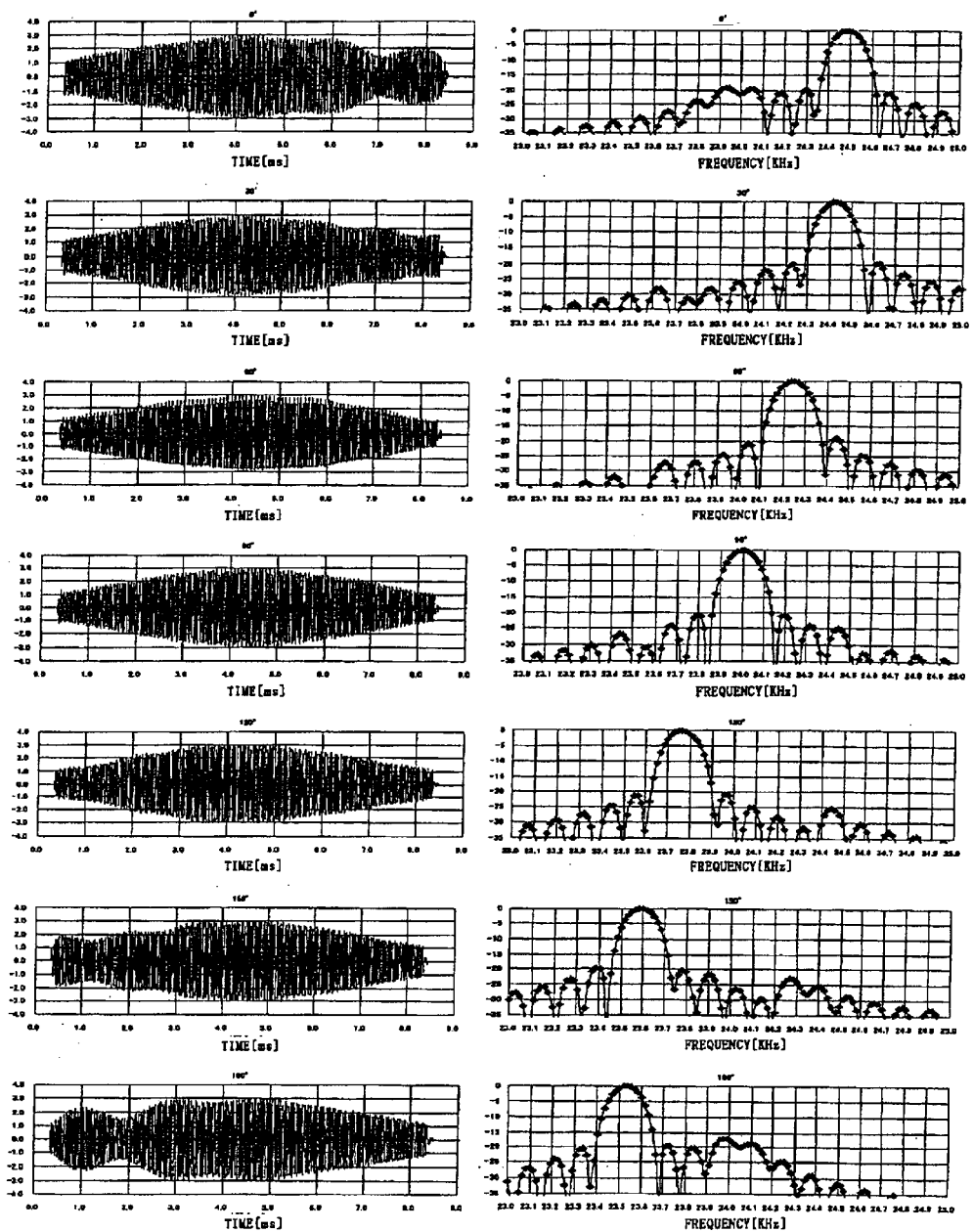
FIG. 14 is a diagram showing time waveforms of ultrasonic signals and their spectra observed at far points in the individual angular directions.

FIG. 12 shows theoretical values and calculated values obtained by the simulation of the center frequencies of ultrasonic signals observed at far points in the 0° to 180° directions, FIG. 13 shows time waveforms of transducer element drive signals and their spectra fed in the individual angular directions, and FIG. 14 shows time waveforms of the ultrasonic signals and their spectra observed at far points in the individual angular directions.

Shown at left in FIGS. 13 and 14 are the time waveforms and shown at right are the spectra. Also, shown in these Figures are the time waveforms and the spectra for the angular directions 0°, 30°, 60°, 90°, 120°, 150° and 180° from top to bottom, in which the horizontal axis of the time waveforms represents a period of time of 0.0 ms to 9.0 ms while the horizontal axis of the spectra represents a frequency range of 23.0 kHz to 25.0 kHz.

As can be seen from FIG. 13, the bandwidth of the spectrum of the transducer element drive signal progressively broadens as the direction varies farther away from the 0° or 180° direction. On the other hand, the spectra of the ultrasonic signals observed at far points have a specific frequency bandwidth regardless of the angular directions as shown in FIG. 14.

The aforementioned method of transmission in which a point sound source seems to virtually moving is hereinafter referred to as the Doppler transmission method.

To drive the individual transducer elements by the time waveforms shown in FIG. 13, the transmit DSP 25 shown in FIG. 9 should calculate the reference drive codes according to equation (14).

Relationship Between the Amount of Doppler Shift and Pulselength

The effect of variation in the moving speed of the imaginary moving sound source to the amount of Doppler shift and the effect of variation in the duration of burst waves (hereinafter referred to as the pulselength) to the transmitting time waveform and spectrum are discussed below.

A simulation was performed under the following conditions:

Sound velocity (c): 1500 m/s
Frequency of imaginary moving sound source ($f_0$): 24 kHz ($\lambda$=62.5 mm)
Speed of imaginary moving sound source (V): 10 m/s, 30 m/s, 50 m/s, 70 m/s, 90 m/s,
Radius of circular arrangement of transducer elements (r): 240 mm
Number of transducer elements: 48 (at 0.5$\lambda$ intervals)
Shape and dimensions of each transducer element: 0.5$\lambda$× 0.5$\lambda$, square
Number of rows of transducer elements: 1
Transmission weight function: Gaussian 40%
Time waveform sampling intervals: 7.5 $\mu$s
Number of samples of time waveform: 8192
Spectrum calculation intervals: 16.3 Hz
Angular directions of calculation: 180°
Pulselength: 2$\alpha$r/V ($\alpha$=0.5)

Shown in Table 1 are the results of the simulation.

TABLE 1

| Speed of sound source V (m/s) | Center frequency (kHz) | Pulse-length T (ms) | Bandwidth (−3 dB) B (kHz) | BT product (kHz · ms) | Max value of sub-levels (dB) |
| --- | --- | --- | --- | --- | --- |
| 10 | 23.84 | 24.00 | 0.043 | 1.032 | −20.0 |
| 30 | 23.53 | 8.00 | 0.127 | 1.016 | −19.9 |
| 50 | 23.23 | 4.80 | 0.210 | 1.008 | −19.8 |
| 70 | 22.93 | 3.43 | 0.295 | 1.011 | −19.8 |
| 90 | 22.64 | 2.67 | 0.379 | 1.011 | −19.8 |

As is recognized from Table 1, no waveform distortion occurs when the speed of the sound source is varied within a range of 10 to 90 m/s and the maximum value of sub-levels and BT product (i.e., the product of frequency bandwidth and the length of time) take approximately constant values. Therefore, as high a moving speed of the imaginary moving sound source should preferably be set as possible within a range in which Doppler frequencies fall within the frequency bandwidth of the transducer elements. If the moving speed of the imaginary moving sound source is so set, the rate of change in the frequency of transmitted and received signals with respect to changes in direction increases and the effect of frequency selection by a filter increases. This is disadvantageous for long-range detection, however, because the pulselength is limited.

Correction of the Amplitude of Sound Pressure of Transmitted Ultrasonic Signals

Described below is a method of reducing distortion of the time waveform and spectrum of a transducer element drive signal for the aforementioned 90° direction by correcting the amplitude of sound pressure of ultrasonic waves transmitted from the individual transducer elements of the transducer.

The amplitude of sound pressure at the position of each transducer element caused by the imaginary moving sound source is expressed by equation (13). Therefore, the amplitude of sound pressure of the ultrasonic waves transmitted by each transducer element of the transducer is also expressed by equation (13). Correction of the amplitude of this sound pressure is hereinafter referred to as correction (1).

When a moving range of the imaginary moving sound source broadens, the transmission weight function w(t) of the time waveform tends to become larger than Gaussian 40% which defines a desirable property. Thus, we use a method of correcting the amplitude of sound pressure of the ultrasonic waves transmitted from each transducer element for only scattering loss according to the distance from the imaginary moving sound source to center coordinates of the relevant transducer element. This correction is hereinafter referred to as correction (2).

$$P = \sqrt{\frac{r}{rr}} \qquad (15)$$

Figure 15:
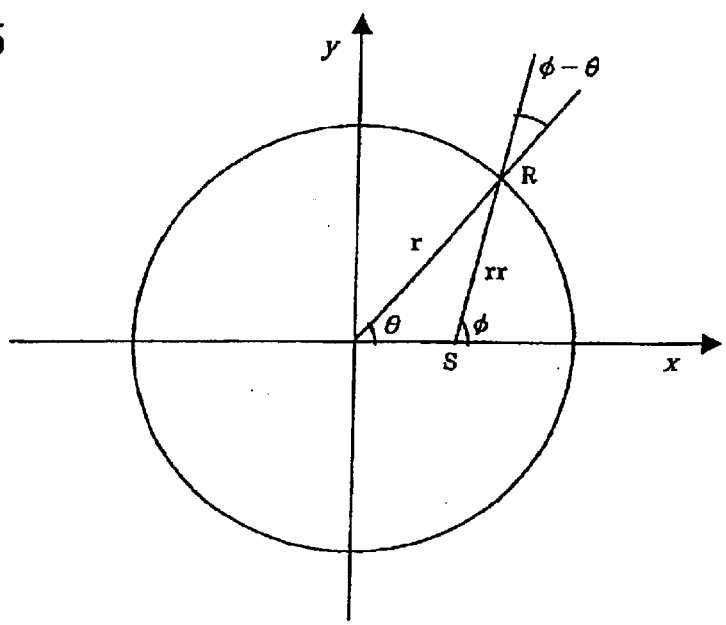
FIG. 15 is a diagram showing the relationship between the positions of the imaginary moving sound source and a transducer element.

FIG. 15 shows the relationship between the positions of the imaginary moving sound source S and a transducer element R. A simulation was performed under the following conditions:

Sound velocity (c): 1500 m/s
Frequency of imaginary moving sound source ($f_0$): 24 kHz ($\lambda$=62.5 mm)
Speed of imaginary moving sound source (V): 30 m/s
Radius of circular arrangement of transducer elements (r): 240 mm
Number of transducer elements: 36 (at 0.67$\lambda$ intervals)
Shape and dimensions of each transducer element: 0.5$\lambda$× 0.5$\lambda$, square
Number of rows of transducer elements: 1
Transmission weight function: Gaussian 40%
Time waveform sampling intervals: 7.5 $\mu$s
Number of samples of time waveform: 8192
Spectrum calculation intervals: 16.3 Hz
Angular directions of calculation: 180°
Pulselength: 4.8 ms, 8.0 ms, 11.2 ms, 14.4 ms Shown in Table 2 is a comparison of the results of the simulation obtained by using the aforementioned corrections (1) and (2).

TABLE 2

| Pulse- | Band-width B (kHz) | | BT product (kHz · ms) | | Max value of sub-levels (dB) | |
|---|---|---|---|---|---|---|
| length T (ms) | Correction (1) | Correction (2) | Correction (1) | Correction (2) | Correction (1) | Correction (2) |
| α | | | | | | |
| 0.3  4.8 | 0.209 | 0.213 | 1.003 | 1.022 | −19.7 | −19.5 |
| 0.5  8.0 | 0.129 | 0.126 | 1.032 | 1.008 | −20.4 | −19.9 |
| 0.7  11.2 | 0.0935 | 0.0907 | 1.047 | 1.016 | −21.3 | −19.8 |
| 0.9  14.4 | 0.0755 | 0.0714 | 1.087 | 1.028 | −22.4 | −19.9 |

Figure 16:
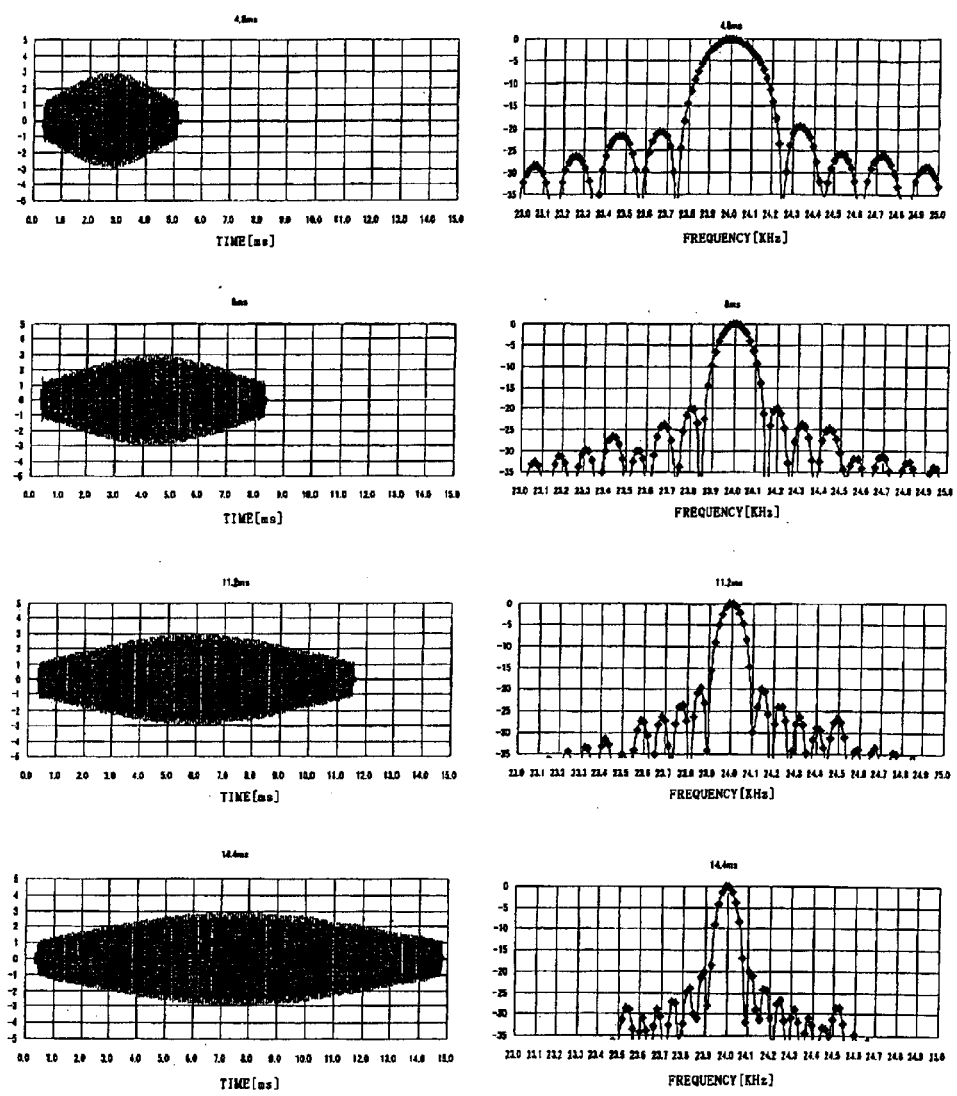
FIG. 16 is a diagram showing examples of time waveforms of transmitted ultrasonic signals and their spectra for a 90° direction.

FIG. 16 is a diagram showing examples of time waveforms and their spectra obtained as a result of the correction (2), in which shown at left are the time waveforms and shown at right are the spectra. Also, shown in this Figure are the time waveforms and the spectra for pulselengths 4.8 ms, 8.0 ms, 11.2 ms and 14.4 ms from top to bottom, in which the horizontal axis of the time waveforms represents a period of time of 0.0 ms to 15.0 ms while the horizontal axis of the spectra represents a frequency range of 23.0 kHz to 25.0 kHz.

As is recognized from Table 2, the BT product increases and side lobe levels of the spectra decrease when the moving range of the imaginary moving sound source broadens in the case of the correction (1). A potential cause of this tendency is that a change in the weight of the time waveform has become larger than Gaussian 40% which defines a desirable property.

In the case of the correction (2), on the other hand, both the BT product and the maximum value of sub-levels are approximately constant.

On the ground of the aforementioned results, the correction (2) is considered to be closer to an ideal method of correction.

Moving Range of Imaginary Moving Sound Source

Described below is how intervals between adjacent transducer elements and the moving range of the imaginary moving sound source affect the transmitted ultrasonic signals.

A simulation was performed under the following conditions:
Sound velocity (c): 1500 m/s
Frequency of imaginary moving sound source ($f_0$): 24 kHz ($\lambda$=62.5 mm)
Speed of imaginary moving sound source (V): 30 m/s
Radius of circular arrangement of transducer elements (r): 240 mm
Number of transducer elements: 36 (at 0.67λ intervals), 40 (at 0.6λ intervals), 48 (at 0.5λ intervals),
Shape and dimensions of each transducer element: 0.5λ× 0.5λ, square
Number of rows of transducer elements: 1
Transmission weight function: Gaussian 40%
Time waveform sampling intervals: 7.5 μs
Number of samples of time waveform: 8192
Spectrum calculation intervals: 16.3 Hz
Angular directions of calculation: 180°
Method of correcting the amplitude of sound pressure:
Scattering loss only (correction (2))

Here, it is assumed that each transducer element transmits an ultrasonic signal during a period when the imaginary moving sound source moves from a point (−αr, 0) to a point (αr, 0), so that the pulselength T is 2αr/V. In this simulation, the time waveforms of the ultrasonic signals and their spectra observed at far points in the individual angular directions are examined when the coefficient α is varied to 5 different values of 0.1, 0.3, 0.5, 0.7 and 0.9.

Figure 17:
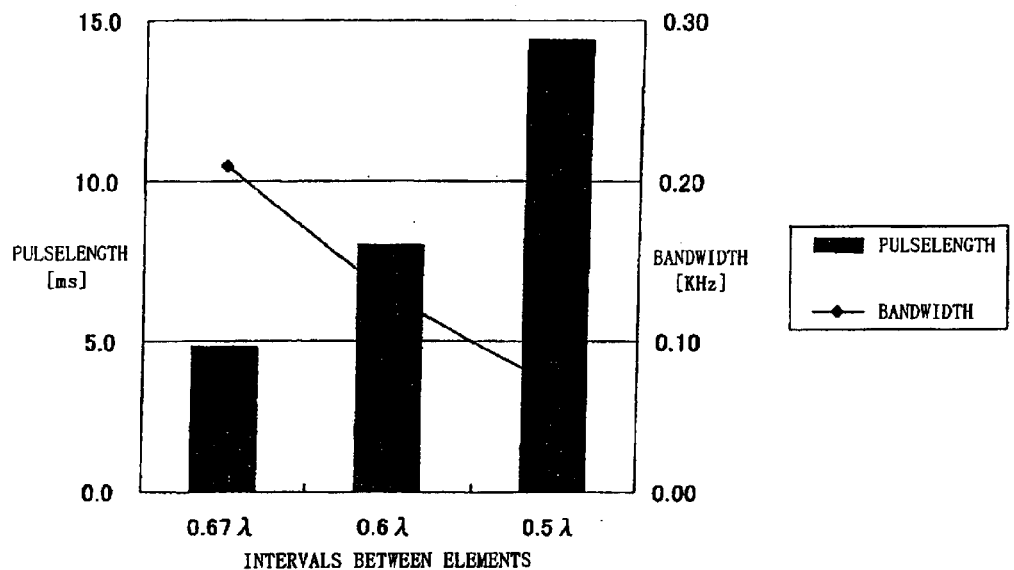
FIG. 17 is a diagram showing pulselengths and limits of bandwidths at different intervals between adjacent transducer elements.

Table 1 shows characteristics of the transmitted ultrasonic signals and FIG. 17 shows pulselengths and limits of bandwidths at different intervals between adjacent transducer elements.

TABLE 3

| Pulse-length | −3 dB bandwidth B (kHz) | | | BT product (kHz · ms) | | | Max value of sub-levels (dB) | | |
|---|---|---|---|---|---|---|---|---|---|
| α  T (ms) | 0.67λ | 0.6λ | 0.5λ | 0.67λ | 0.6λ | 0.5λ | 0.67λ | 0.6λ | 0.5λ |
| 0.1  1.6 | 0.63 | 0.64 | 0.64 | 1.00 | 1.02 | 1.02 | −19.2 | −19.3 | −19.7 |
| 0.3  4.8 | 0.21 | 0.21 | 0.21 | 1.01 | 1.02 | 1.02 | −17.9 | −19.4 | −19.8 |
| 0.5  8.0 | 0.12 | 0.13 | 0.13 | 0.98 | 1.02 | 1.02 | −16.7 | −19.4 | −19.9 |
| 0.7  11.2 | 0.09 | 0.09 | 0.09 | 0.99 | 1.02 | 1.02 | −12.6 | −19.0 | −19.9 |
| 0.9  14.4 | 0.07 | 0.07 | 0.07 | 1.01 | 1.03 | 1.01 | −8.6 | −14.9 | −19.8 |

As is apparent from the results shown above, there is a tendency for the waveform of the transmitted ultrasonic signal to become deformed and for side lobe levels of the spectra to increase as the moving range of the imaginary moving sound source broadens. It can be seen, however, signals become less deformed as the intervals between adjacent transducer elements are decreased. Judging from the amount of distortion of the time waveforms of the ultrasonic signals and the side lobe levels, no serious problem occurs if $\alpha \leq 0.3$ at an element-to-element interval of 0.67λ, $\alpha \leq 0.5$ at an element-to-element interval of 0.6λ, and $\alpha \leq 0.9$ at an element-to-element interval of 0.5λ.

Bearing Discrimination Versus Pulselength

Next, a method of increasing bearing discrimination and a maximum achievable pulselength are described formulating the relationship between the bearing discrimination and the pulselength.

When the imaginary moving sound source transmitting at frequency $f_0$ moves at moving speed V which is sufficiently small as compared with the sound velocity c, frequency f(θ) observed in angular direction θ is given by equation (16) below:

$$f(\theta) = f_0 \frac{c}{c - V\cos\theta} = f_0 \frac{1}{1 - \frac{V}{c}\cos\theta} \approx f_0\left(1 + \frac{V}{c}\cos\theta\right) \quad (16)$$

Expressing the range of directional frequency change due to the Doppler effect as Δf, $$\Delta f = f(0) = f(\pi) \approx f_0 \frac{2V}{c} \quad (17)$$

Expressing the bandwidth of the received echo signal as $B_0$, the bearing discrimination M (the reciprocal of a Q factor) is defined as follows:

$$M = \frac{B_0}{\Delta f} = \frac{cB_0}{2f_0 V} \quad (18)$$

Figure 18:
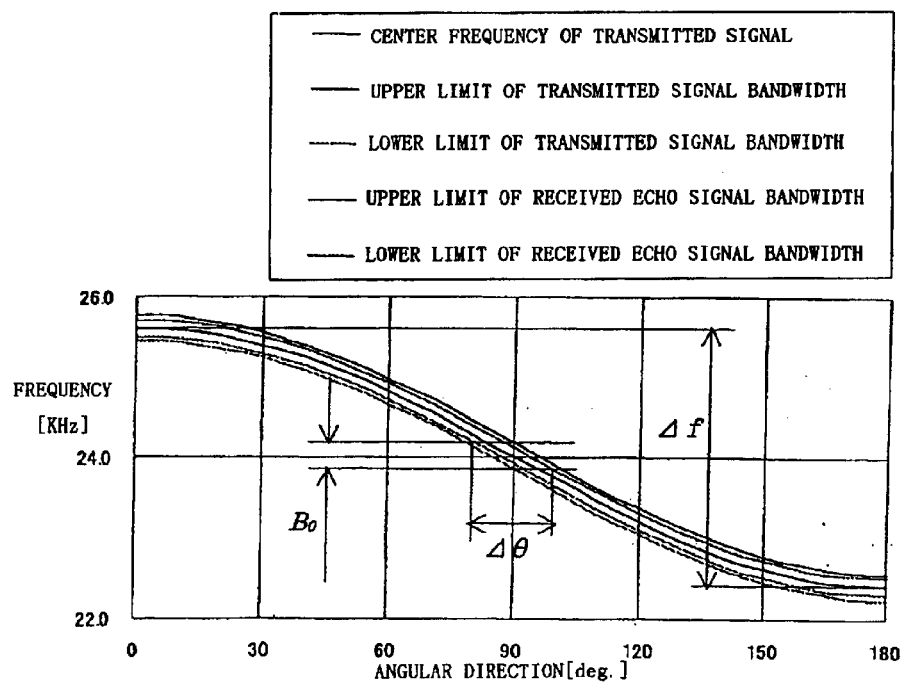
FIG. 18 is a diagram showing the relationship between the frequency bandwidth of received echo signals and the frequency bandwidth of transmitted signals.

FIG. 18 shows the relationship between the frequency bandwidth of received echo signals and the frequency bandwidth of transmitted signals. Shown in this Figure are the upper limit of the bandwidth of the received echo signal, the upper limit of the bandwidth of the transmitted signal, the center frequency of the transmitted signal, the lower limit of the bandwidth of the transmitted signal and the lower limit of the bandwidth of the received echo signal from top to bottom.

As shown in FIG. 18, angular resolution $\Delta\theta$ is obtained from the relationship between the frequency bandwidth of the received echo signal and the frequency bandwidth of the transmitted signal. Therefore, the angular resolution $\Delta\theta$ can be reduced by decreasing the bearing discrimination M.

Expressing a maximum value of target speed as Vmax and Doppler frequency as fd, and defining the received echo signal bandwidth $B_0$ as follows:

$$B_0 = 2fd = f_0 \frac{4V_{max}}{c} \quad (19)$$

the bearing discrimination M can be expressed by equation (20) below:

$$M = \frac{2V_{max}}{V} \quad (20)$$

It is understood from this equation that the moving speed of a sound source should be made higher relative to the target speed in order to increase the bearing discrimination M. To achieve a bearing discrimination 0.1 when the target speed is 5 m/s, for example, the moving speed of the sound source should be made equal to 100 m/s.

Expressing the radius of the transducer as r, maximum pulselength Tmax is $$T\max = \frac{2r}{V} \quad (21)$$

Introducing equation (18), equation (21) above can be rewritten as follows:

$$T\max = \frac{4Mf_0 r}{cB_0} = \frac{r}{\lambda_0} \times \frac{4M}{B_0} \quad (22)$$

It is recognized from equation (22) above that the maximum pulselength Tmax is determined by the ratio of the wavelength to the radius of the transducer, given the bearing discrimination M and the received echo signal bandwidth $B_0$. Substituting equation (19) into equation (22):

$$T\max = \frac{Mr}{V_{max}} \quad (23)$$

It is understood from equation (23) that the maximum achievable pulselength is determined by three factors, that is, the bearing discrimination M, the radius r of the transducer and the maximum value Vmax of target speed, and does not depend on the transmitting frequency. Since distortion of the time waveform increases when the intervals between adjacent transducer elements are increased, however, the radius r of the transducer should be increased within a range in which the effect of the waveform distortion does not cause a problem.

Effect of Reducing Grating Lobe Levels

Next, an effect of reducing grating lobe levels by passing echo signals received from different directions through individual bandpass filters is described.

A simulation was performed under the following conditions:

<Physical Specifications>

Radius of circular arrangement of transducer elements (r): 240 mm

Number of transducer elements; 36 (at 0.67λ intervals)

Shape and dimensions of each transducer element: 0.5λ× 0.5λ, square

<Transmission>

Frequency of imaginary moving sound source ($f_0$): 24 kHz (λ=62.5 mm)

Speed of imaginary moving sound source (V): 30 m/s

Pulselength (T): 0.8 ms (α=0.5)

Transmission time waveform weight function: Gaussian 40%

Method of correcting the amplitude of sound pressure:

Scattering loss only (correction (2))

<Reception>

Angular direction of reception: 90°

Aperture angle of reception: 90° (full angle)

Weight function applied to transducer elements within aperture angle of reception: Gaussian 20%

Center frequency of receiving filter: 24 kHz

Bandwidth of receiving filter: 200 Hz (Gaussian characteristic −3 dB width)

Degree of receiving filters: 200 degrees

Time waveform sampling intervals: 35 μs (complex sampling)

Figure 19:
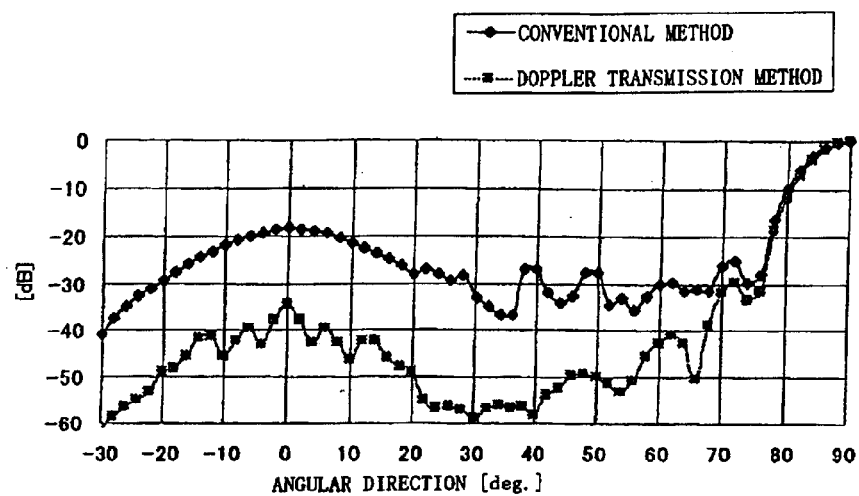
FIG. 19 is a diagram showing synthesized transmitting and receiving directional characteristics achieved by the Doppler transmission method and a conventional method.

FIG. 19 shows synthesized transmitting and receiving directional characteristics achieved by the aforementioned Doppler transmission method and a conventional method not using the Doppler transmission method.

The grating lobe level is decreased by approximately 16.5 dB by using the Doppler transmission method as described above compared to the conventional method.

Spherical Transducer

While the foregoing examples employ a cylinder-shaped transducer with a plurality of transducer elements arranged on its cylindrical outer surface, an example shown below employs a sphere-shaped transducer with a plurality of transducer elements arranged on its spherical surface.

Figure 20:
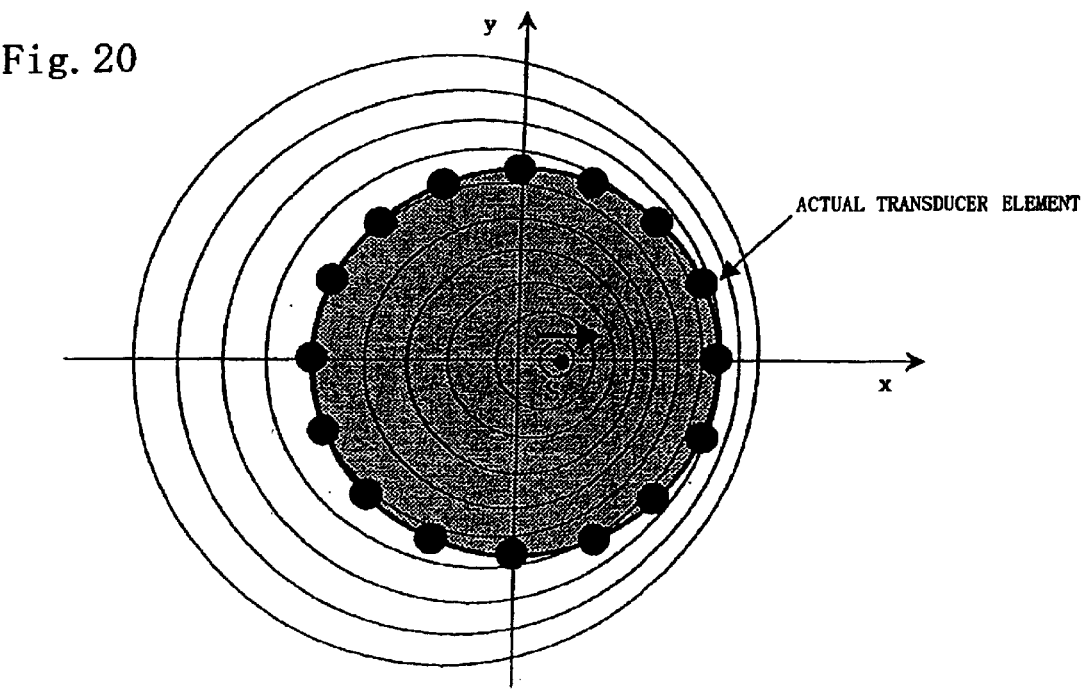
FIG. 20 is a diagram showing the relationship between a sound field produced by an imaginary moving sound source existing in a horizontal plane containing the center of a spherical transducer and a sound field to be produced by actual transducer elements.

FIG. 20 shows the relationship between a sound field produced by an imaginary moving sound source existing in a horizontal plane containing the center of the spherical transducer and a sound field to be produced by actual transducer elements. Designated by the letter S in this Figure is the imaginary moving sound source and multiple eccentric circles are equiphase contours of the sound field produced by the imaginary moving sound source S. Solid circles arranged in a circle indicate the positions of the actual transducer elements. Therefore, positions between adjacent eccentric circles at the position of each transducer element represent the phases of ultrasonic waves to be emitted by the relevant transducer element. Also, the interval between adjacent eccentric circles represents the wavelength (frequency) of the ultrasonic waves to be emitted by each transducer element.

Here, it is assumed that the imaginary moving sound source S moves at a constant speed straight along the x-axis in the horizontal plane containing the center of the spherical transducer as shown in FIG. 20. In this situation, a Doppler-shifted sound field is produced inside the transducer. It is further assumed that the individual transducer elements existing in the horizontal plane containing the center of the spherical transducer emit ultrasonic waves equivalent to ultrasonic waves emitted from the imaginary moving sound source S. Signals obtained based on this assumption are regarded as reference signals in individual directions. Signals controllably delayed from the reference signals according to the tilt angle are fed into the transducer elements within each aperture angle in order to form a transmitting beam in which the transmitting frequency varies with angular directions.

During the receive cycle, echo signals received by the individual transducer elements within the aperture angle are band-limited by performing filtering operation according to Doppler frequencies in individual directions and controllably delayed according to the tilt angle and angular directions in order to form a receiving beam.

A simulation was performed under the following conditions:

<Physical Specifications of Transducer>
Arrangement algorithm: Transducer elements arranged at individual vertices of a polyhedron having 272 faces modified from a dodecahedron (spherical surface equipartition)
Radius of circular arrangement of transducer elements (r): 210 mm
Radius of each transducer element: 19 mm (single transducer element directivity correction coefficient=0.7)
<Transmission>
Frequency of imaginary moving sound source ($f_0$): 24 kHz ($\lambda$=62.5 mm)
Speed of imaginary moving sound source (V): 30 m/s
Moving range of imaginary moving sound source: $-0.5r<x<0.5r$
Pulselength (T): 7.0 ms
Transmission time waveform weight function: Gaussian 40%
Method of correcting the amplitude of sound pressure:
Scattering loss in two-dimensional sound field only (correction (2))
Tilt angle: 0° (horizontal plane)
Aperture angle of transmission: 50° (half angle)
Weight function applied to transducer elements within aperture angle of transmission: Gaussian 20%
Time waveform sampling intervals: 35 $\mu$s, 2048 samples (complex sampling)
<Reception>
Angular directions of reception: 0°, 90° (Counterclockwise direction is taken as positive with reference to the positive direction of the x-axis)
Aperture angle of reception: 90° (half angle)
Weight function applied to transducer elements within aperture angle of reception: Gaussian 20%
Center frequency of receiving filter: 24.5 kHz (at angular direction of reception: 0°), 24 kHz (at angular direction of reception: 90°)
Bandwidth of receiving filter: 200 Hz (Gaussian characteristic −3 dB width)
Degree of receiving filters: 200 degrees
Time waveform sampling intervals: 35 $\mu$s, 512 samples (complex sampling)
<Range of Directivity Calculation>
Angular directions: 0°<$\psi$<90° (5° intervals)
Vertical direction: 0°

The aforementioned single transducer element directivity correction coefficient is a correction coefficient (0.7 in this example) applied to angular direction $\theta$ when the directivity of a single transducer element is expressed as Jinc×cos0.7$\theta$, where Jinc is a function obtained from a Bessel function indicating theoretical directivity of a circular disk transducer.

Figure 21:
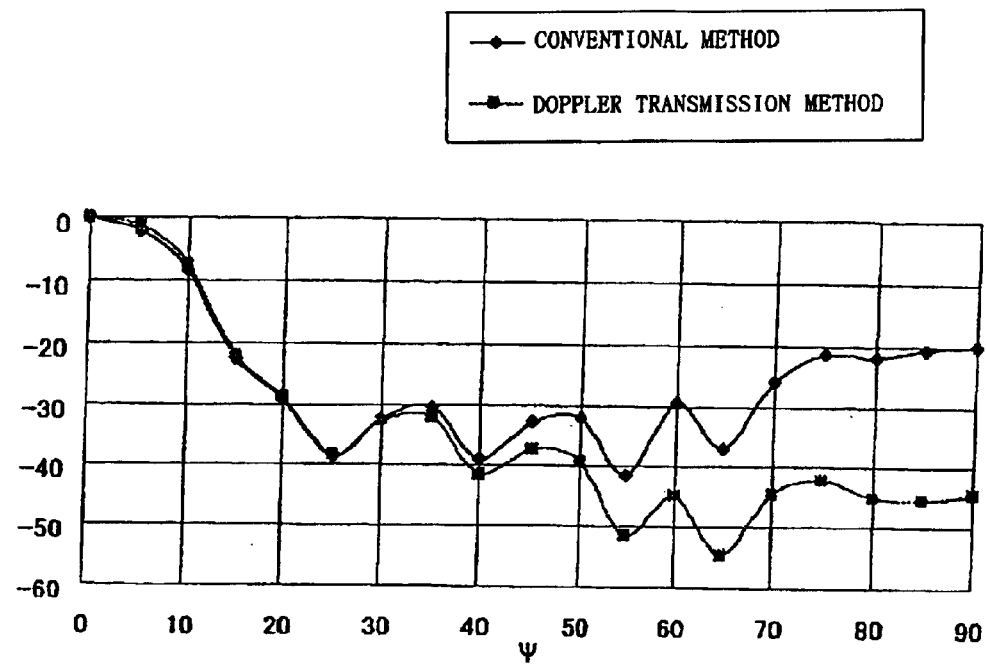
FIG. 21 is a diagram showing overall transmitting and receiving directional characteristics achieved by the Doppler transmission method and the conventional method.
Figure 21:
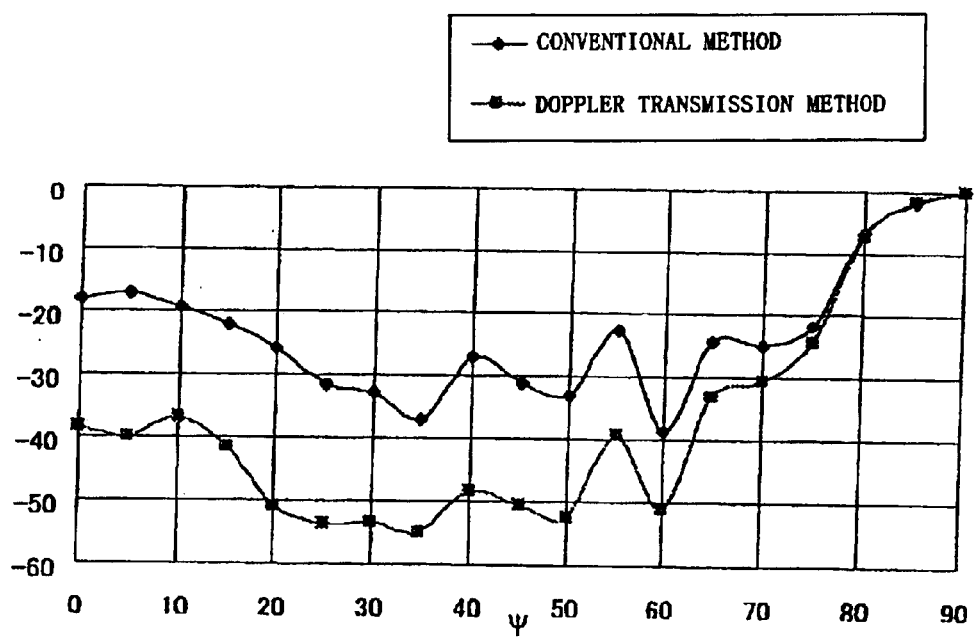

Shown in FIG. 21 is the result of comparison of overall transmitting and receiving directional characteristics in 0° and 90° angular directions, in which an upper graph indicates the characteristics in the 0° direction and a lower graph indicates the characteristics in the 90° direction. The expression "Doppler transmission method" is intended here to include bandpass filtering operation applied to the received echo signals as well.

As is apparent from the aforementioned result, it is possible to decrease the grating lobe level by approximately 20 dB by use of the Doppler transmission method. It is also recognized that the Doppler transmission method serves to decrease overall side lobe levels, particularly in the 90° direction in which the rate of frequency change is high.

Pulse Expansion Method

A pulse expansion method performed by convolution of burst waves with an FM signal is now described. In this method, signals to be convoluted with the FM signal need not necessarily be signals produced by the Doppler transmission method.

According to the aforementioned Doppler transmission method, the imaginary moving sound source can imaginarily move only within the circle enclosed by the transducer elements of the transducer, and the moving speed of the imaginary moving sound source is determined by the amount of a necessary Doppler shift. As a result, the upper limit of the duration of burst waves, or drive signals, is limited. Consequently, energy carried by the drive signals of one transmission cycle is limited, which is critical when it is desired to detect far targets. To cope with this problem, the invention employs a method of expanding the pulselength by convoluting the drive signals with linear-frequency modulated waves (hereinafter referred to as LFM signals), or so-called chirp waves.

Described first in the following is a case where the pulselength is expanded by convoluting the LFM signals into long-range observation signals of drive signals emitted by the Doppler transmission method.

Figure 22:
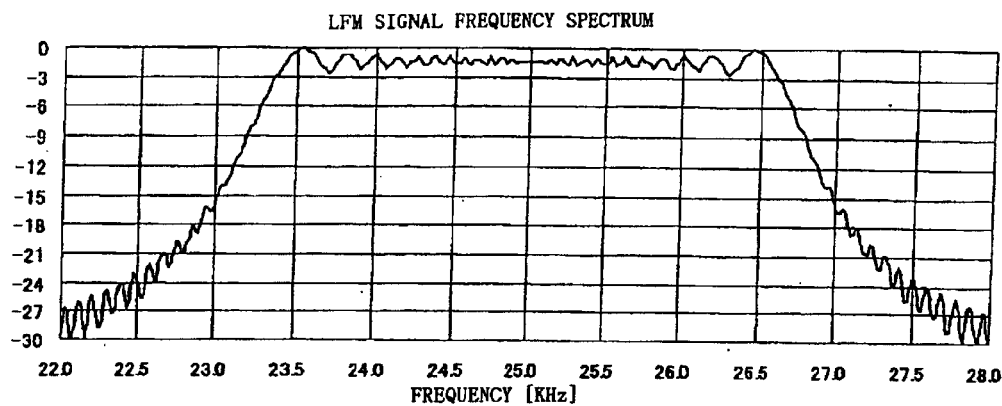
FIG. 22 is a diagram showing the spectrum of a linear-frequency modulated (LFM) signal.
Figure 23:
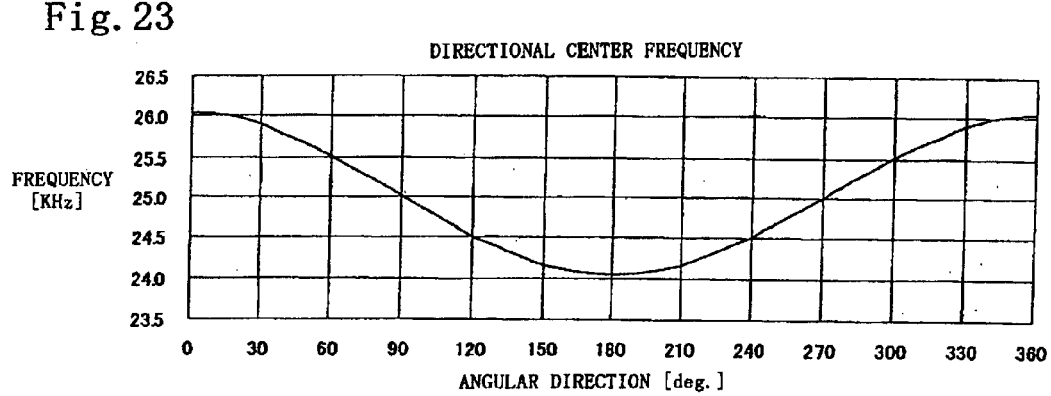
FIG. 23 is a diagram showing theoretical values of directional center frequencies of drive signals observed at a far point and theoretical values of directional delay times observed at the far point introduced by convolution with the LFM signal.
Figure 23:
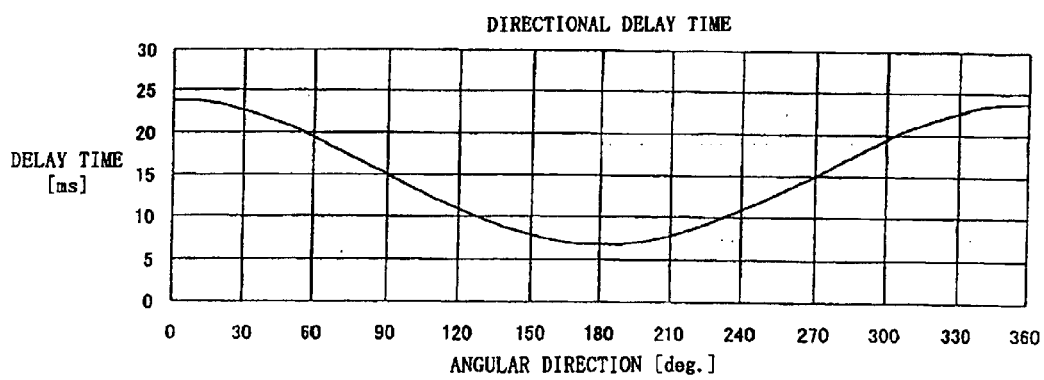

A simulation was performed under the following conditions:

<Physical Specifications of Transducer>
Radius of circular arrangement of transducer elements (r): 240 mm
Number of transducer elements: 36
<Directional Characteristics of Single Transducer Element>
Radius of single transducer element: 19 mm
Directivity correction coefficient:
<Characteristics of Imaginary Moving Sound Source>
Transmitting frequency: 25 kHz
Moving speed: 60 m/s (from 180° to 0° direction)
Sound velocity (c): 1500 m/s
Range of directional frequency change: 2 kHz
Moving range: ±0.3R (R=radius of transducer)
Transmitting pulselength: 2.4 ms
<Amplitude of Signals Emitted by Doppler Transmission Method Before Convolution>
Gaussian 20%+scattering loss correction <Characteristics of LFM Signal for Convolution>
Center frequency: 24 kHz
Frequency sweep range: 3.5 kHz (between 23.25 kHz and 26.75 kHz)
Pulselength: 30 ms
Envelope: All 1 (constant amplitude)
<Sampling Conditions>
Number of samples: 16384
Sampling intervals: 2.5 μs FIG. 22 shows the spectrum of the LFM signal used in the pulse expansion method. While the amplitude of the LFM signal is constant, its frequency varies from 23.25 kHz to 26.75 kHz with the lapse of time. FIG. 23 shows theoretical values of directional center frequencies of the drive signals observed at a far point and theoretical values of directional delay times observed at the far point introduced by convolution with the LFM signal.

Figure 24A:
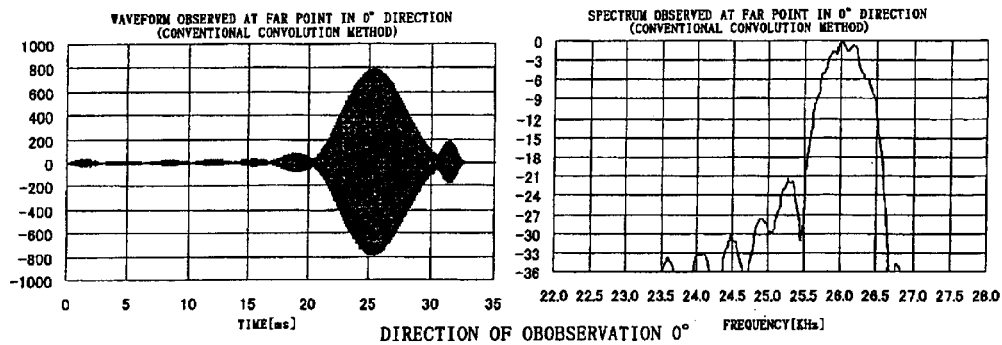
FIGS. 24A–24C are diagrams showing time waveforms and spectra of signals obtained by convoluting the LFM signal into signals transmitted by the Doppler transmission method as they are observed at the far point.
Figure 24B:
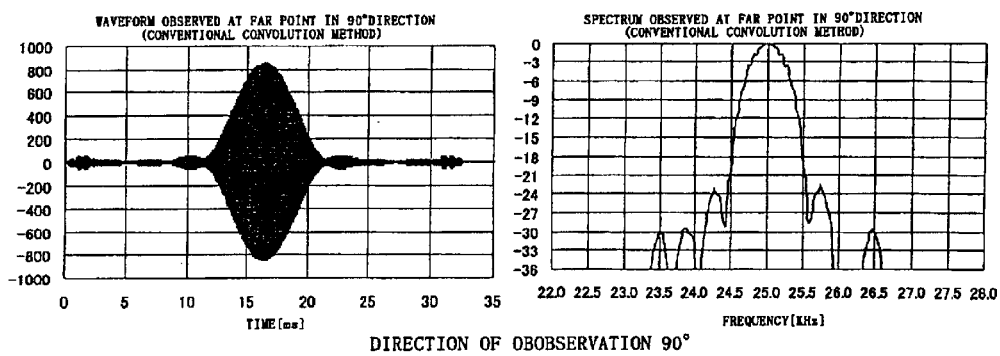
Figure 24C:
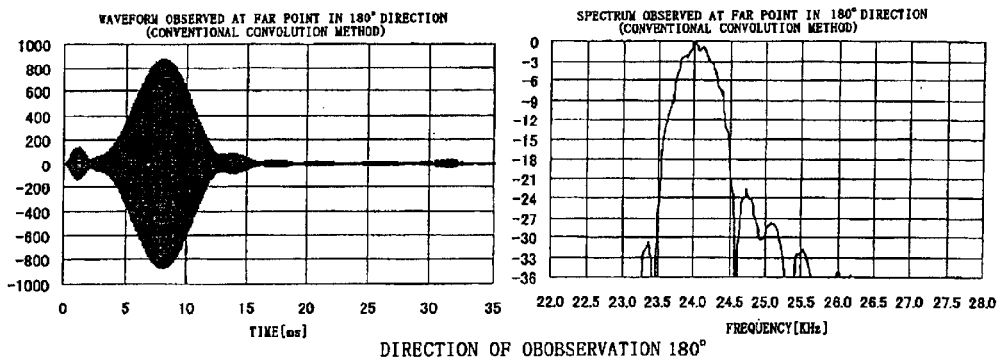

FIGS. 24A–24C show time waveforms and spectra of signals obtained by convoluting the LFM signal into signals transmitted by the Doppler transmission method as they are observed at 100 m far points in the 0°, 90° and 180° directions, respectively. In these Figures, shown at left are the time waveforms and shown at right are the spectra, in which the horizontal axis of the time waveforms represents a period of time of 0.0 ms to 35.0 ms while the horizontal axis of the spectra represents a frequency range of 22.0 kHz to 28.0 kHz (as is so in FIGS. 25A–25C, FIGS. 26A–26C, FIGS. 27A–27C and FIGS. 28A–28C given in the following).

As can be seen from these Figures, it is possible to expand the pulselength up to about 10 ms by convoluting the LFM signal of a pulselength of 30 ms into the drive signal whose pulselength of the time waveform main lobe is approximately 2.4 ms. The bandwidth of the drive signal spectrum after convolution is equal to that of the drive signal spectrum before convolution.

As there is linearity in convolution operation, we examined a case where the individual transducer elements were driven by signals produced by previously convoluting drive signals fed into the transducer elements obtained by the aforementioned Doppler transmission method with the LFM signal.

Figure 25A:
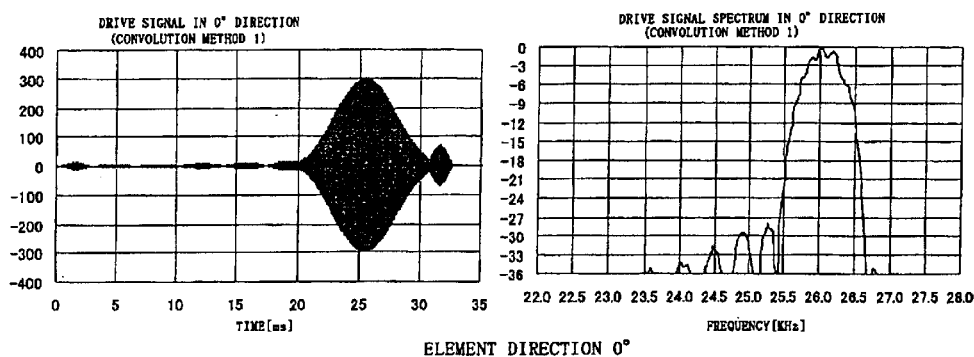
FIGS. 25A–25C are diagrams showing time waveforms and spectra of signals produced by previously convoluting drive signals fed into the individual transducer elements.
Figure 25B:
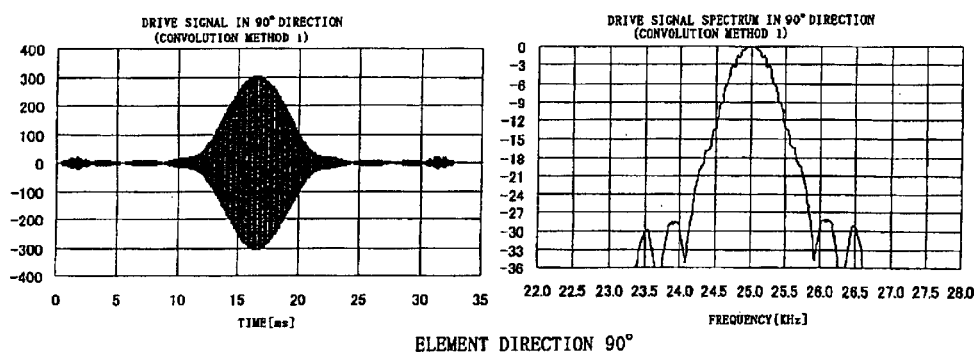
Figure 25C:
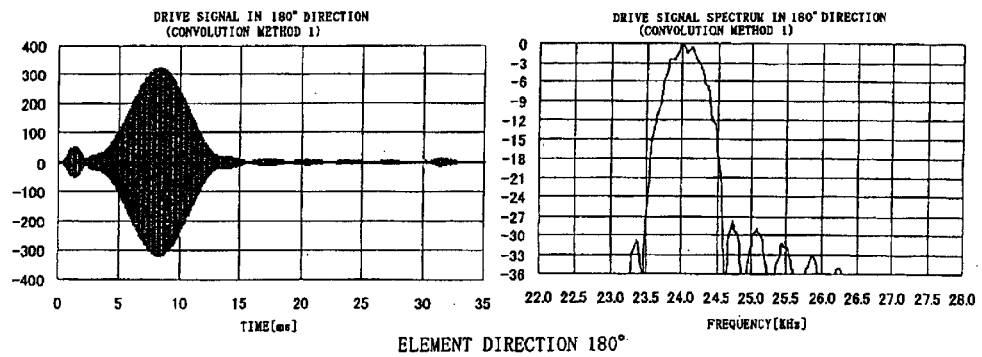

FIGS. 25A–25C show time waveforms and spectra of signals produced by convoluting the LFM signal into the drive signals obtained by the Doppler transmission method. As can be seen from these Figures, the pulselength of the drive signals is expanded to about 10 ms and delay times are introduced according to the center frequency as expected by theory. The bandwidth of the drive signal spectrum after convolution with the LFM signal is equal to that of the drive signal spectrum before convolution.

Figure 26A:
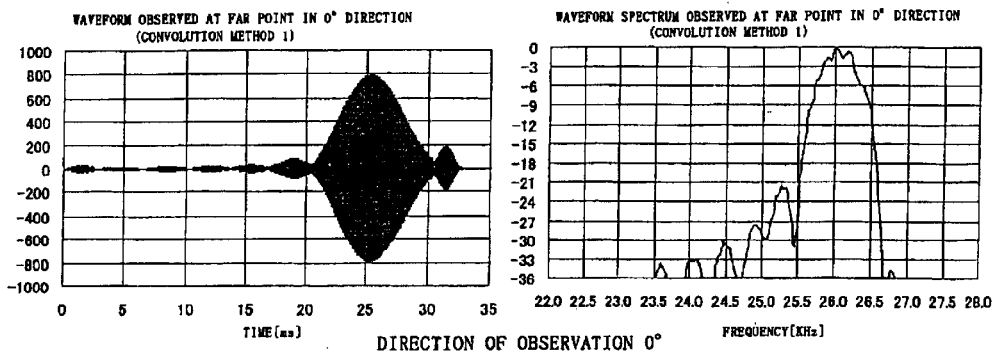
FIGS. 26A–26C are diagrams showing time waveforms and spectra of ultrasonic signals observed at far points when the individual transducer elements are driven by the drive signals shown in FIGS. 25A–25C.
Figure 26B:
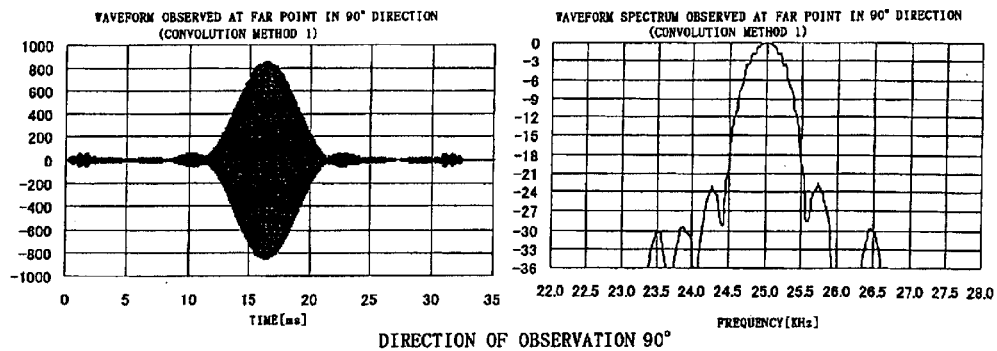
Figure 26C:
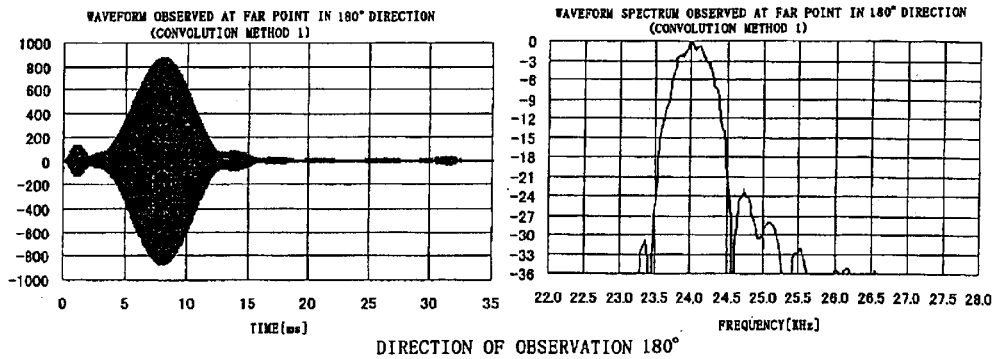

FIGS. 26A–26C show time waveforms and spectra of ultrasonic signals observed at the 100 m far point when the individual transducer elements are driven by signals produced by previously convoluting the LFM signal into the drive signals. As can be seen from these Figures, the time waveforms and the spectra observed at the far point are same as those of the signals obtained by convoluting the LFM signal into the signals observed at the far point.

It is understood from the results shown above that it is possible to obtain the drive signals whose pulselength is approximately 10 ms and center frequency varies with angular directions according to the theory by emitting ultrasonic signals in which the LFM signal is previously convoluted from the individual transducer elements.

Signals received by the individual transducer elements, which are echo signals of the pulselength-expanded transmitted signals, are convoluted with an LFM signal of a constant amplitude whose frequency varies from 26.75 kHz to 23.25 kHz with the lapse of time that is obtained by reversing the time axis of the FM signal used for convolution in the transmit cycle. As a result, the pulselength of the received echo signals is compressed to an original pulselength and resolution on the time axis, or range discrimination, is increased.

While the pulselength is expanded by convoluting the drive signals with the LFM signal in the aforementioned example, a stepped-frequency modulated signal whose frequency varies in a steplike fashion with the lapse of time may be used for convolution instead of the LFM signal.

Removing Time Waveform Side Lobes

We now examine a case where the pulselength of the drive signals is limited to the width of the main lobe by a convolution method.

When the ultrasonic signals are emitted by the aforementioned method of convolution, the time waveforms of the signals and the signals observed at the far point contain side lobes as shown in FIGS. 26A–26C. (The convolution method described above is hereinafter referred to as convolution method (1).) These side lobes work as an impediment to target detection. Described below is a method of eliminating the side lobes of the time waveforms of the drive signals. (This method of convolution is hereinafter referred to as convolution method (2).)

Figure 27A:
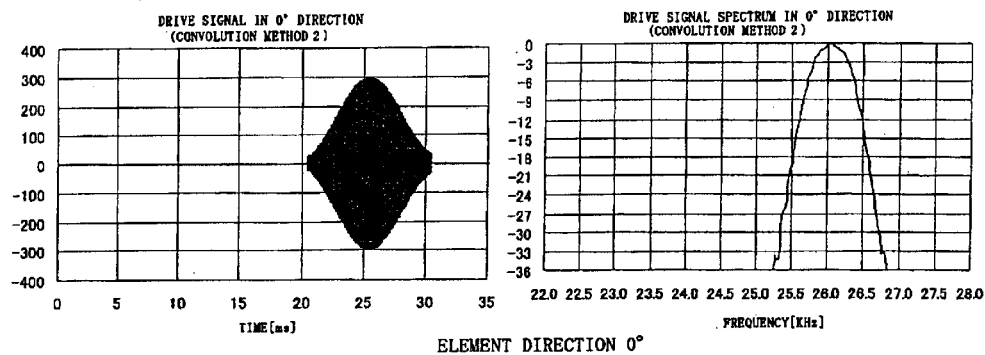
FIGS. 27A–27C are diagrams showing time waveforms and spectra of transducer element drive signals obtained when their side lobes on time axis are eliminated.
Figure 27B:
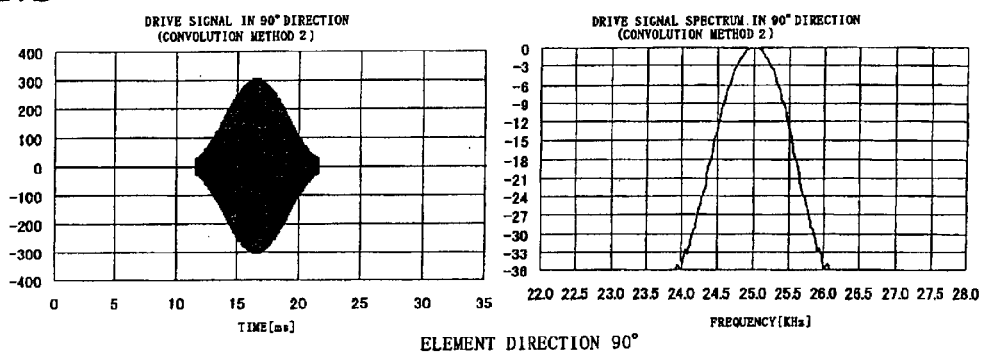
Figure 27C:
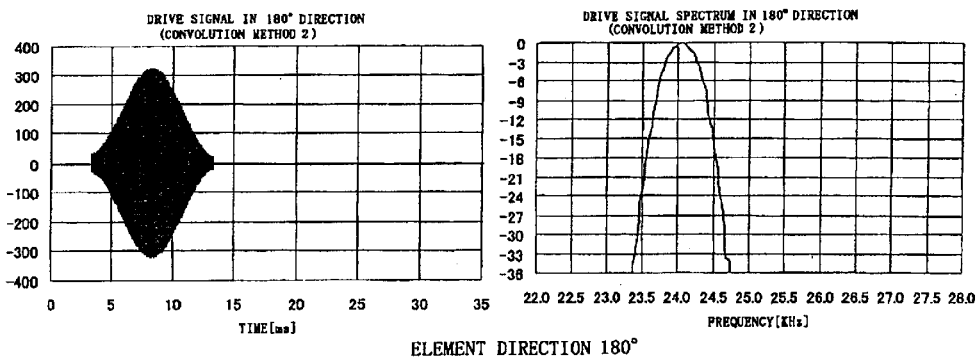

FIGS. 27A–27C show time waveforms and spectra of signals obtained by limiting the pulselength of the drive signals to approximately 10 ms which is the width of their main lobe. As can be seen from these Figures, side lobe levels of the spectra of the drive signals drop to −36 dB or less.

Figure 28A:
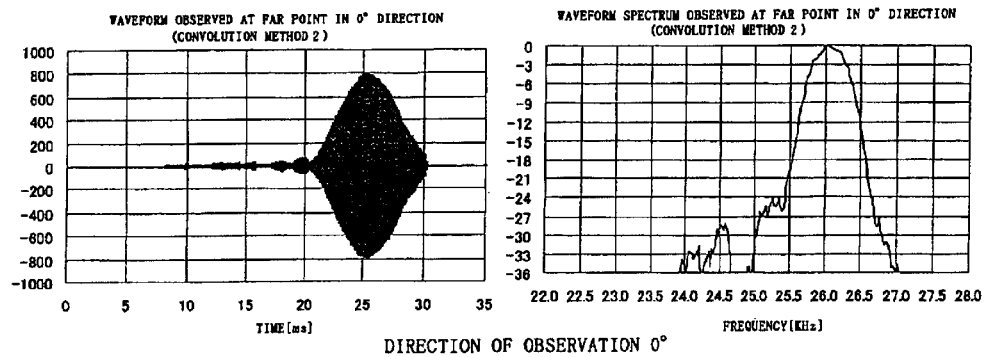
FIGS. 28A–28C are diagrams showing time waveforms and spectra of ultrasonic signals observed at the far points when the individual transducer elements are driven by the drive signals shown in FIGS. 27A–27C.
Figure 28B:
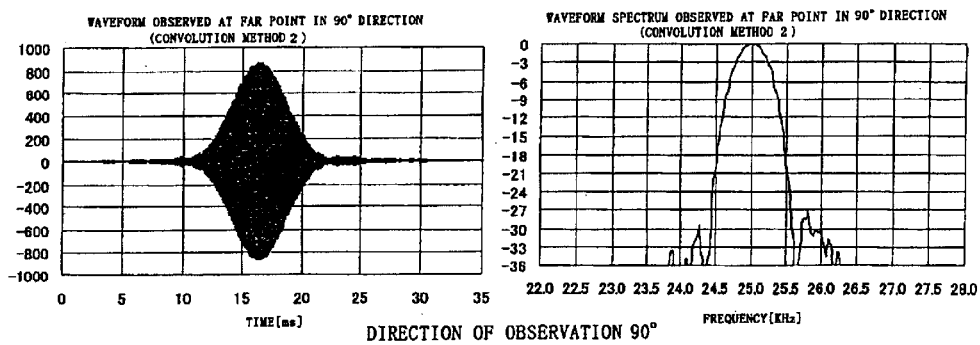
Figure 28C:
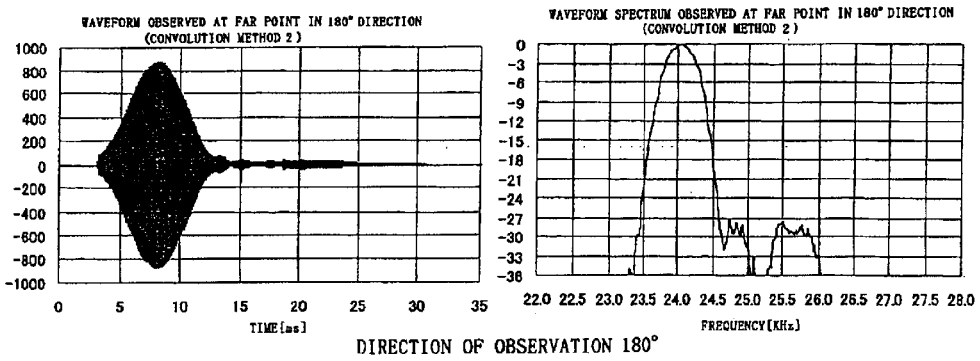

FIGS. 28A–28C show time waveforms and spectra of ultrasonic signals detected at the far point when the individual transducer elements are driven by the drive signals shown in FIGS. 27A–27C. As can be seen from these Figures, side lobe levels the time waveforms and the spectra observed at the far point are both reduced as compared to the case of the aforementioned convolution method (1). The bandwidths of the spectra are equal to those shown in the convolution method (1).

It is recognized from the aforementioned result that the convolution method (2) is more advantageous for target detection compared to the convolution method (1).

In order to drive the individual transducer elements by the time waveforms shown in FIGS. 25A–25C or FIGS. 27A–27C, the transmit DSP 25 shown in FIG. 9 should perform the convolution operation on the transducer element drive signals calculated by equation (14) and calculate the reference drive codes.

Rotational Directional Transmission (RDT) Method

While the foregoing discussion has dealt with the examples in which the scanning sonar simultaneously transmits in all directions to form an umbrellalike transmitting beam and receives target echoes with a pencillike receiving beam which is rotated around the transducer, the transmitting beam may also be a pencillike beam. To form a pencillike transmitting beam having sharp directivity in both horizontal and vertical directions, drive signals for producing the transmitting beam should be controllably delayed as in the case of the formation of the receiving beam as illustrated in FIGS. 3A and 3B. Specifically, the phases of the drive signals for driving the transducer elements arranged in a group of consecutive columns are delayed by inserting time delays which are progressively increased toward the center of the group of the consecutive columns as shown in FIG. 3A, so that the resultant single transmitting beam has sharp horizontal directivity as shown in FIG. 3B.

The vertical direction of the transmitting beam, or its tilt angle, is controlled by inserting progressively increased time delays in the drive signals applied to the transducer elements of the top to bottom rows as shown in FIGS. 2A and 2B.

In this form of the invention, the pencillike transmitting beam so formed is steered around the transducer during each transmit cycle. In one alternative form of the invention, three pencillike transmitting beams may be formed simultaneously in directions separated by angular intervals of 120° by using one each group of consecutive columns of transducer elements in three 120° sectors of the transducer together. In this alternative, a full-circle (360°) transmission is completed by rotating each of the three transmitting beams over 120° together. During a succeeding receive cycle, a pencillike receiving beam is rotated over 360° around the transducer to successively receive target echoes in the same fashion as previously explained. In this case, however, transmission timing of the rotating pencillike transmitting beam(s) is delayed from one direction to another, so that the scanning sonar compensates for resultant directional time delays in received echo signals when generating a detected echo image from the echo signals.

Although the aforementioned method of time-sequential scanning by the narrow pencillike transmitting beam(s) results in a prolonged transmit cycle and extended scan-to-scan intervals, the amount of energy fed into the single transmitting beam can be easily increased. Accordingly, the pencil beam transmission approach makes it possible to increase the detection range and scan across a wider area. In addition, this method of transmission, known as rotational directional transmission (RDT), makes it possible to vary the transmitting carrier frequency from one angular direction to another in order to emit ultrasonic waves in directionally varying frequency bands.

Transmitting Beam Stabilization

When applying the aforementioned Doppler transmission method to a spherical transducer, it is necessary to calculate reference drive codes according to the angular directions (longitudinal positions) of individual transducer elements. If this calculation is made exactly for the angular directions of all the transducer elements, there can arise a situation in which the calculation of the reference drive codes can not be performed at a proper update speed high enough for normally stabilizing the transmitting beam against pitch and roll motions of the vessel. In such a case, reference drive codes for specific angular directions are precalculated and ultrasonic waves are generated using the reference drive code of the angular direction closest to that of individual transducer elements after compensation for the motions of the vessel.

Described below is maximum permissible angular resolution of the precalculated reference drive codes.

Using a model of a spherical transducer having 313 transducer elements arranged on a spherical surface of 240 mm radius, a simulation was performed under the following conditions on two different cases; (1) the angular directions of the transducer elements are not approximated, and (2) the angular directions of the transducer elements are approximated with varying resolutions, ranging from $2\pi/128$ to $2\pi/16$:

<Conditions of Transmitting Beam-forming>
Tilt angle: 0°
Roll angle: 0°
Pitch angle: 0°
Aperture angle of transmission: 47° (half angle)
Aperture end weight value: 0.15
Phase control in angular direction: OFF
Weight correction: ON
Radius of single transducer element: 19 mm
Directivity of single transducer element: Jinc×cos(0.7θ)

<Conditions of Doppler Signals Emitted by Imaginary Moving Sound Source>
Frequency of imaginary moving sound source ($f_0$): 25 kHz
Speed of imaginary moving sound source (V): 60 m/s (from 180° to 0° direction)
Sound velocity (c): 1500 m/s
Range of directional frequency change ($2f_0V/c$): 2 kHz
Transmitting pulselength (2×Tmax=2×0.3r/V): 2.4 ms
Envelope: Gaussian 40% (EV=0.4)+scattering loss correction Transmission weights and delays to be introduced to individual transducer elements within the aperture are calculated under the aforementioned conditions of transmitting beam-forming. Also, drive signals to be fed into transducer elements which are assumingly present in the same angular directions (longitudinal positions) in the horizontal plane (0° latitude) as the individual transducer elements are calculated from equations (24) and (25) below under the aforementioned conditions of Doppler signals emitted by the imaginary moving sound source, and actual drive signals for the individual transducer elements are obtained based on the drive signals so calculated. Further, time waveforms and spectra of ultrasonic signals observed at 100 m far points in the 0°, 90° and 180° directions are obtained. In this simulation, the number of samples is 2048 and the sampling interval is 10 μs.

$$s(r, \theta, t) = \qquad (24)$$

$$e^{\ln(Ev) \cdot \left(\frac{t_0}{Tmax}\right)^2} \cdot \sqrt{\frac{r}{\sqrt{(r\cos\theta - Vt_0)^2 + (r\sin\theta)^2}}} \cdot \cos(2\pi f_0 t_0)$$

$$|t| \leq Tmax$$

$$t_0 = \frac{-(2rV\cos\theta - 2c^2 t) - \sqrt{(2rV\cos\theta - 2c^2 t)^2 - 4(c^2 - V^2)(c^2 t^2 - r^2)}}{2(c^2 - V^2)} \qquad (25)$$

Shown in Tables 4 and 5 below are comparisons of maximum values of sub-levels contained in waveform spectra and peak frequencies of the spectra observed at the 100 m far points in the 0°, 90° and 180° directions on the aforementioned two different cases, that is, the case in which the angular directions of the transducer elements are not approximated, and the case in which the angular directions of the transducer elements are approximated with varying resolutions of $2\pi/128$ to $2\pi/16$.

TABLE 4

|  | Angular direction of observation point 0° | Angular direction of observation point 90° | Angular direction of observation point 180° |
|---|---|---|---|
| No approximation of angular direction | −19.5 dB | −20.4 dB | −18.8 dB |
| 2π/128 (2.8°) | −19.4 dB | −20.6 dB | −18.8 dB |
| 2π/64 (5.6°) | −19.2 dB | −21.8 dB | −19.0 dB |
| 2π/32 (11.3°) | −19.0 dB | −21.0 dB | −19.1 dB |
| 2π/16 (22.5°) | −9.9 dB | −13.8 dB | −11.4 dB |

TABLE 5

| | Angular direction of observation point 0° | Angular direction of observation point 90° | Angular direction of observation point 180° |
| --- | --- | --- | --- |
| No approximation of angular direction | 26.025 kHz | 25.000 kHz | 24.023 kHz |
| 2π/128 (2.8°) | 26.025 kHz | 25.000 kHz | 24.023 kHz |
| 2π/64 (5.6°) | 26.025 kHz | 25.000 kHz | 24.023 kHz |
| 2π/32 (11.3°) | 26.025 kHz | 25.000 kHz | 24.023 kHz |
| 2π/16 (22.5°) | 25.977 kHz | 25.000 kHz | 24.072 kHz |

It can be seen from Table 4 that, compared to the case where the angular directions of the transducer elements are not approximated, variations in the maximum values of sub-levels contained in the waveform spectra are 1.4 dB or smaller when the resolution of approximation of the angular direction of the transducer elements is 2π/32 (11.3°) or smaller. When the resolution of approximation of the angular direction of the transducer elements is 2π/16 (22.5°), however, the maximum values of sub-levels contained in the waveform spectra increase by approximately 7 dB to 9 dB. It is seen in Table 5 that there is no change in the peak frequencies of the spectra when the resolution of approximation of the angular direction of the transducer elements is 2π/32 (11.3°) or smaller, whereas there are small changes in the peak frequencies of the spectra when the resolution of approximation of the angular direction of the transducer elements is 2π/16 (22.5°). It is recognized from the aforementioned observation results that no substantial problem occurs when the resolution of approximation of the angular direction of the transducer elements is 2π/32 (11.3°) or smaller.

The scanning sonar controls the direction of the transmitting beam to stabilize it against motions of the vessel in the following fashion.

Firstly, the transmit DSP 25 shown in FIG. 9 calculates coefficients to be written in the coefficient table 23 in such a manner that the transmitting beam is always directed to a specified search area regardless of pitch and roll motions of the vessel. Likewise, the receive DSP 29 calculates coefficients to be written in the coefficient table 30 in such a manner that the receiving beam is oriented to the specified angular direction regardless of the motions of the vessel.

More specifically, the transmit DSP 25 precalculates reference drive codes for 32 angular directions and writes them in the waveform memory 24. The transmit DSP 25 further calculates angular directions of the transducer elements for compensating against the motions of the vessel and weight values and time delays to be introduced for beamforming every transmit cycle. Then, the transmit signal generating circuit 21 generates drive codes for the individual channels 100 from these parameters and the reference drive codes corresponding to vessel motion correcting angular directions.

Rotational Aperture FM (RA-FM) Transmission Method (1)

Described next is a method of emitting FM signals while rotating an aperture, or a method of emitting FM signals band-limited in individual transmitting directions with their phases delayed according to the center frequencies of the FM signals directed in the individual directions. This transmission method (hereinafter referred to as the RA-FM transmission method) makes it possible to emit signals similar to the ultrasonic signals emitted by the earlier-mentioned convolution method (2). The RA-FM transmission method also makes it possible to allocate desired frequencies to the individual directions with no limitations in pulselength. During the receive cycle, band limitation and pulse compression operations are performed on received echo signals by means of matched filters provided for the individual directions.

Figure 39:
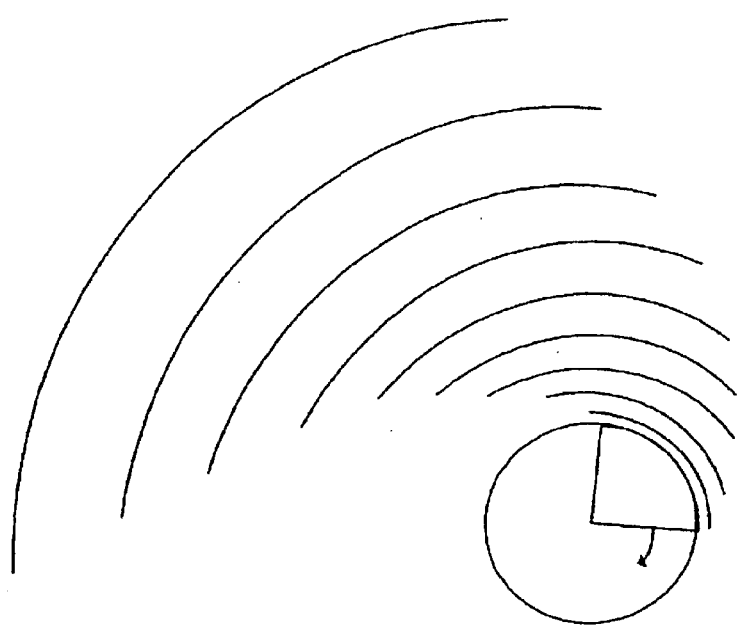
FIG. 39 is a diagram showing an example of wavefronts of ultrasonic signals emitted by the RA-FM transmission method.

FIG. 39 shows an example of wavefronts of ultrasonic signals emitted by the RA-FM transmission method, in which shown by a circle is the transducer and shown by a sector inside the transducer is the aperture angle of transmission. The scanning sonar varies the transmitting frequency while successively rotating its transmitting aperture as depicted in the Figure.

If the imaginary moving sound source transmitting at frequency $f_c$ moves at moving speed V from the 180° to 0° direction, the frequency $f(\theta)$ of the ultrasonic signals observed at a far point in angular direction θ is given by equation (26) below:

$$f(\theta) = f_c\left(1 + \frac{V}{c}\cos\theta\right) \quad (26)$$

where c is sound velocity.

In this example, the transmitting frequency $f_c$ is 25 kHz, the moving speed V of the imaginary moving sound source is 60 m/s and the sound velocity c is 1500 m/s.

Figure 29A:
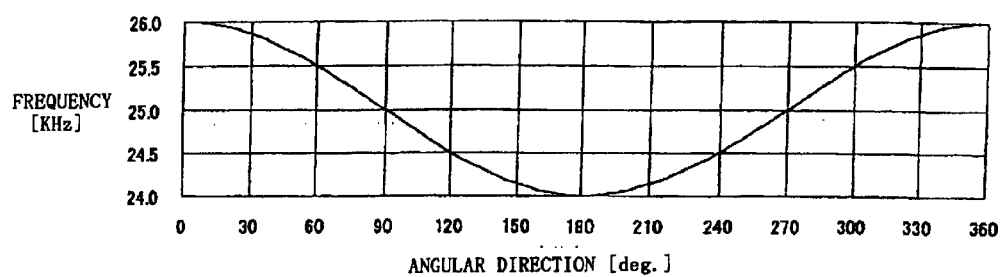
FIGS. 29A and 29B are diagrams showing center frequencies of transmitting frequency bands and delay times calculated for individual angular directions according to a rotational aperture frequency modulation (RA-FM) transmission method (1)

FIG. 29A shows center frequencies of transmitting frequency bands calculated for individual angular directions by equation (26).

Expressing the pulselength of LFM signals transmitted from the individual transducer elements as T and the frequency sweep range as B, transmission delay time $d(\theta)$ to be introduced to the transducer element located in angular direction θ referenced to transmission time of a transducer element of the transmitting frequency $f_c$ is given by equation (27) below:

$$d(\theta) = \frac{T}{B}[f(\theta) - f_c] \quad (27)$$

In the present example, the pulselength T is 10 ms and the frequency sweep range B is 1 kHz.

Figure 29B:
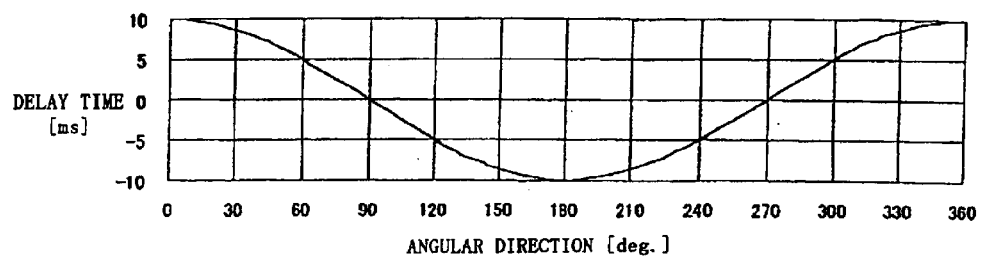

FIG. 29B shows transmission delay times calculated for individual angular directions by equation (27).

Transducer element drive signal waveform $s(\theta, t)$ to be introduced to the transducer element in angular direction θ is given by equation (28) below, in which envelope $w(\theta, t)$ is a Gaussian function expressed by equation (29) and edge value Ev is 0.1.

Figure 30A:
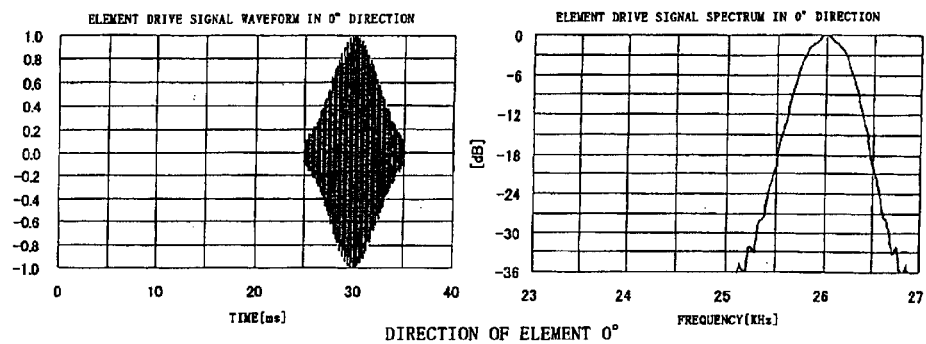
FIGS. 30A–30C are diagrams showing transducer element drive signal waveforms and their spectra.
Figure 30B:
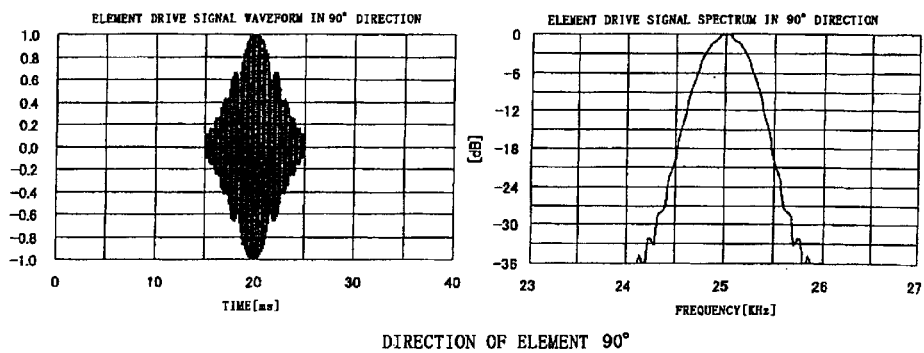
Figure 30C:
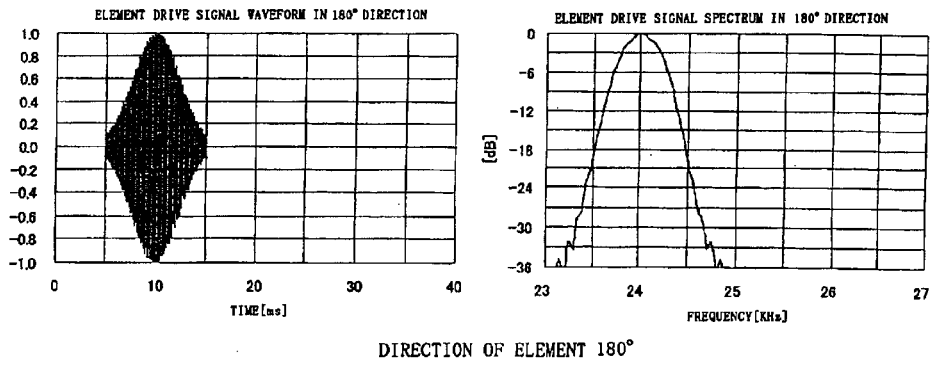

FIGS. 30A–30C show transducer element drive signal waveforms and their spectra fed in the angular directions 0°, 90° and 180°.

$$s(\theta, t) = w(\theta, t)e^{j2\pi\left(f_c t + \frac{1}{2}\frac{B}{T}t^2\right)} \quad (28)$$

$$w(\theta, t) = e^{\ln(Ev)\cdot\left\{\frac{2[t-d(\theta)]}{T}\right\}^2} \quad |t - d(\theta)| \le \frac{T}{2} \quad (29)$$

Using a model of a spherical transducer having 313 transducer elements arranged on a spherical surface of 240 mm radius, a simulation was performed under the following conditions to examine waveforms observed at far points and obtain their spectra:

Tilt angle: 0°
Roll angle: 0°
Pitch angle: 0°
Aperture angle of transmission: 47° (half angle)

Aperture end weight value: 0.15
Phase control in angular direction: OFF
Weight correction: ON
Focal length: infinite distance
Sound velocity (c): 1500 m/s
Radius of single transducer element: 19 mm
Directivity of single transducer element: Jinc×cos(0.7θ)
Distance of observation point: 100 m
Number of samples: 4096
Sampling intervals: 10 μs In this simulation, the transducer element drive signal waveforms to be fed into transducer elements which are assumingly present in the same angular directions (longitudinal positions) in the horizontal plane (0° latitude) as individual transducer elements within the aperture were calculated by equation (28), and actual drive signals for the individual transducer elements were obtained by introducing transmission weights and delays based on the drive signals so calculated.

Figure 31A:
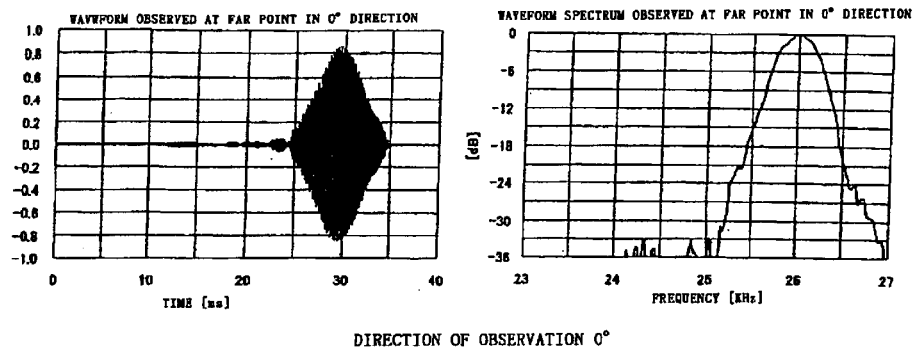
FIGS. 31A–31C are diagrams showing time waveforms and spectra of ultrasonic signals observed at the far points.
Figure 31B:
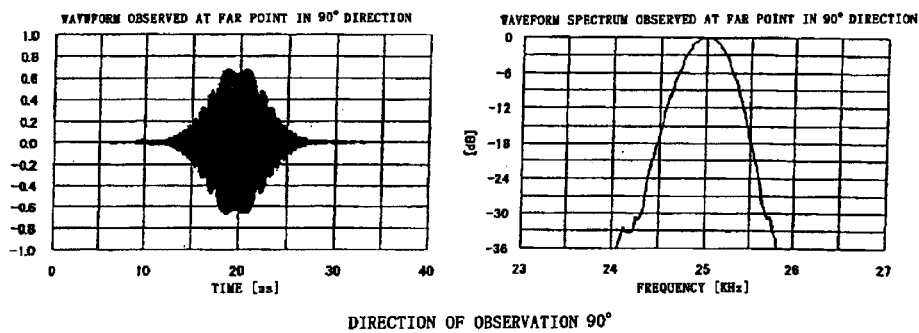
Figure 31C:
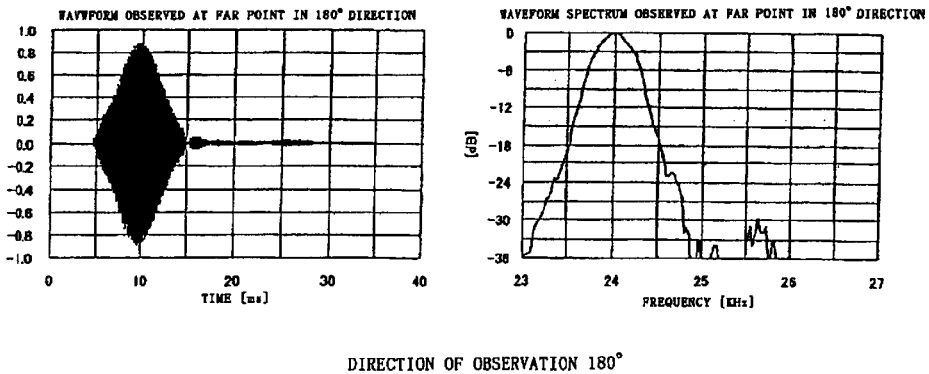

FIGS. 31A–31C show time waveforms and spectra of ultrasonic signals observed at the far points in the 0°, 90° and 180° directions. It is recognized from FIGS. 31A–31C that the signals observed at the far points have pulselengths of approximately 10 ms, spectrum bandwidths are approximately 500 Hz, and side lobe levels of the spectra are −30 dB or less.

Impulse response h(θ, t) of matched filters for performing band limitation and pulse compression operations on the ultrasonic signals observed at the far points in individual directions is given by equation (30) below, in which envelope wf(θ, t) is a Gaussian function expressed by equation (31), filter length Tf is 10 ms, and edge value Evf is 0.1.

$$h(\theta, t) = wf(\theta, t) \cdot \cos\left[2\pi\left(f_c t - \frac{1}{2}\frac{B}{T}t^2\right)\right] \quad (30)$$

$$wf(\theta, t) = e^{\ln(Evf)\left\{\frac{2[t+d(\theta)]}{Tf}\right\}^2} \quad |t + d(\theta)| \le \frac{T}{2} \quad (31)$$

Figure 32A:
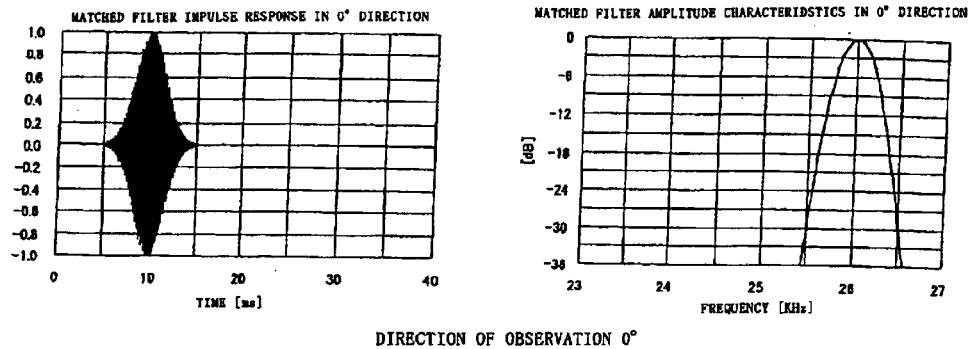
FIGS. 32A–32C are diagrams showing impulse responses of matched filters and their spectra.
Figure 32B:
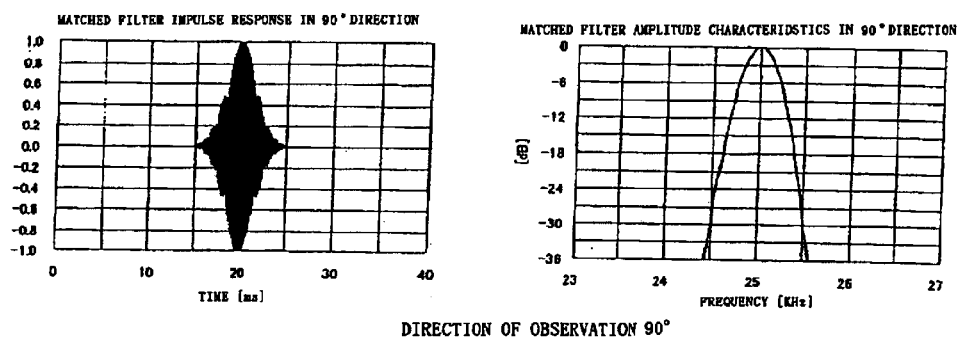
Figure 32C:
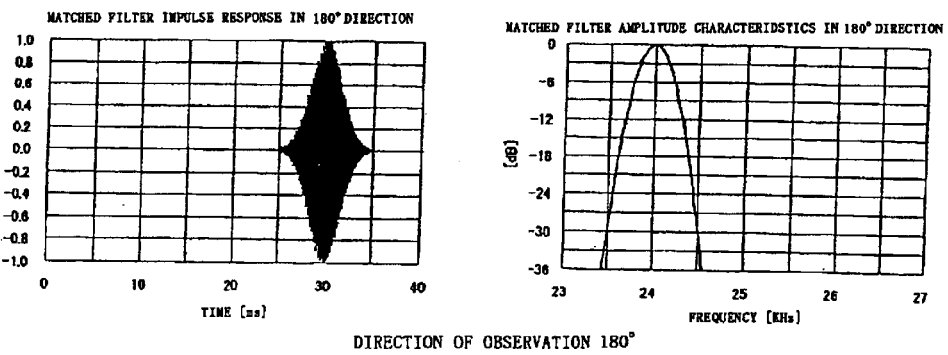

FIGS. 32A–32C show impulse responses and amplitude characteristics of the matched filters in the 0°, 90° and 180° directions.

Figure 33A:
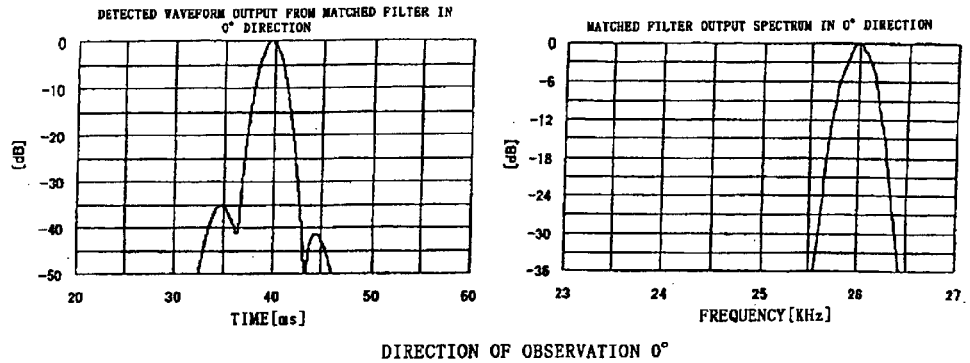
FIGS. 33A–33C are diagrams showing detected waveforms output from the matched filters and their spectra.
Figure 33B:
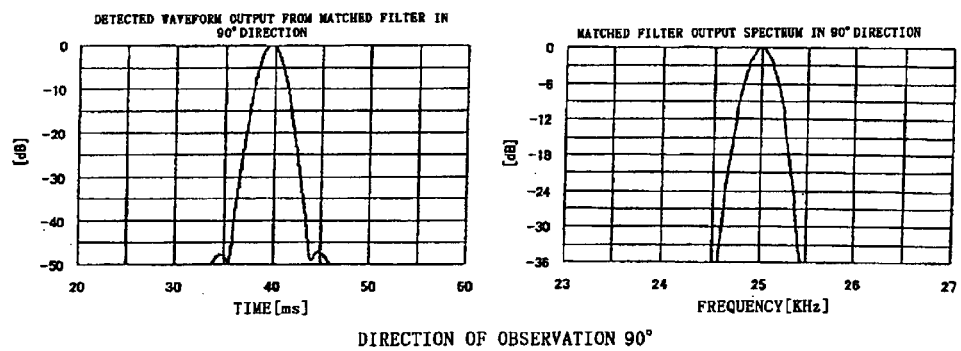
Figure 33C:
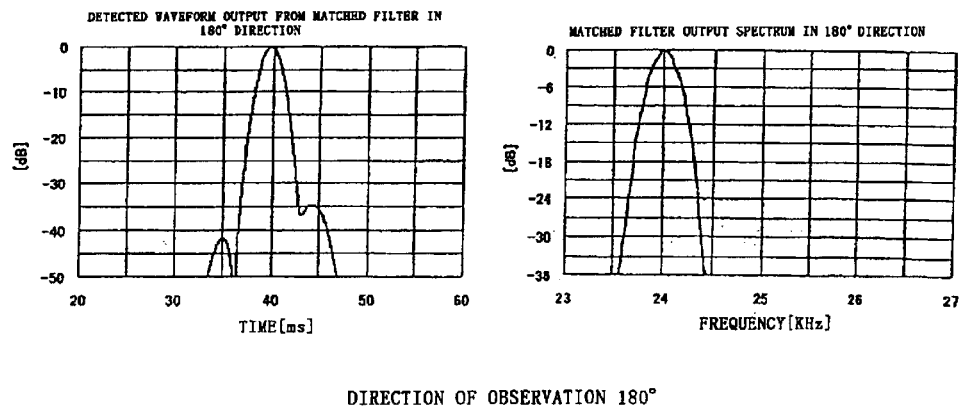

FIGS. 33A–33C show detected waveforms output from the matched filters and their spectra. As shown in FIGS. 33A–33C, the pulselength is compressed to about 5 ms (−20 dB full angle) and transmission delay times are corrected for individual angular directions. It can also be seen that range side lobe levels and spectrum side lobe levels are both decreased to −35 dB or less.

Rotational Aperture FM (RA-FM) Transmission Method (2)

While the center frequency transmitted in each direction is varied according to the Doppler frequency in the aforementioned RA-FM transmission method (1), the center frequency may be varied linearly with transmitting direction.

In this RA-FM transmission method (2) in which the center frequency varies linearly with transmitting direction, the center frequency f(θ) of ultrasonic signals transmitted in angular direction θ is given by equation (32) below:

$$f(\theta) = f_0 + \mu \frac{\theta}{360} \quad (32)$$

where $f_0$ is the center frequency in the 0° direction and $\mu$ is a frequency sweep range in each direction. In this example, $f_0$ is 24 kHz and $\mu$ is 2 kHz.

Figure 34A:
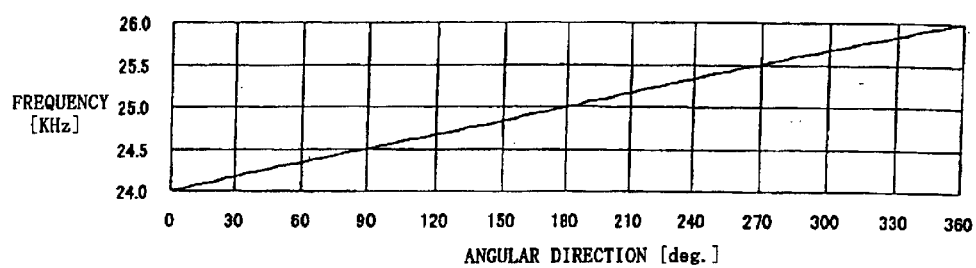
FIGS. 34A and 34B are diagrams showing center frequencies of transmitting frequency bands and delay times calculated for individual angular directions according to a rotational aperture frequency modulation (RA-FM) transmission method (2)

FIG. 34A shows center frequencies of transmitting frequency bands calculated for individual angular directions by equation (32).

Expressing the pulselength of LFM signals transmitted from the individual transducer elements as T and the frequency sweep range as B, transmission delay time d(θ) to be introduced to the transducer element located in angular direction 74 referenced to transmission time of a transducer element of the transmitting frequency $f_c$ is given by equation (33) below:

$$d(\theta) = \frac{T}{B}[f(\theta) - f_c] \quad (33)$$

In the present example, the pulselength T is 10 ms, the frequency sweep range B is 1 kHz and $f_c$ is 25 kHz.

Figure 34B:
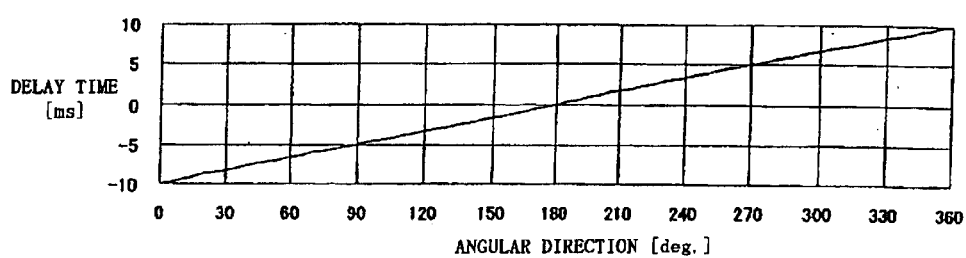

FIG. 34B shows transmission delay times calculated for individual angular directions by equation (33).

Transducer element drive signal waveform s(θ, t) to be introduced to the transducer element in angular direction θ is given by equation (34) below, in which envelope w(θ, t) is a Gaussian function expressed by equation (35) and edge value Ev is 0.1.

$$s(\theta, t) = w(\theta, t)e^{j2\pi\left(f_c t + \frac{1}{2}\frac{B}{T}t^2\right)} \quad (34)$$

$$w(\theta, t) = e^{\ln(Ev)\left\{\frac{2[t-d(\theta)]}{T}\right\}^2} \quad |t - d(\theta)| \le \frac{T}{2} \quad (35)$$

Figure 35:
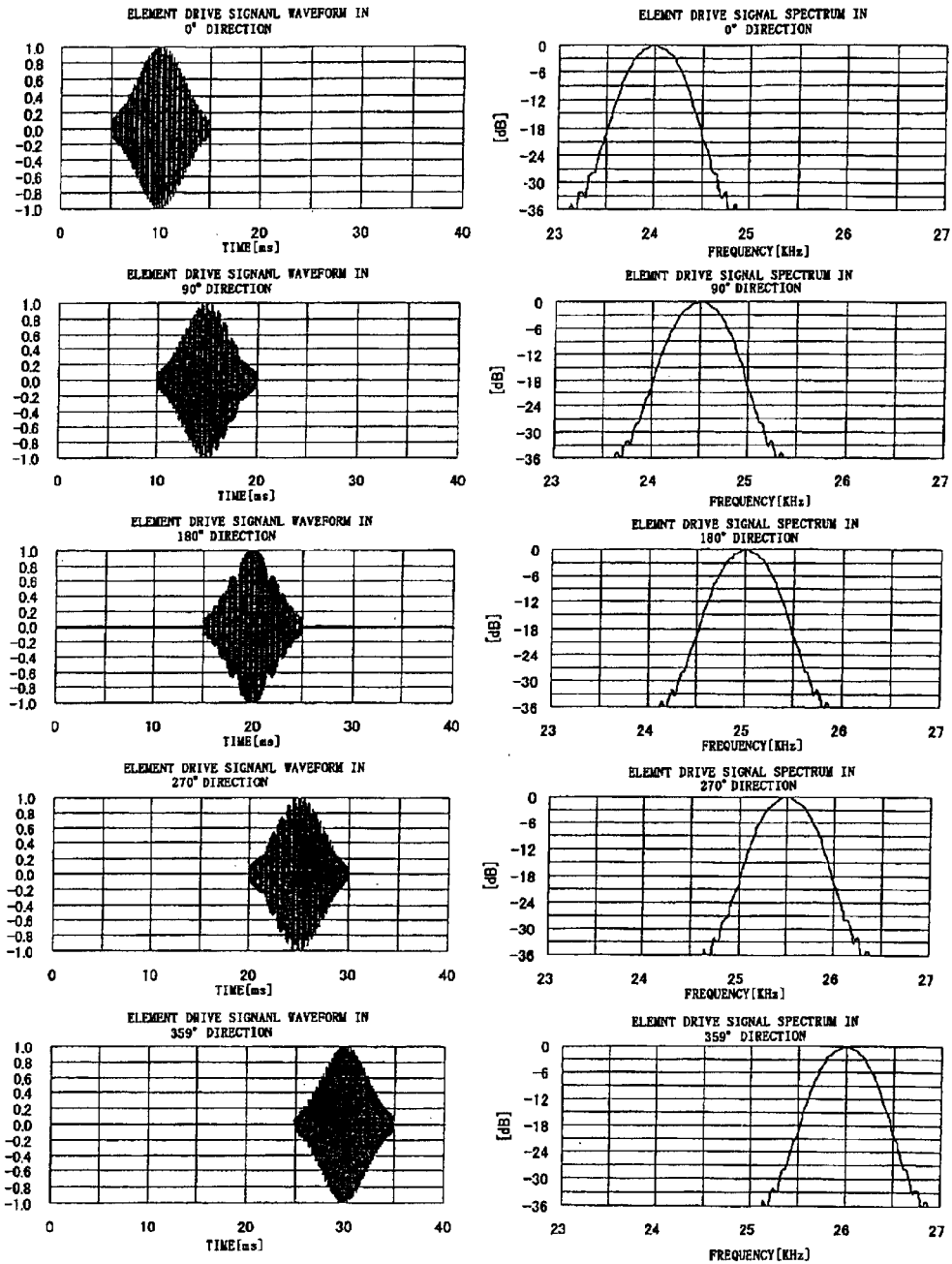
FIG. 35 is a diagram showing transducer element drive signal waveforms and their spectra.

FIG. 35 shows transducer element drive signal waveforms and their spectra fed in the angular directions 0°, 90°, 180°, 270 and 359°.

Using a model of a spherical transducer having 313 transducer elements arranged on a spherical surface of 240 mm radius, a simulation was performed under the same conditions as shown for the transmission method (1) to examine waveforms observed at far points and obtain their spectra.

In this simulation, the transducer element drive signal waveforms to be fed into transducer elements which are assumingly present in the same angular directions (longitudinal positions) in the horizontal plane (0° latitude) as individual transducer elements within the aperture were calculated by equation (34), and actual drive signals for the individual transducer elements were obtained by introducing transmission weights and delays based on the drive signals so calculated.

Figure 36:
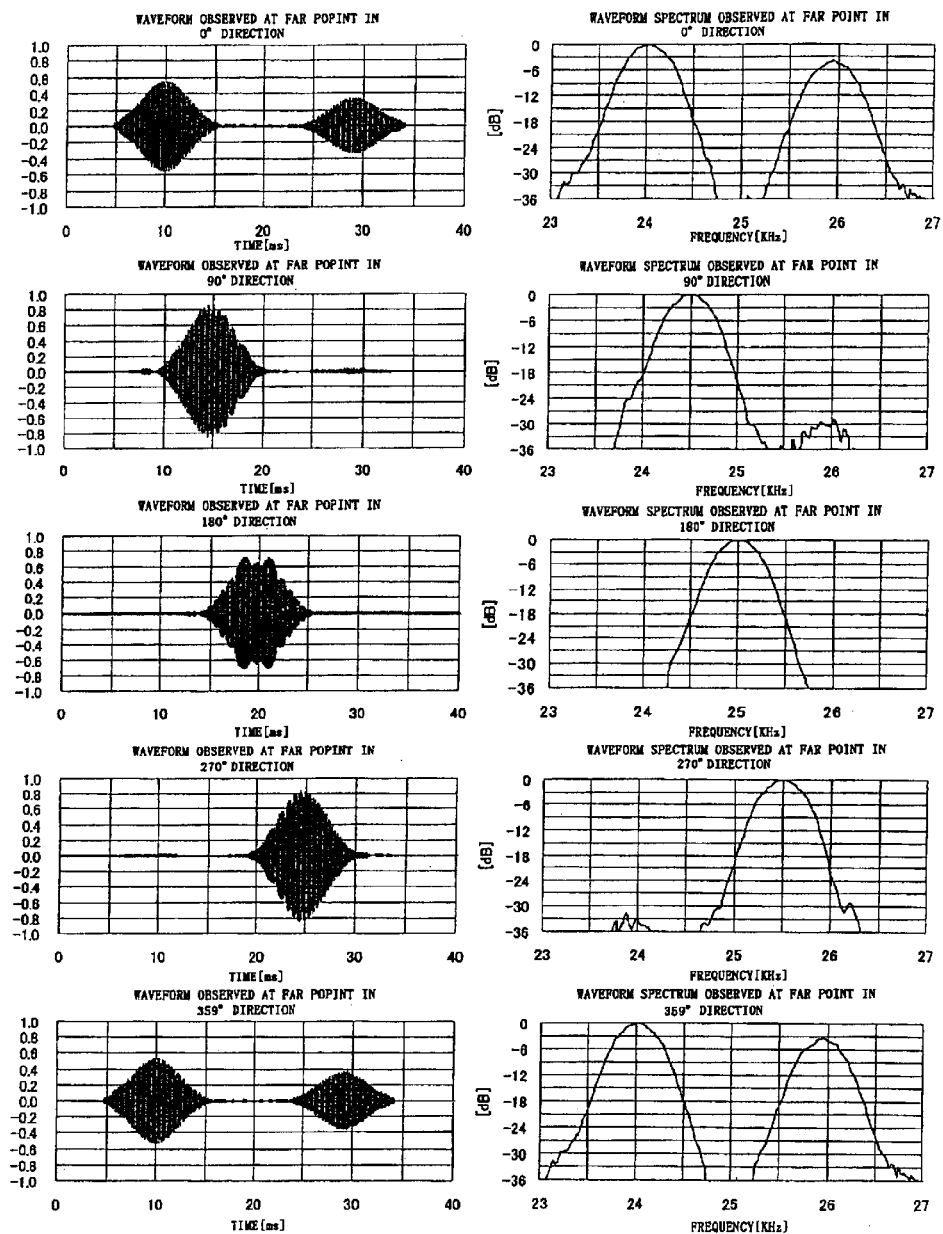
FIG. 36 is a diagram showing time waveforms and spectra of ultrasonic signals observed at the far points.

FIG. 36 shows time waveforms and spectra of ultrasonic signals observed at the far points in the 0°, 90°, 180°, 270° and 359° directions. It is recognized from FIG. 36 that the signals observed at the far points have pulselengths of approximately 10 ms and spectrum bandwidths are approximately 500 Hz. While 24 kHz and 26 kHz pulses are observed in the 0° and 359° directions, levels of unwanted frequency components in the spectra observed in the 90° and 270° directions are −30 dB or less.

Impulse response h(θ, t) of matched filters for performing band limitation and pulse compression operations on the ultrasonic signals observed at the far points in individual directions is given by equation (36) below, in which envelope wf(θ, t) is a Gaussian function expressed by equation (37), filter length Tf is 10 ms, and edge value Evf is 0.1.

$$h(\theta, t) = wf(\theta, t) \cdot \cos\left[2\pi\left(f_c t - \frac{1}{2}\frac{B}{T}t^2\right)\right] \quad (36)$$

$$wf(\theta, t) = e^{\ln(Evf)\left(\frac{2[t+d(\theta)]}{Tf}\right)^2} \quad |t+d(\theta)| \le \frac{T}{2} \quad (37)$$

Figure 37:
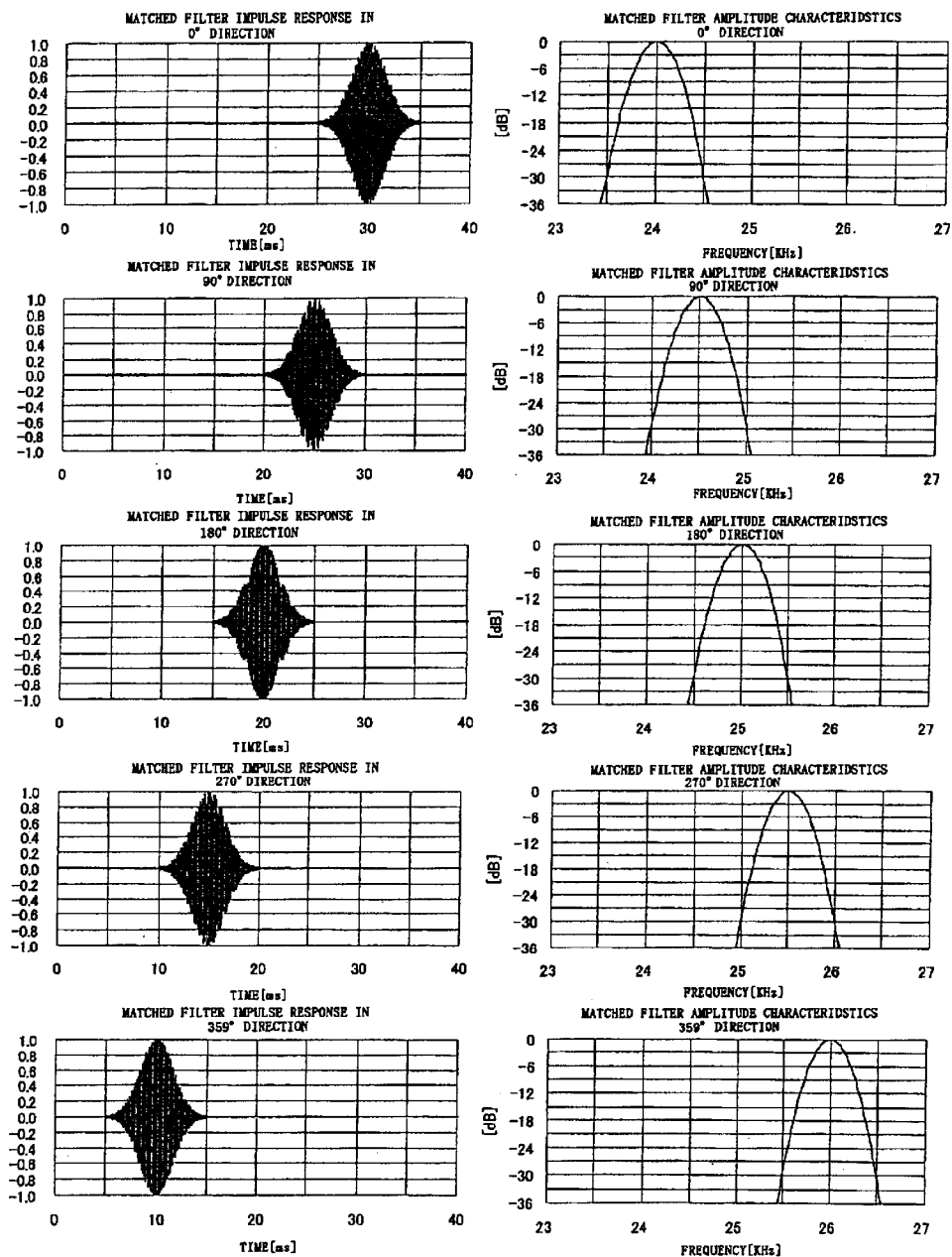
FIG. 37 is a diagram showing impulse responses of matched filters and their spectra.

FIG. 37 shows impulse responses and amplitude characteristics of the matched filters in the 0°, 90°, 180°, 270° and 359° directions.

Figure 38:
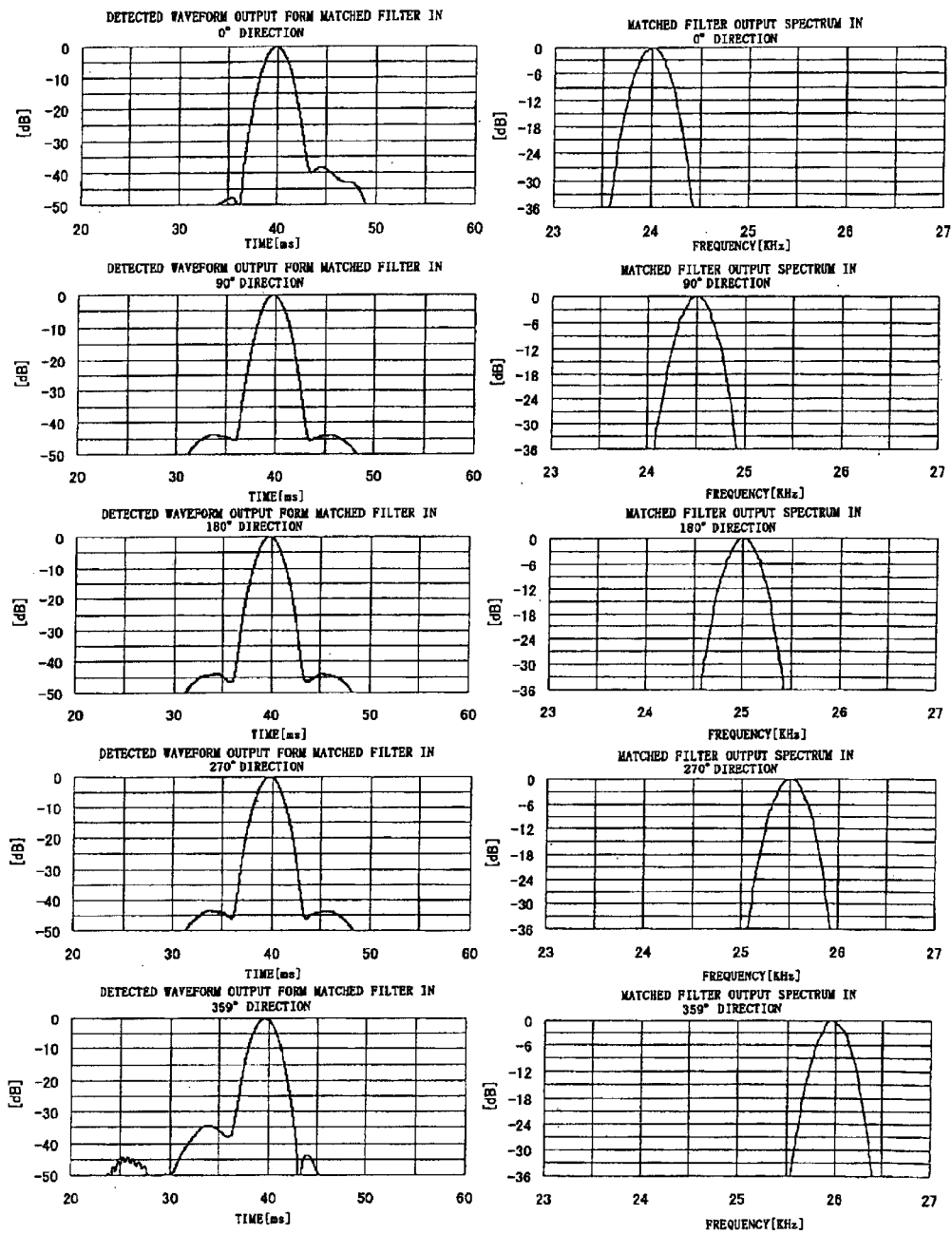
FIG. 38 is a diagram showing detected waveforms output from the matched filters and their spectra.

FIG. 38 show detected waveforms output from the matched filters and their spectra. As shown in FIG. 38, the pulselength is compressed to about 5 ms (−20 dB full angle) and transmission delay times are corrected for individual angular directions. It can also be seen that range side lobe levels and spectrum side lobe levels are both decreased to −35 dB or less. This indicates that the present RA-FM transmission method (2) does not cause directional spurious problem which occurs in the aforementioned Doppler transmission method.

Directionally Varying Frequency Continuous Wave (CW) Transmission Method

Described next is a directionally varying frequency CW transmission method in which ultrasonic signals are emitted simultaneously in all directions around the transducer at directionally varying transmitting frequencies.

Transducer element drive signal waveform s(θ, t) to be introduced to the transducer element in angular direction e is given by equation (38) and envelope w(t) is given by equation (39) below, in which T indicates pulselength and Ev indicates envelope edge values (signal intensities of both edges of the envelope). If the center frequency of each transmitting frequency band varies linearly with transmitting direction, the center frequency f(θ) of ultrasonic signals transmitted in the angular direction θ is given by equation (40) below where $f_0$ is the center frequency in the 0° direction and μ is a frequency sweep range in each direction. While the signal phase at the middle of a pulse is the same in all directions, phase differences with surrounding transducer elements increase with the distance from the middle of the pulse.

$$w(t) = \frac{1+Ev}{2} + \frac{1-Ev}{2} \cdot \cos\left(\frac{2\pi \cdot t}{T}\right) \quad |t| \le \frac{T}{2} \quad (39)$$

$$f(\theta) = f_0 + \mu \frac{\theta}{360} \quad (40)$$

Figure 44:
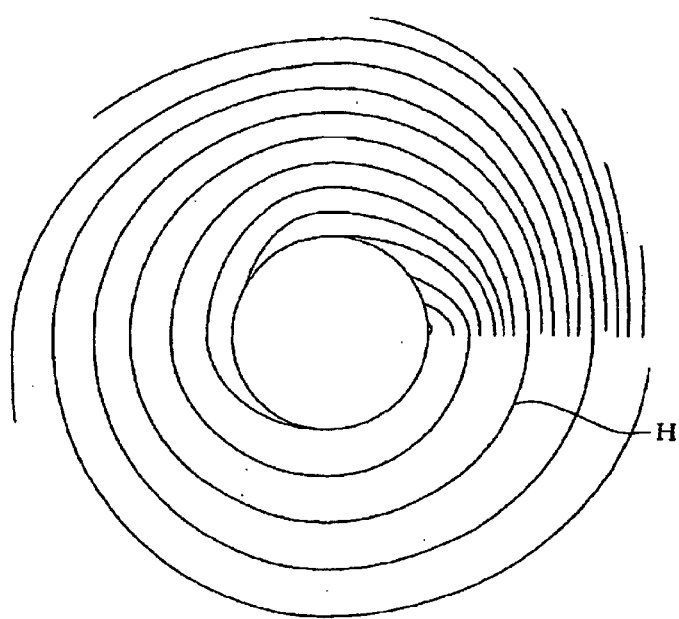
FIG. 44 is a diagram showing an example of wavefronts of ultrasonic signals emitted by a directionally varying frequency continuous wave (CW) transmission method.

FIG. 44 shows an example of wavefronts of ultrasonic signals emitted from the transducer, in which shown by a circle at the center is the transducer and shown by concentric circles around the central circle are the wavefronts observed 10 ms after transmission. In the illustrated example, the frequency of the transmitted ultrasonic signal gradually increases as the angular direction θ varies upward from 0°. In this example, the phase at the middle of envelopes of drive signal waveforms fed into the transducer elements in all directions coincides 10 ms after transmission. The ultrasonic signals are emitted simultaneously in all directions (360°) at directionally varying transmitting frequencies in this fashion.

Figure 40A:
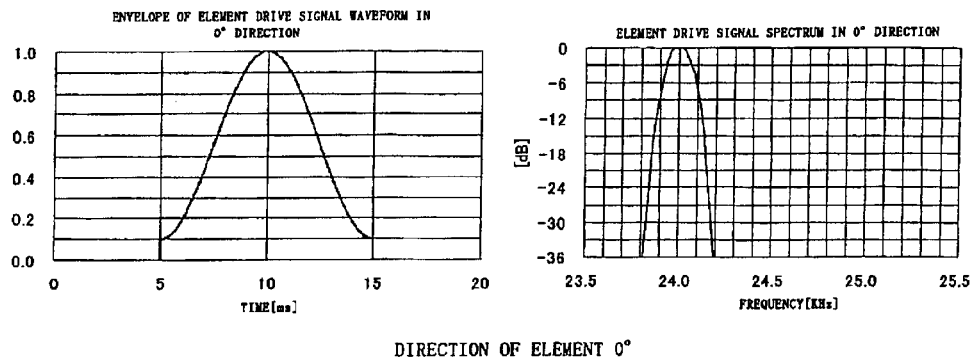
FIGS. 40A–40C are diagrams showing envelopes of transducer element drive signal waveforms and their spectra fed into transducer elements in individual angular directions.
Figure 40B:
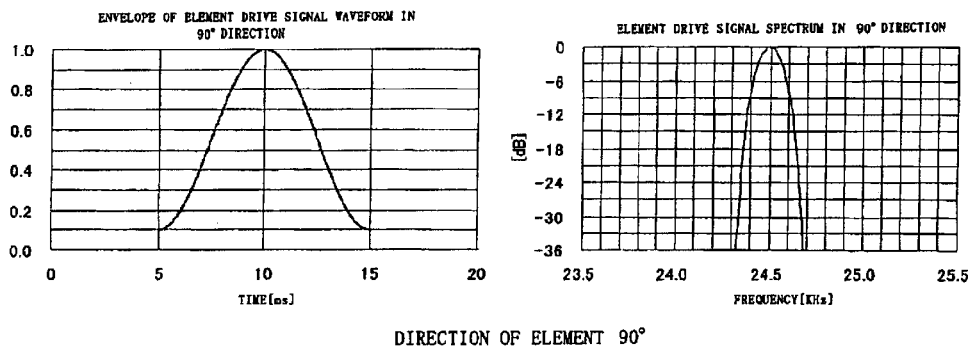
Figure 40C:
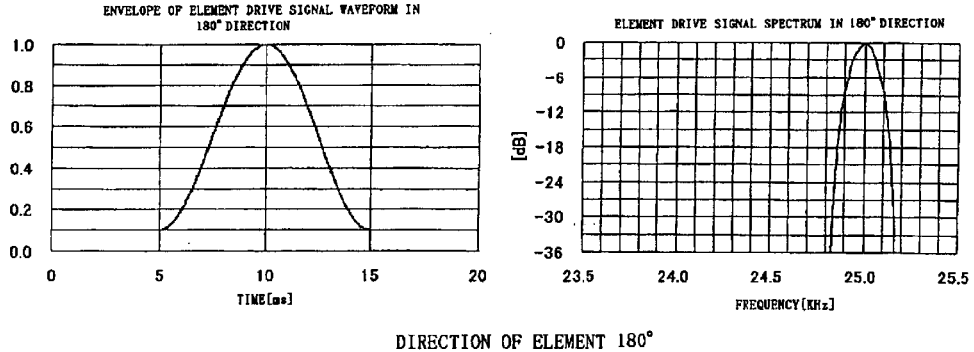

FIGS. 40A–40C show envelopes of transducer element drive signal waveforms and their spectra fed into the transducer elements in the angular directions 0°, 90° and 180° when the pulselength is 10 ms.

Figure 41A:
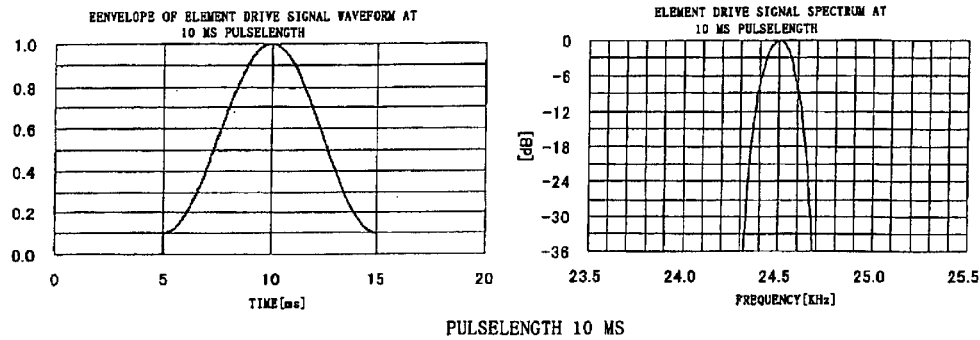
FIGS. 41A–41C are diagrams showing envelopes of transducer element drive signal waveforms and their spectra at different pulselengths.
Figure 41B:
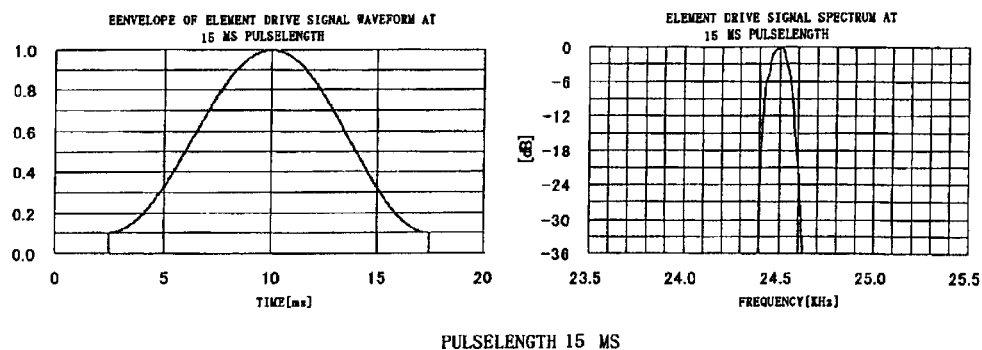
Figure 41C:
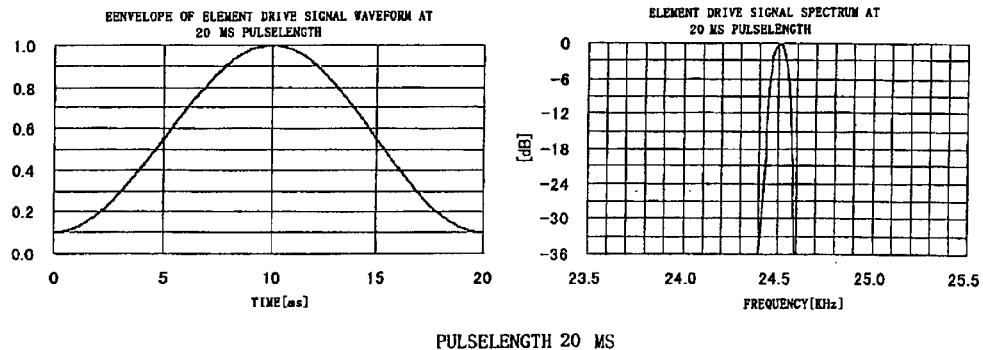

FIGS. 41A–41C show envelopes of transducer element drive signal waveforms and their spectra when the pulselength is 10 ms, 15 ms and 20 ms. The following conditions of transducer element drive signal waveforms were employed here:

Transmitting frequency in 0° direction: 24 kHz
Frequency sweep range in each direction: 2 kHz
Envelope edge value Ev: 0.1

When the pulselength is 10 ms as stated above, the bandwidth of the spectrum is approximately 150 Hz. When the pulselength is 15 ms or 20 ms, the bandwidth of the spectrum is 100 Hz or less.

Using a model of a spherical transducer having 313 transducer elements arranged on a spherical surface of 240 mm radius, a simulation was performed under the following conditions to examine waveforms observed at far points and obtain their spectra.
Tilt angle: 0°
Phase control in angular direction: OFF
Roll angle: 0°
Weight correction: ON
Pitch angle: 0°
Focal length: infinite distance
Vertical aperture angle: 47° (half angle)
Sound velocity (c): 1500 m/s
Vertical aperture end weight value: 0.15
Radius of single transducer element: 19 mm
Horizontal aperture end angle: −30°
Directivity of single transducer element: Jincxcos(0.7θ)
Horizontal aperture angle: 240°
Distance of observation point: 100 m
Horizontal weight control region angle 1: 30°
Number of samples: 2048
Horizontal weight control region angle 2: 210°
Sampling intervals: 10 μs Drive signal waveforms for transducer element directions approximated to 32 angular directions within a range of 360° horizontal directions were calculated from equation (38), drive signals to be fed into the individual transducer elements were obtained by giving weight values and time delays for beamforming to the calculated drive signal waveforms. If ultrasonic signals are emitted simultaneously in all 360° horizontal directions, however, interference occurs in the 0° direction due to frequency discontinuity in that direction. Therefore, the simulation was made on a case where trapezoidal-weighted signals were emitted within a horizontal aperture in a 0°–180° half-circle area. The interference can be avoided by delaying transmission in a 180°–360° half-circle area.

Figure 42A:
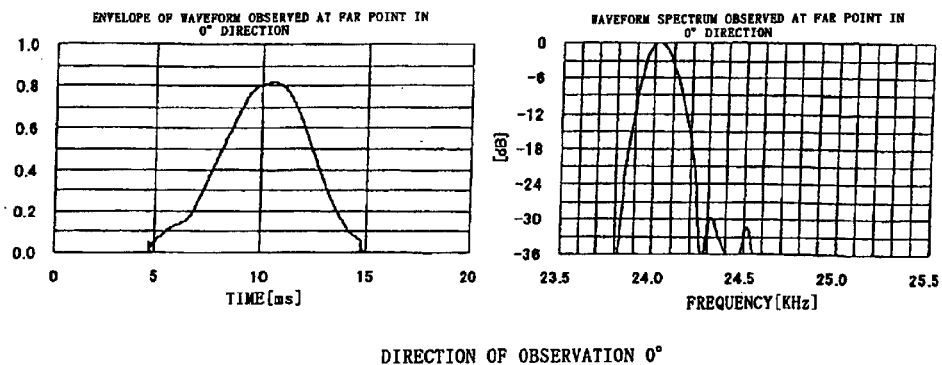
FIGS. 42A–42C are diagrams showing envelopes of ultrasonic signals and their spectra observed at the far points in individual angular directions.
Figure 42B:
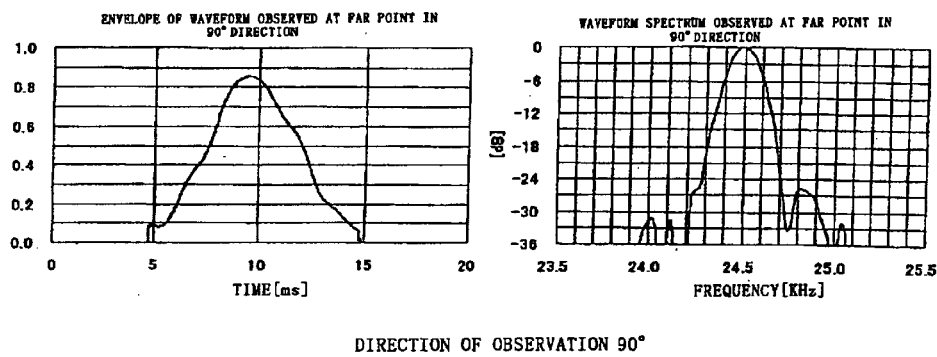
Figure 42C:
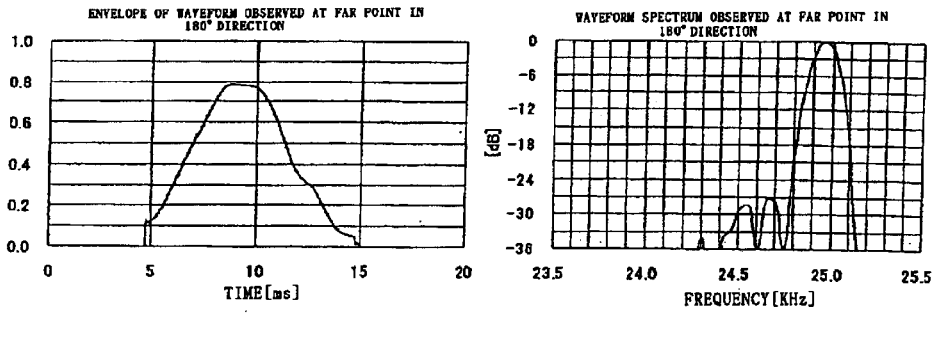
Figure 43A:
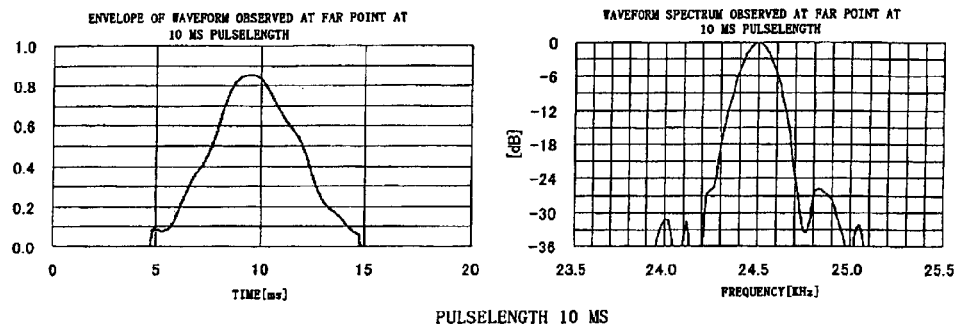
FIGS. 43A–43C are diagrams showing envelopes of ultrasonic signals and their spectra observed at the far point at different pulselengths.
Figure 43B:
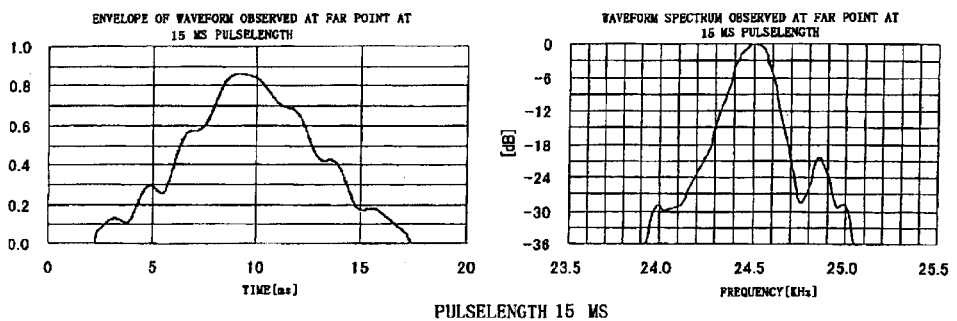
Figure 43C:
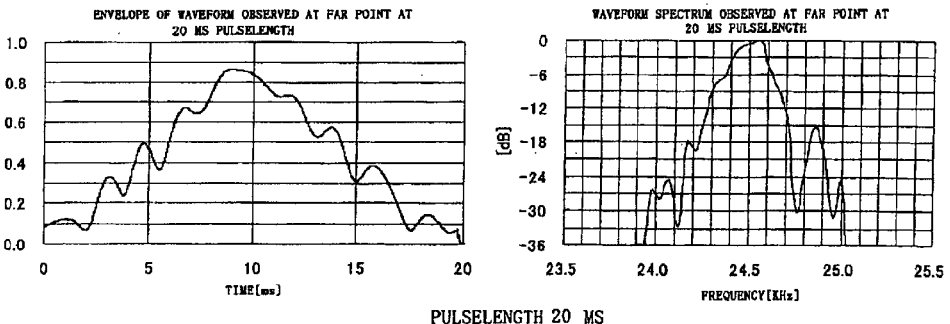

FIGS. 42A–42C show envelopes of ultrasonic signals and their spectra observed at the far points in the 0°, 90° and 180° directions when the pulselength is 10 ms. FIGS. 43A–43C show envelopes of ultrasonic signals and their spectra observed at the far point in the 90° direction when the pulselength is 10 ms, 15 ms and 20 ms.

When the pulselength is 10 ms, distortion of the envelope of the observed ultrasonic signals is low and spectrum side lobe levels are −25 dB or less. Also, the bandwidth of the spectrum is approximately 150 Hz when the pulselength is 10 ms, which is generally equal to the spectrum bandwidths of the transducer element drive signal waveform. When the pulselength is 15 ms or 20 ms, distortion of the envelope of the observed ultrasonic signals is higher, the maximum spectrum side lobe level exceeds −20 dB and the bandwidth of the spectrum is approximately 200 Hz which is almost twice as wide as the transducer element drive signal waveform.

Horizontal directional characteristics obtained at the pulselength of 10 ms by the directionally varying frequency CW transmission method were compared with horizontal directional characteristics obtained at a transmitting frequency of 25 kHz by the conventional CW transmission method. The comparison indicates that directivity deviations and source levels of the two cases are generally equal to each other.

Plane Transducers

Figure 45A:
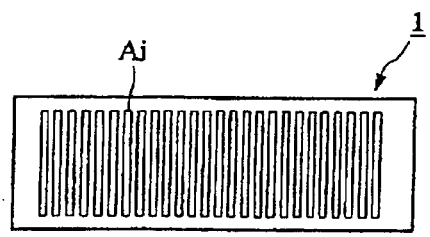
FIGS. 45A–45C are diagrams showing alternative types of transducers.
Figure 45B:
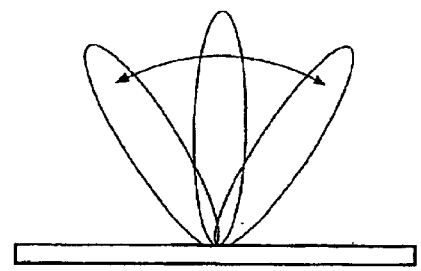
Figure 45C:
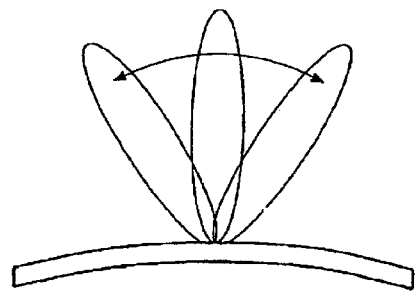

FIGS. 45A–45C show other examples of transducers, in which FIG. 45A is a plan view and FIGS. 45B and 45C are side views of two types of transducers. While the foregoing discussion has dealt with the cylindrical and spherical transducers having a plurality of transducer elements arranged on their cylindrical and spherical outer surfaces, respectively, the examples of FIGS. 45A–45C are flat and gently warped platelike transducers having a plurality of linearly arranged transducer elements Ai. The aforementioned transmit-receive methods for the cylindrical and spherical transducers can be applied to such platelike transducers as well.

FIGS. 45B and 45C show examples of receiving beam directivities. Transmitting beams emitted by these transducers are nondirectional within their sector-shaped scan areas. Beam angles and directions of these transducers are determined by controlling the phases of drive signals fed into the individual transducer elements Ai.

The present invention is applicable not only to the aforementioned plane, cylindrical and spherical transducers but also to transducers whose transducer elements are arranged on a n ellipsoid of revolution or other curved surfaces. The invention is also applicable to a transducer whose outer surface is produced by combining a plurality of curved surfaces, such as a cylindrical surface and another curved surface. Furthermore, the invention is applicable to transducers whose transducer elements are arranged not only two-dimensionally but also linearly on their surfaces.

What is claimed is:

1. An ultrasonic transmit-receive apparatus comprising:
    a transducer having multiple transducer elements arranged on a surface of the transducer at least along one direction;
    a transmit controller for driving said multiple transducer elements, causing them to emit ultrasonic waves; and
    a receive controller for synthesizing echo signals received by said individual transducer elements to produce a synthesized received echo signal upon receiving ultrasonic waves reflected by a target;
    wherein said transmit controller drives said multiple transducer elements of the transducer in such a manner that said transducer elements emit the ultrasonic waves in directionally varying frequency bands, each of said frequency bands being a different frequency band, and said receive controller obtains received signals of specified angular directions by selecting the frequency from one angular direction to another.

2. The ultrasonic transmit-receive apparatus according to claim 1, wherein said transmit controller drives said individual transducer elements in such a manner that the ultrasonic waves emitted by said multiple transducer elements are equivalent to ultrasonic waves emitted from an imaginary moving sound source which moves within a circle enclosed by said multiple transducer elements arranged along said one direction in the horizontal plane.

3. The ultrasonic transmit-receive apparatus according to claim 1, wherein said transmit controller drives transducer elements necessary for forming a specific transmitting aperture which are chosen from said multiple transducer elements arranged along said one direction in the horizontal plane by controlling the amounts of time delays of the ultrasonic waves to be emitted from said chosen transducer elements, and wherein the transmitting aperture is successively moved from one direction to another such that a transmitting beam is steered from one angular direction to another all around the transducer.

4. The ultrasonic transmit-receive apparatus according to claim 3, wherein said transmit controller successively varies transmitting frequency of the transmitting beam from one angular direction to another.

5. The ultrasonic transmit-receive apparatus according to claim 1, wherein said transmit controller successively selects adjacent transducer elements arranged within a specific sector area from said multiple transducer elements arranged along said one direction in the horizontal plane, and wherein said transmit controller causes said selected transducer elements to emit frequency-modulated ultrasonic signals while shifting the direction of said sector area along said direction in the horizontal plane.

6. The ultrasonic transmit-receive apparatus according to claim 1, wherein said transmit controller feeds such drive signals into the individual transducer elements that phases of the drive signals generally match at the middle of envelopes of drive signal waveforms in all angular directions, and said transmit controller causes said multiple transducer elements to emit ultrasonic signals of which transmitting frequency varies from one angular direction to another.

7. The ultrasonic transmit-receive apparatus according to claim 2 or 6, wherein said transmit controller includes a pulse expander for expanding drive signal pulses fed into the individual transducer elements by convoluting burst waves with an FM signal, and said receive controller includes a pulse compressor for compressing the received signals of each angular direction before or after the frequency is selected for each angular direction by convoluting the received signals with an FM signal of which time axis is reversed.

8. The ultrasonic transmit-receive apparatus according to claim 7 further comprising a side-lobe eliminator for eliminating side lobes occurring on the time axis by said pulse expansion operation.

9. The ultrasonic transmit-receive apparatus according to claim 1, wherein said transmit controller precalculates the waveform of ultrasonic signals to be emitted in each of sector areas into which the horizontal plane is divided, calculates an angular direction and the amount of time delay of the waveform of the ultrasonic signals according to motion of the transducer for forming a transmitting beam directed to a desired direction, and defines drive signals to be fed into the individual transducer elements.

10. The ultrasonic transmit-receive apparatus according to claim 1, wherein the transducer has a flat, cylindrical or spherical surface on which said multiple transducer elements are arranged.

11. A scanning sonar comprising:
    the ultrasonic transmit-receive apparatus according to claim 1; and
    means for controlling said transmit controller and said receive controller of the ultrasonic transmit-receive apparatus to successively scan through specified angular directions, producing data on a detected echo image from the received echo signals and displaying the detected echo image.

12. The ultrasonic transmit-receive apparatus according to claim 2, wherein said transmit controller precalculates the waveform of ultrasonic signals to be emitted in each of sector areas into which the horizontal plane is divided, calculates an angular direction and the amount of time delay of the waveform of the ultrasonic signals according to motion of the transducer for forming a transmitting beam directed to a desired direction, and defines drive signals to be fed into the individual transducer elements.

13. The ultrasonic transmit-receive apparatus according to claim 3, wherein said transmit controller precalculates the waveform of ultrasonic signals to be emitted in each of sector areas into which the horizontal plane is divided, calculates an angular direction and the amount of time delay of the waveform of the ultrasonic signals according to motion of the transducer for forming a transmitting beam directed to a desired direction, and defines drive signals to be fed into the individual transducer elements.

14. The ultrasonic transmit-receive apparatus according to claim 4, wherein said transmit controller precalculates the waveform of ultrasonic signals to be emitted in each of sector areas into which the horizontal plane is divided, calculates an angular direction and the amount of time delay of the waveform of the ultrasonic signals according to motion of the transducer for forming a transmitting beam directed to a desired direction, and defines drive signals to be fed into the individual transducer elements.

15. The ultrasonic transmit-receive apparatus according to claim 5, wherein said transmit controller precalculates the waveform of ultrasonic signals to be emitted in each of sector areas into which the horizontal plane is divided, calculates an angular direction and the amount of time delay of the waveform of the ultrasonic signals according to motion of the transducer for forming a transmitting beam directed to a desired direction, and defines drive signals to be fed into the individual transducer elements.

16. The ultrasonic transmit-receive apparatus according to claim 6, wherein said transmit controller precalculates the waveform of ultrasonic signals to be emitted in each of sector areas into which the horizontal plane is divided, calculates an angular direction and the amount of time delay of the waveform of the ultrasonic signals according to motion of the transducer for forming a transmitting beam directed to a desired direction, and defines drive signals to be fed into the individual transducer elements.

17. The ultrasonic transmit-receive apparatus according to claim 7, wherein said transmit controller precalculates the waveform of ultrasonic signals to be emitted in each of sector areas into which the horizontal plane is divided, calculates an angular direction and the amount of time delay of the waveform of the ultrasonic signals according to motion of the transducer for forming a transmitting beam directed to a desired direction, and defines drive signals to be fed into the individual transducer elements.

18. The ultrasonic transmit-receive apparatus according to claim 8, wherein said transmit controller precalculates the waveform of ultrasonic signals to be emitted in each of sector areas into which the horizontal plane is divided, calculates an angular direction and the amount of time delay of the waveform of the ultrasonic signals according to motion of the transducer for forming a transmitting beam directed to a desired direction, and defines drive signals to be fed into the individual transducer elements.

19. The ultrasonic transmit-receive apparatus according to claim 2, wherein the transducer has a flat, cylindrical or spherical surface on which said multiple transducer elements are arranged.

20. The ultrasonic transmit-receive apparatus according to claim 3, wherein the transducer has a flat, cylindrical or spherical surface on which said multiple transducer elements are arranged.

21. The ultrasonic transmit-receive apparatus according to claim 4, wherein the transducer has a flat, cylindrical or spherical surface on which said multiple transducer elements are arranged.

22. The ultrasonic transmit-receive apparatus according to claim 5, wherein the transducer has a flat, cylindrical or spherical surface on which said multiple transducer elements are arranged.

23. The ultrasonic transmit-receive apparatus according to claim 6, wherein the transducer has a flat, cylindrical or spherical surface on which said multiple transducer elements are arranged.

24. The ultrasonic transmit-receive apparatus according to claim 7, wherein the transducer has a flat, cylindrical or spherical surface on which said multiple transducer elements are arranged.

25. The ultrasonic transmit-receive apparatus according to claim 8, wherein the transducer has a flat, cylindrical or spherical surface on which said multiple transducer elements are arranged.

26. The ultrasonic transmit-receive apparatus according to claim 9, wherein the transducer has a flat, cylindrical or spherical surface on which said multiple transducer elements are arranged.

27. A scanning sonar comprising:

the ultrasonic transmit-receive apparatus according to claim 2; and means for controlling said transmit controller and said receive controller of the ultrasonic transmit-receive apparatus to successively scan through specified angular directions, producing data on a detected echo image from the received echo signals and displaying the detected echo image.

28. A scanning sonar comprising:

the ultrasonic transmit-receive apparatus according to claim 3; and means for controlling said transmit controller and said receive controller of the ultrasonic transmit-receive apparatus to successively scan through specified angular directions, producing data on a detected echo image from the received echo signals and displaying the detected echo image.

29. A scanning sonar comprising:

the ultrasonic transmit-receive apparatus according to claim 4; and means for controlling said transmit controller and said receive controller of the ultrasonic transmit-receive apparatus to successively scan through specified angular directions, producing data on a detected echo image from the received echo signals and displaying the detected echo image.

30. A scanning sonar comprising:

the ultrasonic transmit-receive apparatus according to claim 5; and means for controlling said transmit controller and said receive controller of the ultrasonic transmit-receive apparatus to successively scan through specified angular directions, producing data on a detected echo image from the received echo signals and displaying the detected echo image.

31. A scanning sonar comprising:

the ultrasonic transmit-receive apparatus according to claim 6; and means for controlling said transmit controller and said receive controller of the ultrasonic transmit-receive apparatus to successively scan through specified angular directions, producing data on a detected echo image from the received echo signals and displaying the detected echo image.

32. A scanning sonar comprising:

the ultrasonic transmit-receive apparatus according to claim 7; and means for controlling said transmit controller and said receive controller of the ultrasonic transmit-receive apparatus to successively scan through specified angular directions, producing data on a detected echo image from the received echo signals and displaying the detected echo image.

33. A scanning sonar comprising:

the ultrasonic transmit-receive apparatus according to claim 8; and means for controlling said transmit controller and said receive controller of the ultrasonic transmit-receive apparatus to successively scan through specified angular directions, producing data on a detected echo image from the received echo signals and displaying the detected echo image.

34. A scanning sonar comprising:

the ultrasonic transmit-receive apparatus according to claim 9; and means for controlling said transmit controller and said receive controller of the ultrasonic transmit-receive apparatus to successively scan through specified angular directions, producing data on a detected echo image from the received echo signals and displaying the detected echo image.

35. A scanning sonar comprising:

the ultrasonic transmit-receive apparatus according to claim 10; and means for controlling said transmit controller and said receive controller of the ultrasonic transmit-receive apparatus to successively scan through specified angular directions, producing data on a detected echo image from the received echo signals and displaying the detected echo image.

36. A ultrasonic transmit-receive apparatus comprising:

a transducer having multiple transducer elements arranged on the surface of the transducer at least along one direction in a horizontal plane;

a transmit controller for driving said multiple transducer elements, causing them to emit ultrasonic waves; and a receive controller for synthesizing echo signals received by said individual transducer elements to produce a synthesized received echo signal upon receiving ultrasonic waves reflected by a target;

wherein said transmit controller drives at least first and second transducer elements of the transducer in order to emit directionally varying frequency bands, each being a different frequency band, depending upon a predetermined mode of operation, and said receive controller obtaining from the first and second transducer elements signals that are generated from reflected waves having selected frequencies and angular directions; and wherein the modes of operation are selected from the group consisting of a directionally varying frequency mode, a rotational directional transmission mode, a Doppler transmission mode, a rotational aperture FM transmission mode, a directionally varying frequency continuous wave mode, and a pulse expansion mode.

37. An ultrasonic transmit-receive apparatus according to claim 36, wherein the first transducer element is aligned in a first column of transducer elements substantially perpendicular to the horizontal plane and any other transducer elements in the first column are driven at the same predetermined frequency band as the first transducer element.

* * * * *